(12) United States Patent

Ignjatovic

(10) Patent No.: US 12,573,926 B2

(45) Date of Patent: Mar. 10, 2026

(54) BIPOLAR INDUCTION ELECTRIC MACHINE

(71) Applicant: PolyWavePower IP Proprietary Limited, Western Cape (ZA)

(72) Inventor: Dragan Ignjatovic, Western Cape (ZA)

(73) Assignee: PolyWavePower IP Proprietary Limited, Western Cape (ZA)

( * ) Notice: Subject to any disclaimer, the term of this patent is extended or adjusted under 35 U.S.C. 154(b) by 118 days.

(21) Appl. No.: 18/271,387

(22) PCT Filed: Jan. 8, 2021

(86) PCT No.: PCT/IB2021/050123

§ 371 (c)(1),
(2) Date: Jul. 7, 2023

(87) PCT Pub. No.: WO2022/148994

PCT Pub. Date: Jul. 14, 2022

(65) Prior Publication Data

US 2024/0055962 A1 Feb. 15, 2024

(51) Int. Cl.
| | |
|---|---|
| *H02K 19/28* | (2006.01) |
| *H02K 11/225* | (2016.01) |
| *H02K 19/12* | (2006.01) |

(52) U.S. Cl.
CPC ........... *H02K 19/28* (2013.01); *H02K 11/225* (2016.01); *H02K 19/12* (2013.01)

(58) Field of Classification Search
CPC ...... H02K 19/28; H02K 11/225; H02K 19/12; H02K 2201/03; H02K 2213/12;

(Continued)

(56) References Cited

U.S. PATENT DOCUMENTS

| | | | |
|---|---|---|---|
| 10,742,084 B2 | 8/2020 | Hoemann | |
| 2003/0025416 A1 * | 2/2003 | Sullivan | ................... H02K 3/04 |
| | | | 310/162 |

(Continued)

FOREIGN PATENT DOCUMENTS

| | | | | |
|---|---|---|---|---|
| CA | 1326698 C | * | 2/1994 | ............. H02K 1/141 |
| DE | 102011090075 A1 | * | 7/2013 | ........... H02K 11/215 |
| WO | WO-2005086323 A1 | * | 9/2005 | ............. H02K 16/00 |

OTHER PUBLICATIONS

English translation of DE-102011090075-A1 (Year: 2013).*

(Continued)

*Primary Examiner* — Tulsidas C Patel
*Assistant Examiner* — Joshua Kiel M Rodriguez
(74) *Attorney, Agent, or Firm* — Stinson LLP

(57) ABSTRACT

A bipolar induction electric machine is provided comprising a stator arrangement comprising a plurality of circumferentially arranged stator modules, each stator module comprising a plurality of axially arranged spaced apart stator pole elements fitted with a concentrated armature winding and terminating in an inwardly facing, curved stator pole surface; and a rotor arrangement rotatably and concentrically accommodated within the stator arrangement, the rotor arrangement comprising a plurality of axially arranged rotor modules, each rotor module comprising at least one circumferentially arranged, curved bi-polar member comprising a pair of curved rotor pole elements that are axially displaced on either side of a stationary concentric field exciter coil accommodated within the stator arrangement. The curved rotor pole elements are concentrically arranged relative to the stator pole surfaces so as to define a uniform air-gap therebetween and thus provide a plurality of axially segmented multipolar flux circuits.

19 Claims, 48 Drawing Sheets

(58) Field of Classification Search
      CPC ...... H02K 1/146; H02K 1/246; H02K 1/2753;
                              H02K 19/10; H02K 21/16
      See application file for complete search history.

(56)                   References Cited

U.S. PATENT DOCUMENTS

| | | |
|---|---|---|
| 2005/0001503 A1 | 1/2005 | Hans |
| 2007/0236090 A1* | 10/2007 | Hoppe ................. H02K 41/033 |
| | | 310/12.24 |
| 2009/0115361 A1 | 5/2009 | Nitta |
| 2010/0052467 A1 | 3/2010 | Gieras |
| 2010/0156402 A1 | 6/2010 | Straubinger et al. |
| 2018/0254688 A1 | 9/2018 | Gieras et al. |

OTHER PUBLICATIONS

International Search Report dated Jul. 1, 2021 relating to PCT Application No. PCT/IB2021/050123, 3 pages.
Written Opinion dated Jul. 1, 2021 relating to PCT Application No. PCT/IB2021/050123, 12 pages.

* cited by examiner

Section 'A-A'

Section 'B-B'

SECTION 'A-A'

BIPOLAR INDUCTION ELECTRIC MACHINE

FIELD OF INVENTION

This invention relates to a bipolar induction synchronous electric machine comprising a plurality of axially segmented flux circuits. In particular, the machine has a stator arrangement comprising a circumferential arrangement of stator modules, each having a plurality of axially arranged pole elements, and a corresponding rotor arrangement having a plurality of axially arranged rotor modules, each comprising at least one set of bipolar shaped field poles that induce a correspondingly shaped emf waveform (in the case of an electric alternator) or a back emf (in the case of a motor).

BACKGROUND OF INVENTION

Electric machines generally comprise two major components, namely a stator, which is the part of the machine that remains stationary during operation, and a rotor, which is the part of the machine that rotates during operation. At a high level, electric machines may either be electric motors, in which electricity is supplied to the machine to turn the rotor and produce a rotating mechanical force (although linear machines have a linearly moving part), or electric alternators, in which the rotor is turned to generate electricity in the form of an emf waveform. The interchangeability between a motor and alternator is well known, and thus the term "electric machine" will be used herein to refer to either a motor or an alternator.

There are in turn many different types of electric machines. The two main parts of an electric machine can be described in either mechanical or electrical terms. In mechanical terms, as indicated above, the rotor is the rotating part, and the stator is the stationary part of the machine. In electrical terms, an armature is provided and is the power-producing component and the field is the magnetic field component of the electric machine. The armature can be on either the rotor or the stator, but in this case, the armature will be on the stator. The magnetic field can be provided by either electromagnets or permanent magnets mounted on either the rotor or the stator, but in this case, the rotor will provide the magnetic field.

In respect of alternators, there are two types, namely AC alternators, which convert mechanical energy into alternating current (AC) electricity. AC alternators may in turn take the form of an induction alternator or a synchronous alternator. In the former, the stator magnetic flux induces currents in the rotor. The prime mover then drives the rotor above the synchronous speed, causing the opposing rotor flux to induce current in the stator coils, thus sending electrical power back to the electrical grid. In the latter, namely a synchronous alternator, the current for the magnetic field is provided by a separate DC current source. The present invention may be best described as a synchronous machine, and will primarily be described with reference to a synchronous alternator (in the main embodiments of the invention). For completeness, a DC alternator, is one that converts mechanical energy into direct current (DC) electrical energy. A DC alternator generally has a commutator with split ring to produce a direct current instead of an alternating current, with it being a specific objective of the present invention to not use commutators or split rings.

In respect motors, these machines convert electrical electric energy into mechanical energy, in which magnetic fields and current-carrying conductors interact to generate rotational force (or a linear force in respect of linear motors). Again, there are two main types, namely AC motors and DC motors.

An AC motor converts AC current into mechanical energy, and typically comprises an outer stationary stator having coils supplied with alternating current to produce a rotating magnetic field, and an inside rotor attached to the output shaft that is given a torque by the rotating field. The two main types of AC motors are distinguished by the type of rotor used. The first type is an induction (asynchronous) motor, in which the rotor magnetic field is created by an induced current. The rotor turns slightly slower (or faster) than the stator magnetic field to provide the induced current. The second type is a synchronous motor, which does not rely on induction and so can rotate exactly at the supply frequency. In this case, the magnetic field of the rotor is either generated by direct current delivered through slip rings, thus energising rotor windings, or by permanent magnets attached to the rotor.

A DC motor, such as a brushed DC electric motor, generates torque directly from DC power supplied to the motor by using internal commutation, stationary permanent magnets, and rotating electrical magnets. Brushes and springs carry the electric current from the commutator to the spinning wire windings of the rotor inside the motor. Brushless DC motors use a rotating permanent magnet in the rotor, and stationary electrical magnets on the motor housing.

In yet another machine type, permanent magnet machines have permanent magnets in the rotor which set up a magnetic field. The magnetic field created by modern permanent magnets, such as Neodymium magnets is relatively strong, which means that permanent magnet machines tend to have a better torque/volume and torque/weight ratio than machines with rotor coils under continuous operation. Since the permanent magnets in a permanent magnet machine already introduce considerable magnetic reluctance, the reluctance in the air gap and coils are less important. This gives considerable freedom when designing permanent magnet machines.

Special mention should be made of homopolar induction alternators 10, of the type shown in FIG. 1, which is based on unidirectional flux induction. In this arrangement, a 1-piece HIA rotor 12 on the bottom of FIG. 1, comprises a central shaft 14 with a pair of spaced apart, offset (or staggered as shown by dotted outline 15) toothed rotor components 16, 18. A field winding 20 in the stator cores 22 (adjacent a stator yoke 24) of the surrounding stator 25, typically a copper ring/coil, induces a magnetic flux through the poles of each toothed rotor component 16, 18; for example, the toothed poles of the first rotor component 16 may have a magnetic polarity of North, and so conversely the toothed poles of the second rotor component 18 may have a magnetic polarity of South. The armature winding 26 thus experiences alternating polarities, as the rotor 12 rotates within the stator 25, which produces a pulsating DC flux. The absence of rotating windings means that it is an inherently reliable machine 10, and is thus a primary choice for aerospace, missile and gas turbine applications. These alternators 10 usually have a high frequency due to a large number of poles in order to reduce weight. In addition to the high frequency, the output voltage is far from an ideal sine waveform. Machines with two or four poles may have a more sinusoidal waveform but suffer from slot harmonics and are prohibitively heavy for many applications.

Rotation of the toothed rotor components 16, 18 creates variable permeance between itself and the stator 25, thus generating voltage in the stator windings 26 according to Faraday's law. Since the flux density arising from the variable permeance never reverses, it has a relatively large DC component resulting in a DC flux that flows in the magnetic circuit. Sufficient iron must be provided to support this flux and thus the machine 10 is inherently heavier than a wound rotor machine which has no DC component. The inherent trade-off is thus weight versus greater reliability.

Finally, switched and variable reluctance motors are both synchronous motors similar to the brushless permanent magnet motors except that the rotors are made from laminated "soft" magnetic materials, shaped to form salient poles. The reluctance varies with rotor position. The rotor tends to align itself with the magnetic flux lines. The coils are digitally commutated (switched on and off) at the desired rate and in the proper sequence. In a synchronous reluctance motor, a sinusoid is used to drive the coils. Because of the double saliency, this design suffers from torque ripple, structural resonances and acoustic noise.

To address the disadvantages of typical machines, as described above, the main, overlying objectives of the present invention are as follows:

to provide a bipolar induction synchronous electric machine comprising a plurality of axially segmented flux circuits;

to provide a machine having a stator arrangement comprising a circumferential arrangement of stator modules, each having a plurality of axially arranged pole elements, and a corresponding rotor arrangement having a plurality of axially arranged rotor modules, each comprising at least one set of bipolar shaped field poles that induce a correspondingly shaped emf waveform (in the case of an electric alternator) or a back emf (in the case of a motor);

to provide an armature arrangement having armature cores with alternating magnetic poles to provide and ensure flux reversal, thus overcoming the large DC component of conventional homopolar induction alternators;

to provide a magnetless, synchronous machine without sliprings, commutator or rotor windings;

to provide a slotless stator and thus eliminate slot harmonics;

to provide a synchronous motor or alternator with concentrated coils positioned on the outer part of the machine for superior cooling;

to provide a synchronous motor or alternator with concentrated coils that can easily be manufactured without special tools or skills, as is the case with normal motors and alternators;

to provide a synchronous motor and alternator with a simple laminated silicon steel stator;

to provide a synchronous motor and alternator with a simple laminated silicon steel rotor poles;

to provide a synchronous motor and alternator with simple cast or machined steel rotor poles;

to provide a synchronous motor and alternator with ample gaps between interleaving rotor poles, minimising flux leakage, with these poles defining an un-truncated, integral whole;

to provide a synchronous motor and alternator with segmented magnetic circuits to reduce the back-iron mass, the number of segments being independent of the number of poles; and to provide a synchronous motor and alternator with practically zero cogging.

Particular objectives of the present invention are as follows:

to provide a 3-phase synchronous motor or alternator with a sinusoidal emf waveform;

to provide a 2-phase synchronous motor with a triangular or double trapezoidal emf that is driven by a simple square wave with high quality, ripple-free torque and high efficiency;

to provide a 2-phase alternator with a triangular or double trapezoidal emf, each phase fully rectified and connected in series to deliver a ripple-free, high quality DC output;

to provide a 2-phase motor with a square back emf waveform to be driven by the above 2-phase alternator;

to provide a 2-phase motor with a square back emf waveform to be driven by a triangular wave drive;

to provide a 2-phase or 3-phase synchronous motor and alternator with simple sensor coils, concentrated wound for infinite resolution speed and position sensing; and to provide a 2-phase synchronous motor and alternator with parallelogram poles for inducing triangular or double trapezoidal emf waveforms.

SUMMARY OF INVENTION

According to a first aspect of the invention, there is provided a bipolar induction electric machine comprising:

a stator arrangement comprising a plurality of circumferentially arranged stator modules, each stator module comprising a plurality of axially arranged spaced apart stator pole elements fitted with a concentrated armature winding and terminating in an inwardly facing, curved (or arcuate, sector-cylindrical) stator pole surface; and a rotor arrangement rotatably and concentrically accommodated within the stator arrangement, the rotor arrangement comprising a plurality of axially arranged rotor modules, each rotor module comprising at least one circumferentially arranged, curved (or arcuate, sector-cylindrical) bi-polar member comprising a pair of curved rotor pole elements that are axially displaced on either side of a stationary concentric field exciter coil accommodated within the stator arrangement, with the curved rotor pole elements being concentrically arranged relative to the stator pole surfaces so as to define a uniform air-gap therebetween and thus provide a plurality of axially segmented multipolar flux circuits, with the axial dimension of each rotor pole element varying in a manner so as to vary the overlap between the rotor pole element and the stator pole surface during rotation of the rotor arrangement, thus inducing a predetermined emf waveform in the armature winding of the stator pole elements.

In an embodiment, the axially arranged spaced apart stator pole elements are joined by a common stator yoke (or core, or back-iron), with each stator pole element extending or protruding radially inwardly towards the centre of the machine, each stator pole element comprising a (protruding or salient) stator stem (or leg) to accommodate the concentrated armature winding, the stator pole element terminating in a stator pole the distal end of which defines the curved stator pole surface, so that a plurality of the circumferentially arranged stator pole elements define a substantially cylindrical stator pole surface, with the stationary field exciter coil being accommodated between adjacent stator poles of the adjacent axially arranged spaced apart stator pole elements.

In an embodiment, the stator arrangement comprises a plurality of axially arranged polygonal stator frame modules joined together to define an enclosed stator body, each stator frame module comprising a plurality of stator frame module components corresponding to the number of circumferentially arranged stator modules, each stator frame module component defining an aperture or slot to accommodate a stator pole element.

In an embodiment, circumferential gaps may be defined between the circumferentially arranged stator modules to accommodate a pick-up sensor-coil core-element to determine position/speed. A sensor coil will be wound around a core with two ends, each end positioned into a space between two stator modules.

In an embodiment, the rotor arrangement includes a rotatable shaft to carry the plurality of axially arranged rotor modules, each bi-polar member of each rotor module being connected to the shaft via a support arm arrangement, with each bi-polar member having a corresponding spaced apart pair of stator pole surfaces, so that each rotor pole element lines up with a corresponding concentric stator pole element.

In an embodiment, each rotor pole element comprises:

a substantially straight inner edge spaced apart from a corresponding inner edge of the adjacent rotor pole element that in combination defines the bi-polar member, with this spacing corresponding to the spacing between adjacent stator pole surfaces of adjacent stator pole elements; and a shaped outer edge so as to define a shaped, curved rotor pole surface between the inner and outer edges, the curved rotor pole surface and the corresponding curved stator pole surface of the corresponding stator pole element defining the uniform air-gap therebetween, with the concentric field exciter coil encircling the centre of each rotor module, so as to excite the bi-polar member, with the shaped rotor pole surfaces providing, during rotation, a variable area overlap with the adjacent stator pole surfaces thereby varying the flux through the stator pole elements, which in turn induces a correspondingly shaped emf waveform in the armature winding of the stator pole elements.

In an embodiment, each axially arranged rotor module is separately excited by a dedicated concentric field exciter coil, each rotor module having its own axially arranged north and south poles to define the bi-polar member.

In an embodiment, the ends of the bi-polar members of one rotor module, of one polarity, are axially interleaved so as to be circumferentially adjacent, when viewed axially from an end of the shaft, with respect to the ends of an adjacent bi-polar member of an adjacent rotor module, of the opposite polarity.

Two Stage, Two-Pole Rotor Arrangement

In a first embodiment, in the case of a 2-pole machine, each rotor module comprises one curved bi-polar member that defines an arc of 180 degrees (mechanical and electrical), with a counterweight arrangement being provided to balance the rotating shaft.

Two Stage, Four-Pole Rotor Arrangement

In a second embodiment, in the case of a 4-pole machine, each rotor module comprises two diametrically arranged (and therefore inherently balanced), curved bi-polar members, each curved bi-polar member defining an arc of 90 degrees (mechanical), with there being a corresponding sector gap defined between the curved bi-polar members.

In this second embodiment, adjacent rotor modules are offset by 180 degrees (electrical) so that the curved bi-polar members of one rotor module interleave with the curved bi-polar members of an adjacent rotor module so as to occupy (or at least partly occupy) the sector gaps defined in the adjacent rotor module. In particular, the interleaving curved rotor pole elements of adjacent rotor modules have adjacent poles of opposite polarities to produce bipolar induction.

In a first version of this second embodiment, the shaped outer edge of the rotor pole element is curved to ultimately define a sinusoidal emf.

In a second version of this second embodiment, the shaped outer edge of the rotor pole element is triangular to ultimately define a triangular emf.

In a third version of this second embodiment, the shaped outer edge of the rotor pole element is a parallelogram, to ultimately define a double trapezoidal emf.

In a fourth version of this second embodiment, the shaped outer edge of the rotor pole element is a full sinusoid, to ultimately define a double sinusoidal emf.

Eight-Pole Rotor Arrangement

In a third embodiment, each rotor module comprises four circumferentially arranged, equally spaced curved bi-polar members, each defining an arc of 45 degrees mechanical (when viewed axially, from an end of the shaft), with there being four corresponding sector gaps defined between adjacent curved bi-polar members.

In this third embodiment, adjacent rotor modules are circumferentially offset by 45 degrees mechanical so that the curved bi-polar members of one rotor module interleave with the curved bi-polar members of an adjacent rotor module (so as to occupy (or at least partly occupy) the sector gaps defined in the adjacent rotor module).

In a first version of this third embodiment, the shaped outer edge of the rotor pole element is curved to ultimately define a sinusoidal emf, or is triangular to ultimately define a triangular emf, or is a parallelogram, to ultimately define a double trapezoidal emf, or is a full sinusoid, to ultimately define a double sinusoidal emf.

In all three embodiments, the curved rotor pole elements may be either cast rotor elements, fabricated rotor pole elements or laminated rotor pole elements, or any combination.

In one version, instead of the concentric field exciter coil, permanent magnets may be fitted within the bi-polar member. In another version, in addition to the field exciter coil, permanent magnets may be fitted within the bi-polar member.

Stator Arrangement

In an embodiment, each stator module includes a pair of end stator pole elements, associated with endmost rotor pole elements, and at least one intermediate stator pole element, associated with intermediate rotor pole elements. The armature winding around the intermediate stator pole element/s receives an alternating flux/emf due to bipolar induction, to provide the predetermined emf waveform.

The armature windings around the end stator pole elements each receive single directional flux due to unipolar induction, with the two halves provided by the end stator pole elements having armature windings of opposite polarity being connected in series to define a correspondingly shaped emf (thus effectively corresponding to bipolar induction).

BRIEF DESCRIPTION OF DRAWINGS

These and other features of this invention will become apparent from the following description of one example described with reference to the accompanying drawings in which.

DETAILED DESCRIPTION OF AN EMBODIMENT

Referring first to FIGS. 2 to 8, at a high level, a bipolar induction electric machine 30 comprises a stator arrangement 32 and a rotor arrangement 34 rotatably and concentrically accommodated within the stator arrangement 32.

Figure 3:
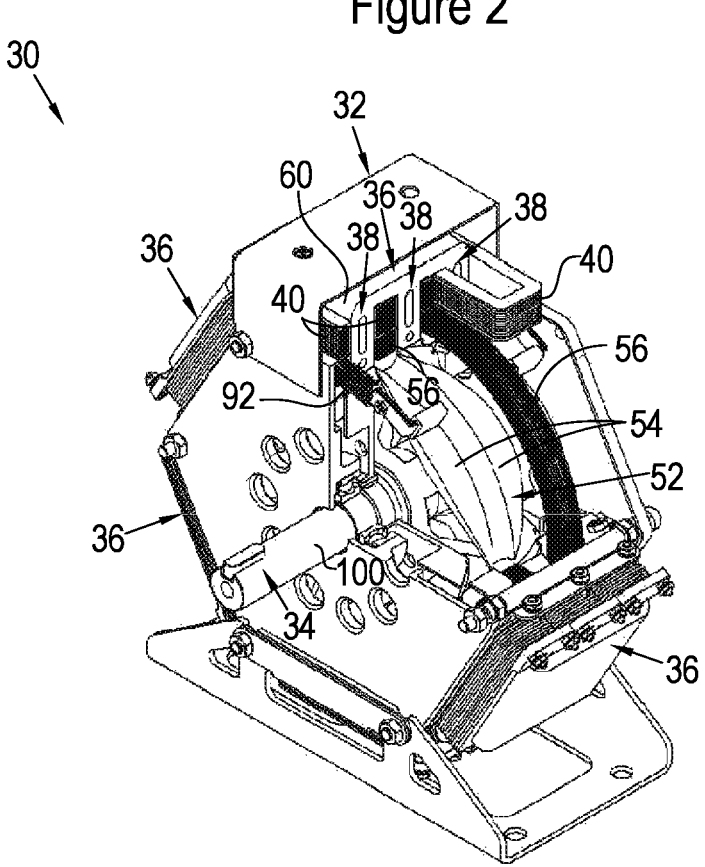
FIG. 3 shows a perspective view of a quarter section through the 3-phase, 2-stage, 4-pole machine shown in FIG. 2.
Figure 4:
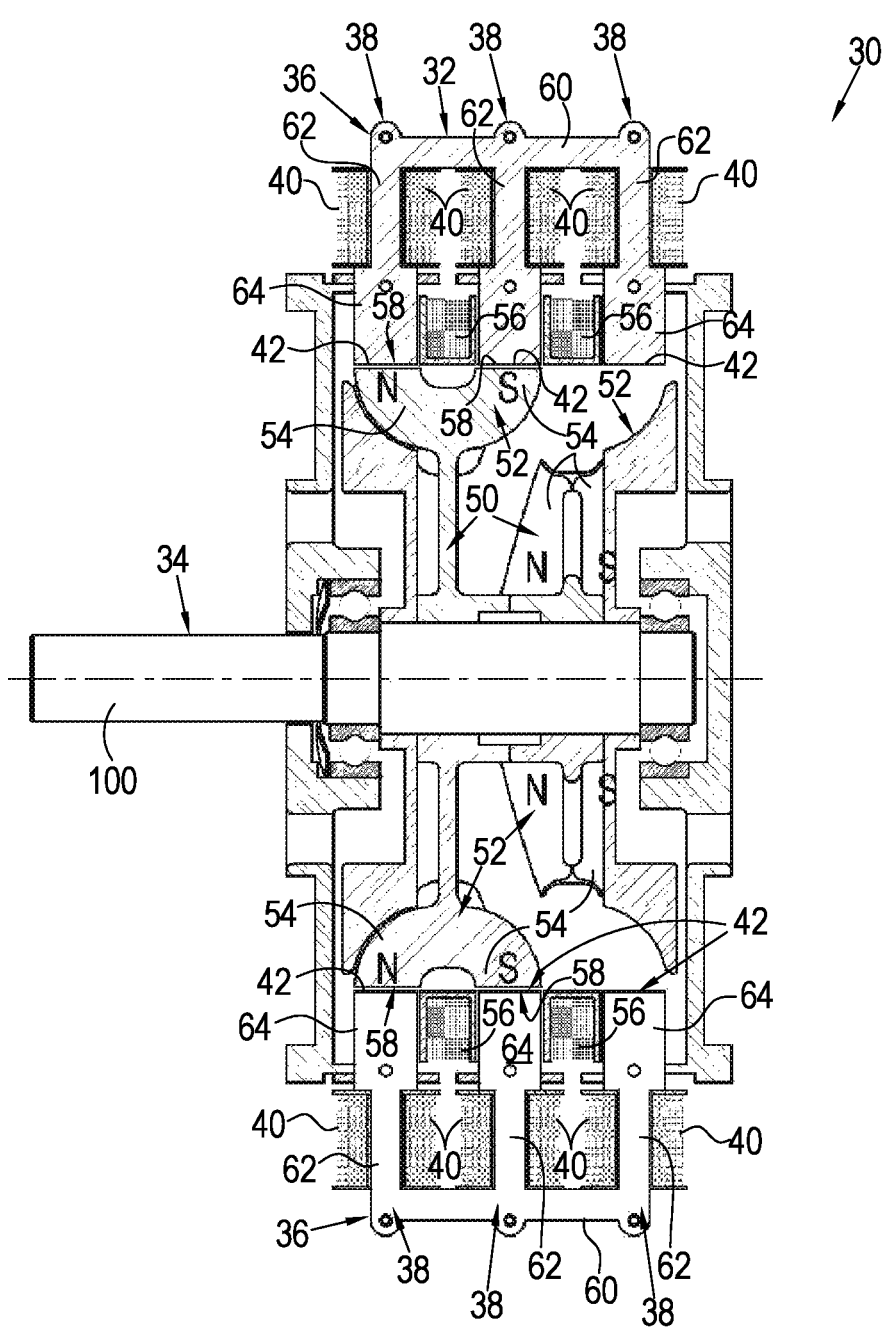
FIG. 4 shows a cross-sectional side view of the machine shown in FIGS. 2 and 3.

As best shown in FIGS. 2, 3, 5 and 6, the stator arrangement 32 comprises a plurality of circumferentially arranged stator modules 36, in this case six stator modules 36. As best shown in FIGS. 3 and 4, each stator module 36 in turn comprises a plurality of axially arranged spaced apart stator pole elements 38 fitted with a concentrated armature winding 40 and terminating in an inwardly facing, curved (or arcuate, sector-cylindrical) stator pole surface 42.

Figure 7:
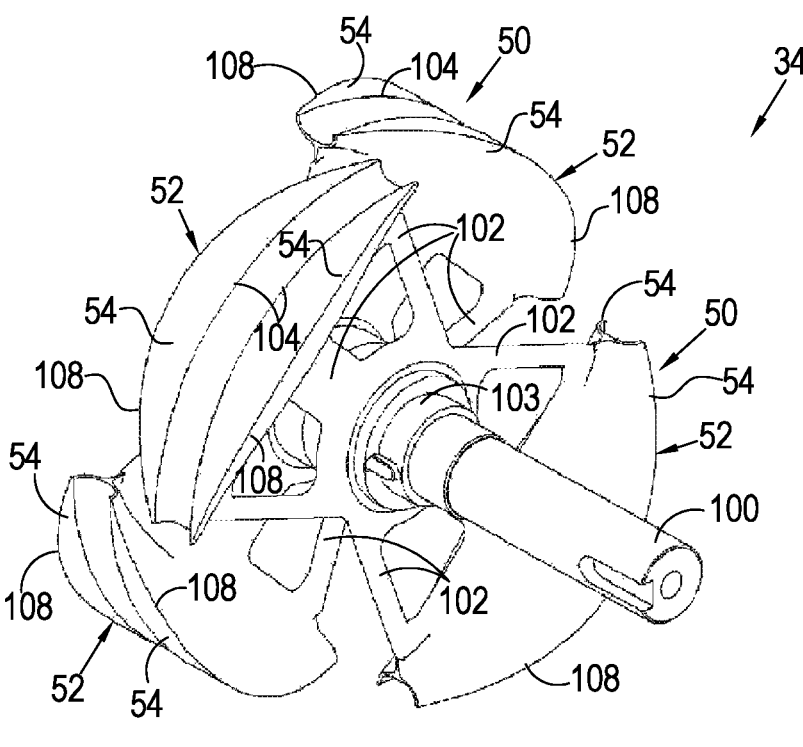
FIG. 7 shows a perspective view of a rotor arrangement comprising a plurality of, in this case two, axially arranged rotor modules, each rotor module in turn comprising a pair of circumferentially arranged, curved bi-polar members, for use in the machine shown in FIGS. 2 to 6, comprising cast rotor elements.

As best shown in FIGS. 4 and 7, the rotor arrangement 34 comprises a plurality of axially arranged rotor modules 50, each rotor module 50 comprising at least one (but in this case, two) circumferentially arranged, curved (or arcuate, sector-cylindrical) bi-polar members 52. Each bi-polar member 52 in turn comprises a pair of curved rotor pole elements 54 that are axially displaced (as best shown in FIG. 4) on either side of a stationary concentric field exciter coil 56 accommodated within the stator arrangement 32.

As best shown in FIG. 4, the curved rotor pole elements 54 are concentrically arranged relative to the stator pole surfaces 42 so as to define a uniform air-gap 58 therebetween and thus provide a plurality of axially arranged toroidal-sector flux circuits with interleaved multipolar paths through intermediate stator elements. Significantly, the axial dimension of each rotor pole element 54 varies in a manner so as to vary the overlap between the rotor pole element 54 and the stator pole surface 42 during rotation of the rotor arrangement 34, thus inducing a predetermined emf waveform in the armature winding 40 of the stator pole elements 38.

Focusing initially on the stator arrangement 32, with reference to FIGS. 9 to 12 as well, the axially arranged spaced apart stator pole elements 38 are joined by a common stator yoke 60 (also sometime referred to as a core, or back-iron), with each stator pole element 38 extending or protruding radially inwardly towards the centre of the machine 30.

Each stator pole element 38 comprises a protruding or salient stator stem or leg 62 to accommodate the concentrated armature winding 40. The stator pole element 38 terminates in a stator pole 64, the distal end of which defines the curved stator pole surface 42. As a result, a plurality of the circumferentially arranged stator pole elements 38 define a substantially cylindrical stator pole surface 42, with the stationary field exciter coil 56 being accommodated between adjacent stator poles 64 of the adjacent axially arranged spaced apart stator pole elements 38. Thus, in this embodiment, there are 3 stator pole elements 38, when viewed from the side (as in FIG. 4, for example), and thus 2 field coils 56 (one per rotor module 50).

Figure 12:
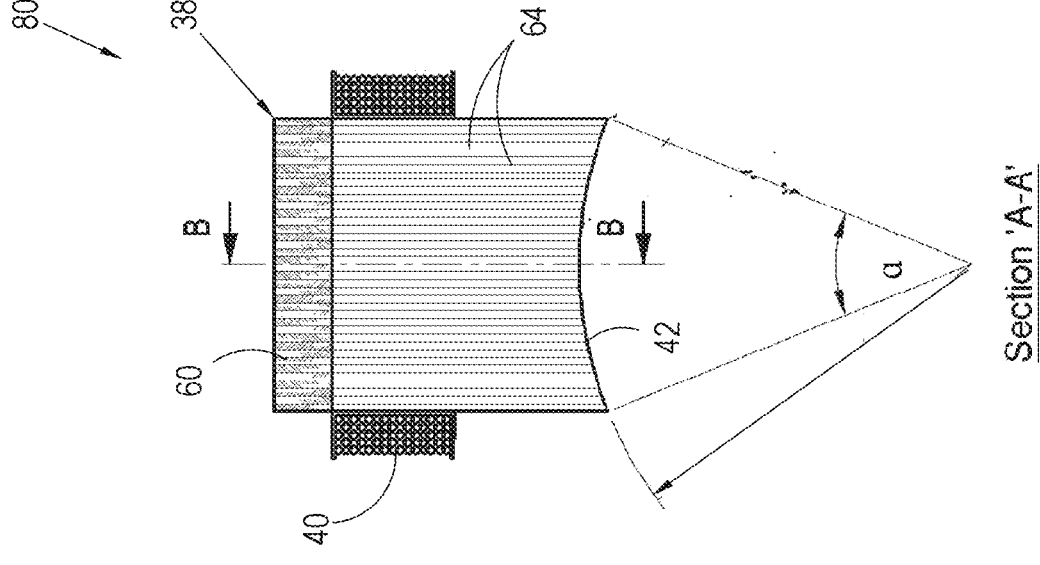
FIG. 12 shows a detailed cross-sectional side view of the phase armature module shown in FIGS. 9 to 11 and a corresponding cross-sectional view taken along line A-A.
Figure 12:
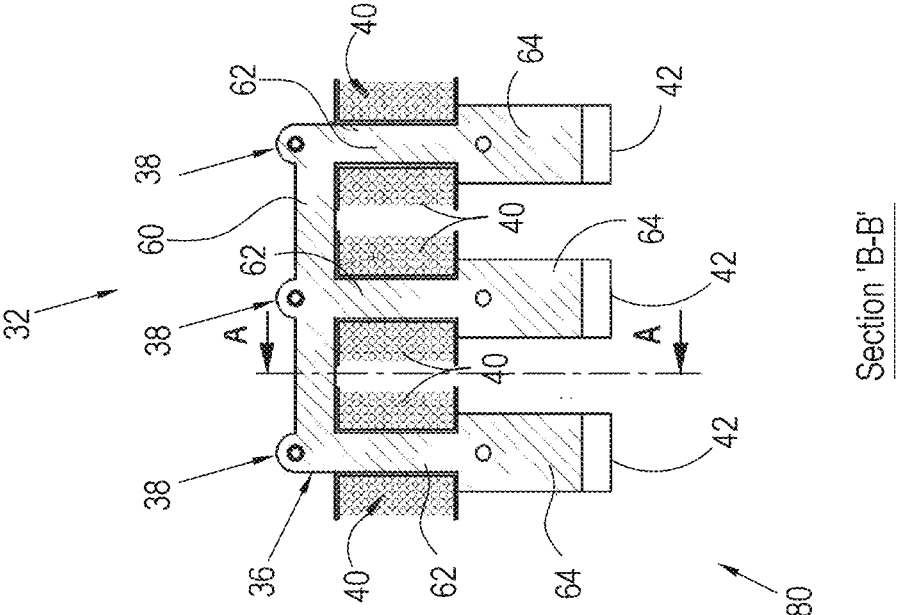

Although a step is shown between the stator stem 62 and the stator pole 64, as shown in FIGS. 4 and 12, this is not necessary (other than to provide more space for copper of the stator coil (at the expense of higher flux density in the stem 62)) i.e. they may have the same width.

Figure 9:
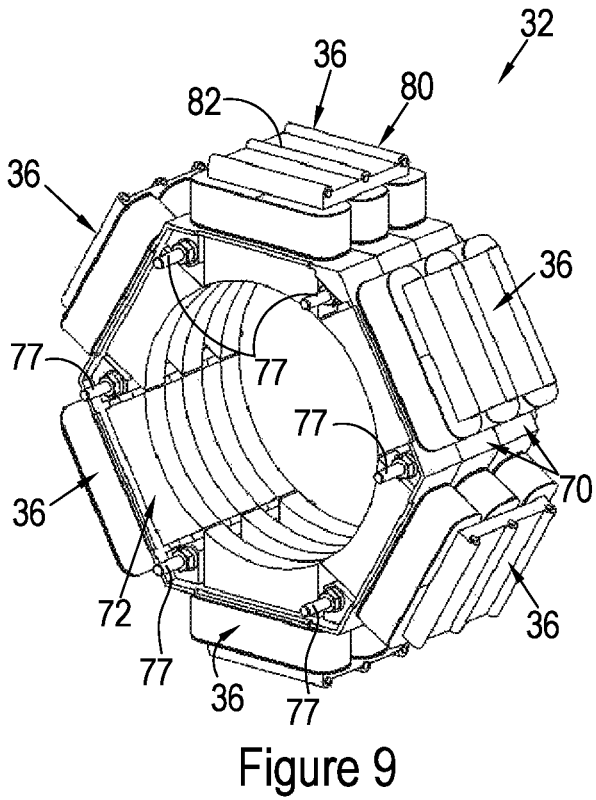
FIG. 9 shows a perspective view of a stator arrangement used in the machine shown in FIGS. 2 to 6, for accommodating the rotor arrangement shown in FIG. 7, the stator arrangement comprising a plurality of circumferentially arranged stator modules, in this case six stator modules, each stator module in turn comprises a plurality of axially arranged spaced apart stator pole elements.
Figure 10:
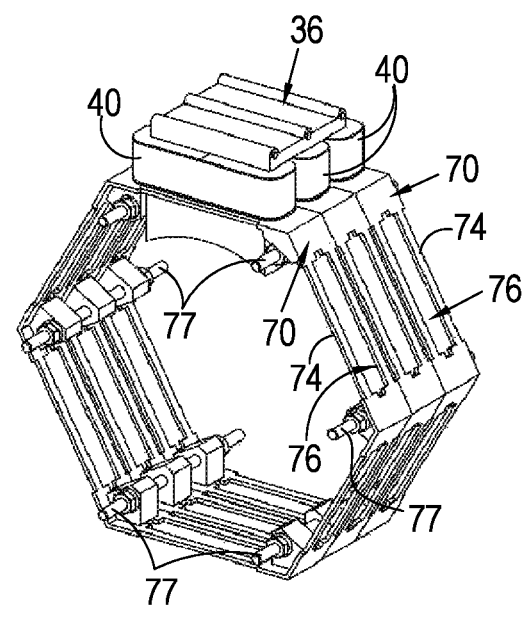
FIG. 10 shows a part assembly of the stator arrangement shown in FIG. 9.
Figure 11:
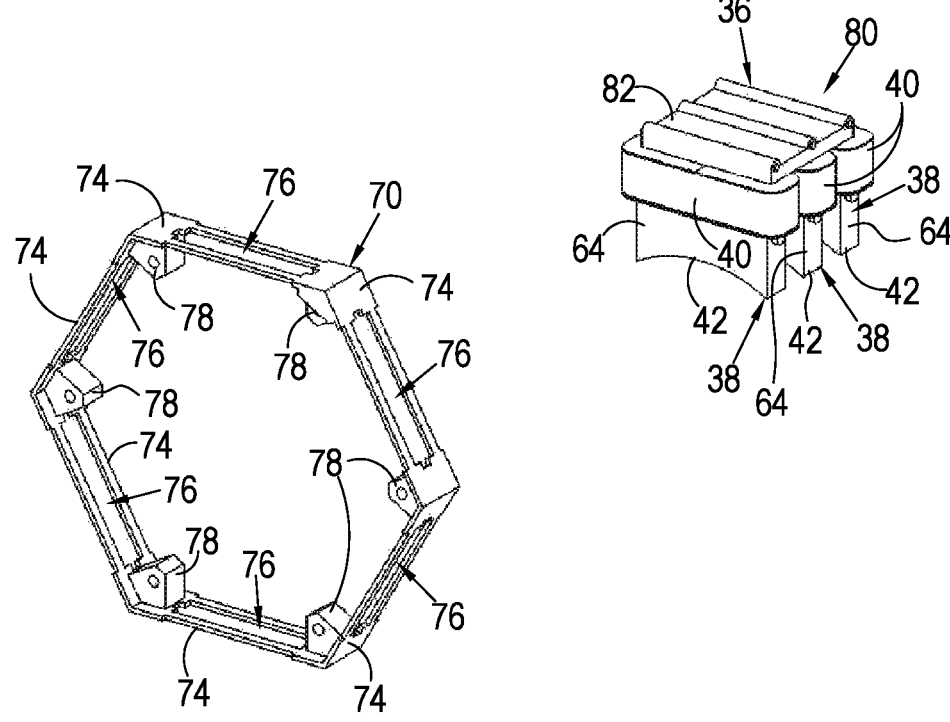
FIG. 11 shows a perspective view of one of the stator frame modules shown in FIGS. 9 and 10, and a perspective view of a phase armature module for insertion into the stator frame modules as shown in FIG. 9.

Turning now to FIGS. 9 to 11 in particular, the stator arrangement 32 comprises a plurality of axially arranged polygonal (hexagonal in this case) stator frame modules 70 joined together to define an enclosed stator body 72. Each stator frame module 70 comprises a plurality of stator frame module components 74 corresponding to the number of circumferentially arranged stator modules 36; in this version, there are six stator frame module components 74, one per circumferentially arranged stator module 36.

The number of circumferentially arranged stator modules 36 depends upon the desired number of phases, with the machine 30 in the figures being described being a 3-phase machine. This will be described in more detail below with reference to the structure of the rotor arrangement 34 (and the winding diagram for a 3-phase machine in FIG. 37).

Each stator frame module component 74 defines an aperture or slot 76 to accommodate a stator pole element 38, as best shown in FIG. 9. The stator frame modules 70 are joined together with bolts 77 that extend through apertures defined in lugs 78 provided at the ends of (or at the interfaces between) adjacent stator frame module components 74. Although not shown, these lugs 78 are also used to attach field coil formers that have suitable 'ears' with holes.

As best shown in FIG. 11, a plurality of the axially arranged spaced apart stator elements 38 may be joined together to form a phase armature module 80. The phase armature module 80 thus extends longitudinally along the length of the machine 30, as best shown in FIGS. 9 and 10. Advantageously, this allows the armature modules 80 to be mounted externally (i.e. from the outside) to the stator arrangement 32. The armature module 80 essentially defines a comb-like structure, with each leg of the comb corresponding to a stator pole 64, as described above.

A retainer plate 82 is provided to secure the stator elements 38 together to define the armature module 80. In this regard, the machine 30 may be called a slotless machine and would therefore not experience or display slot harmonics. Slots, from an electric machine perspective, are only slots if they are part of the flux changing circuit. The gaps between the stator poles are not slots, as such, as they do not form part of the magnetic circuit, or rather they do not at any one instant disturb or obstruct the flux during the rotation of the rotor arrangement 34 (when the machine 30 is operating).

Figure 13:
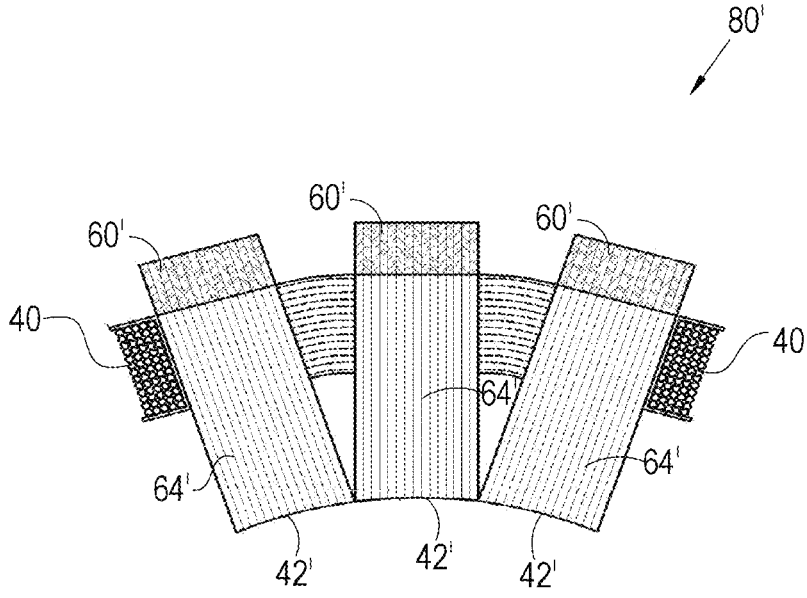
FIG. 13 shows a schematic end view of another version of the armature phase module, and in particular a segmented armature phase module.

FIG. 13 shows a schematic end view of another version of an armature phase module 80'. In particular, this figure shows a segmented armature phase module 80' (when compared to the unitary phase module 80 shown in FIG. 12). The armature phase module 80' comprises a plurality of radial, segmented stator poles 64' and stator yokes 60' surrounded by the armature winding 40, but which are circumferentially arranged so that their curved stator pole surfaces 42' nonetheless still define a substantially cylindrical stator pole surface 42'.

Figure 5:
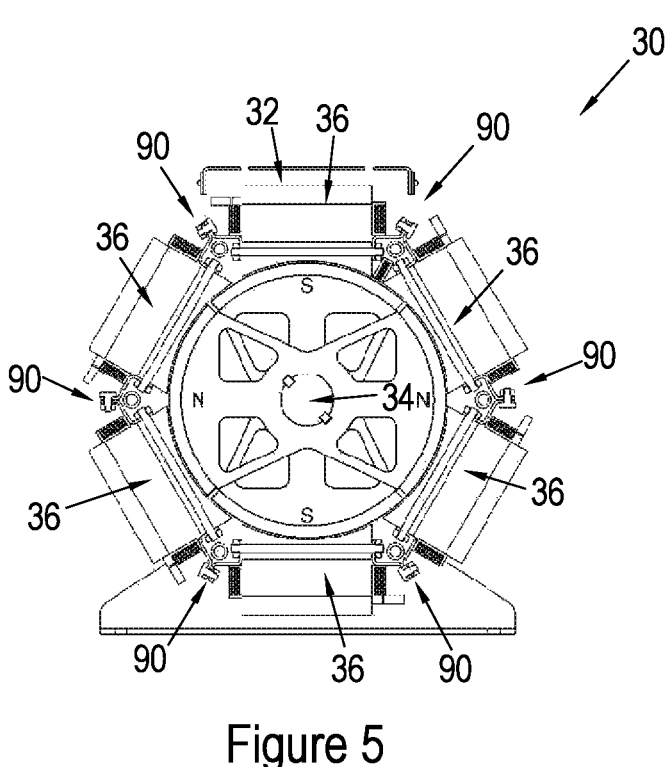
FIG. 5 shows an end view of an intermediate segment of the machine shown in FIGS. 2 to 4.
Figure 6:
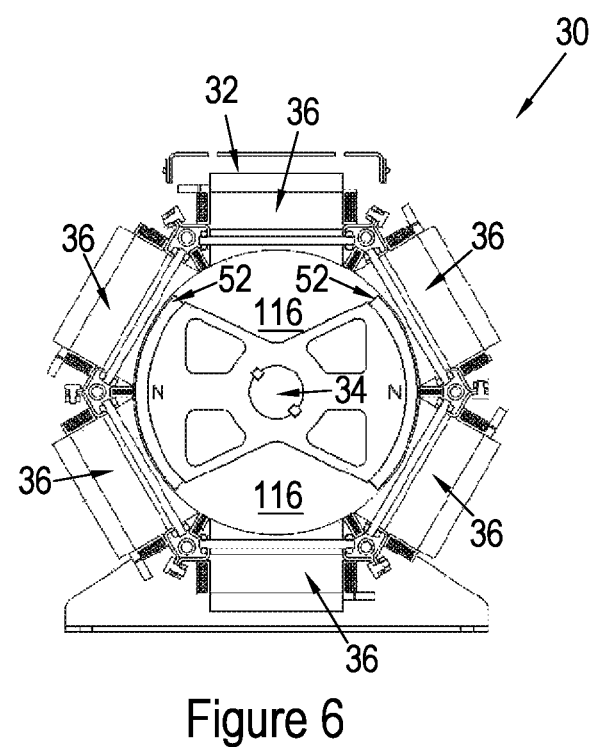
FIG. 6 shows an end view of an end segment of the machine shown in FIGS. 2 to 4.

As best shown in FIG. 5, circumferential gaps 90 are defined between the circumferentially arranged stator modules 36 to accommodate a pick-up sensor-coil core-element to determine position/speed. A sensor coil 92 (shown in FIG.

3) will be wound around a core with two ends, each end positioned into a space between two stator modules 36. These gaps 90 do not modify the emf waveform induced in the armature windings 40 of the stator pole elements 38; the emf waveforms may vary in amplitude with different gaps, but will not be truncated or distorted or modified in any detrimental way. In particular, since the stator pole arc is less than 180 degrees electrical (as a result of the gaps 90 for the sensor-coil core), the emf waveform amplitude will be lower but will have the same shape as the intended waveform. As such, the output emf (or the amperage, or the volt-amperes, or power) will be lower than if the stator pole arc were a full 180 degrees electrical; however, the integrity or quality of the induced emf waveform will not deteriorate.

In one version, these gaps 90 may receive or accommodate a laminated unit, similar to the armature modules 80 but much narrower, and have an armature winding which may be used as a sensor to indicate position and speed of the machine by supplying an analogue signal in the shape of the emf waveform. This pick-up or sensor coil would act in exactly the same manner as the armature modules 80 but would have a much weaker emf; however, this signal will not be influenced by changes in the main armature modules 80 and is therefore ideally suited for signal pickups or sensors. In some cases, the armature modules 80 may be too wide to leave any space between each other for pickup coils. In such cases, it would be sufficient for pickup coils to only be installed on one intermediate segment or alternatively to both end-segments. These particular armature modules would be narrower than the rest, thereby yielding less emf than the rest. However, when in series with the intermediate coils, the total result will be a sine wave (since sine waves of different amplitudes, when combined, will result in another sine wave).

Figure 1:
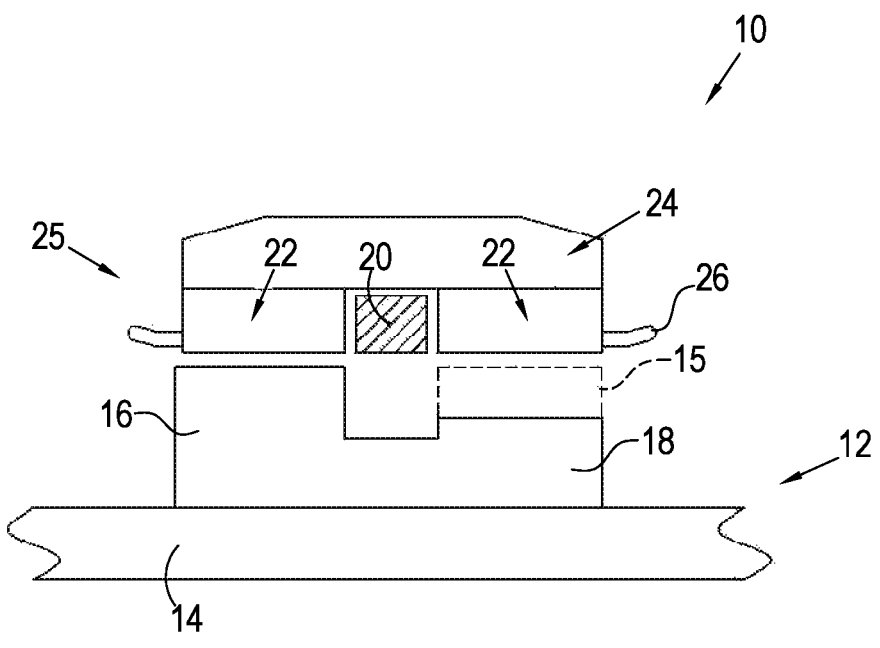
FIG. 1 shows a cross-sectional side view of a known homopolar induction alternator, and a perspective view of the rotor used in this alternator.
Figure 1:
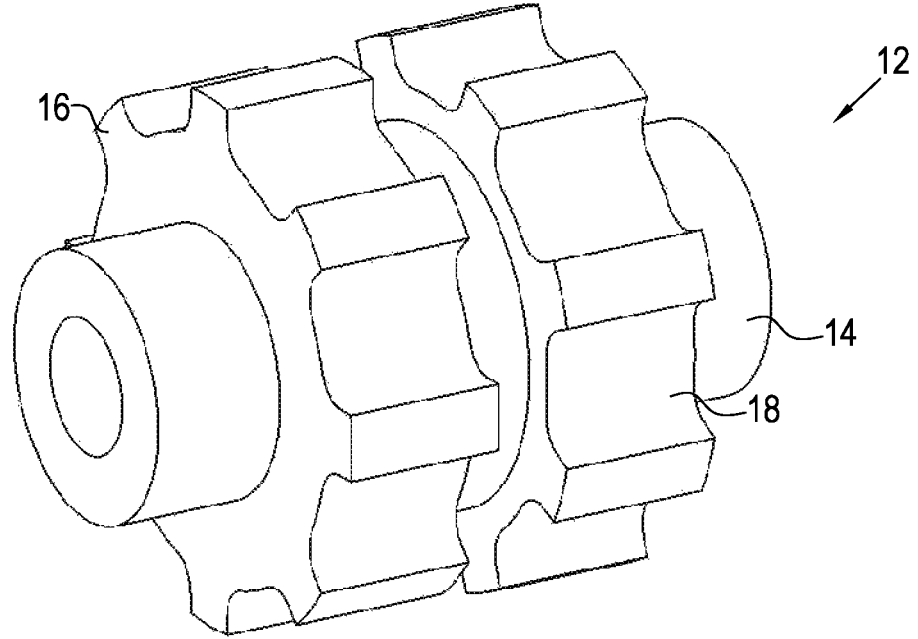
Figure 2:
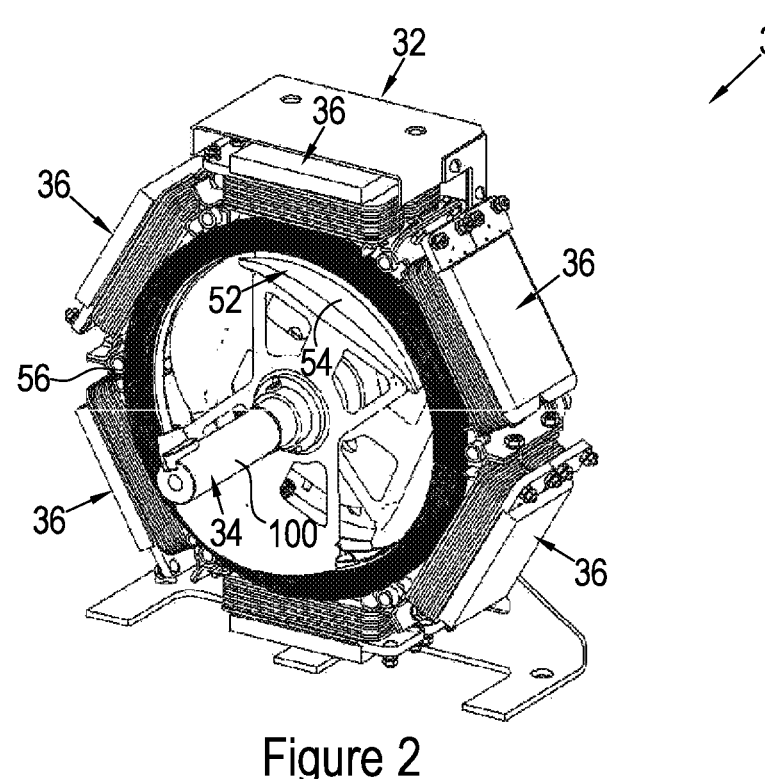
FIG. 2 shows a perspective view of a section through a field exciter coil of a 3-phase, 2-stage, 4-pole machine of an embodiment of the present invention.

When compared to the conventional homopolar induction alternator 10 described above with reference to FIG. 1, the armature modules 80 of the present invention are subjected to pole reversal, and therefore do not suffer from the fairly large DC component of the homopolar induction alternator 10.

Figure 8:
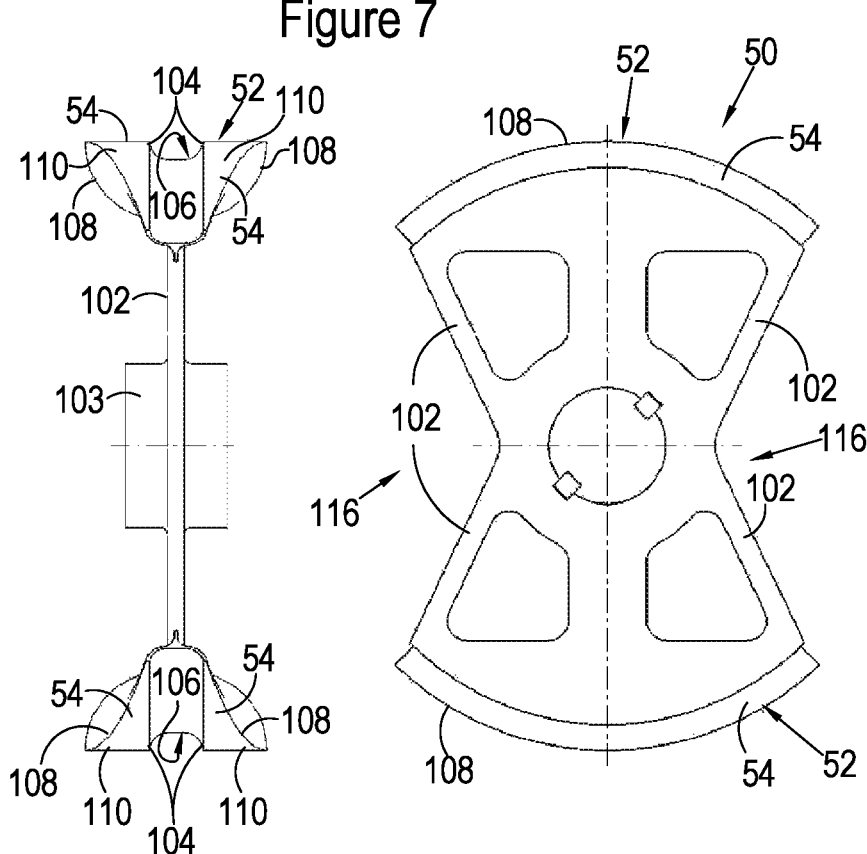
FIG. 8 shows side and end views of one of the rotor modules shown in FIG. 7.

Turning now to FIGS. 7 and 8, the rotor arrangement 34 includes a rotatable shaft 100 to carry the axially arranged rotor modules 50. Each bi-polar member 52 of each rotor module 50 is connected to the shaft 100 via a support arm arrangement 102 and related central hub 103, so as to extend substantially perpendicular to the shaft 100. As best shown in FIG. 4, with each bi-polar member 52 has a corresponding spaced apart pair of stator pole surfaces 42, so that each rotor pole element 54 lines up with a corresponding concentric stator pole element 38.

In an embodiment, each rotor pole element 54 comprises a substantially straight inner edge 104 spaced apart from a corresponding inner edge 104 of the adjacent rotor pole element 54 that in combination defines the bi-polar member 52. This spacing corresponds to the spacing between adjacent stator pole surfaces 42 of adjacent stator pole elements 38, with an intermediate saliency groove 106 being defined between the inner edges 104 of the adjacent rotor pole elements 54.

It is clear from FIGS. 7 and 8 that the straight inner edges 104 of the rotor pole elements 54 are strictly speaking circular or arcuate, but flat, edges or faces that are parallel to each other. In other words, each edge 104 forms a plane that is perpendicular to the shaft. This comment applies to all references below to 'straight inner edges' of rotor pole elements.

Each rotor pole element 54 further comprises a shaped outer edge 108 so as to define a shaped, curved rotor pole surface 110 between the inner and outer edges 104, 108, the curved rotor pole surface 110 and the corresponding curved stator pole surface 42 of the corresponding stator pole element 38 defining the uniform air-gap 58 therebetween.

Alternatively, the stator pole surface 42 may be shaped instead of the rotor pole surface 110, but shaped, curved, arcuate rotor pole surfaces 110 are preferable because the area of the pole surface 110 is smaller and therefore the rotor arrangement 34 has less weight. Also, winding rectangular stator poles (i.e. stator stem or leg 62 in this case), is relatively easy.

The concentric field exciter coil 56 encircles the centre of each rotor module 50, so as to excite or polarise the bi-polar member, with the shaped rotor pole surfaces 110 providing, during rotation, a variable area overlap with the adjacent stator pole surfaces 42 thereby varying the flux through the stator pole element 38, which in turn induces a correspondingly shaped emf waveform in the armature winding 40 of the stator pole elements 38.

In an embodiment, as best shown in FIG. 4, each axially arranged rotor module 50 is separately excited by a dedicated concentric field exciter coil 56, each rotor module 50 having its own axially arranged north and south poles to define the bi-polar member 52.

As best shown in FIGS. 5 and 7, the rotor modules 50 are rotationally offset relative to each other so that the ends of the bi-polar members 52 of one rotor module 50, of one polarity, are axially interleaved so as to be circumferentially adjacent, when viewed axially from an end of the shaft (and as best shown in FIG. 5), with respect to the ends of an adjacent bi-polar member 52 of an adjacent rotor module 50, of the opposite polarity.

In an embodiment, as best shown in FIG. 4, each stator module 36 includes a pair of end stator pole elements 38, associated with endmost rotor pole elements 54, and at least one intermediate stator pole element, associated with intermediate rotor pole elements 54. The armature winding 40 around the intermediate stator pole element/s 38 receives an alternating flux/emf due to bipolar induction, to provide the predetermined emf waveform, as described above and in more detail further below. The armature windings 40 around the end stator pole elements 38 each receive single directional flux due to unipolar induction, with the two halves provided by the end stator pole elements 38 having armature windings 40 of opposite polarity being connected in series to define a correspondingly shaped emf (thus effectively corresponding to bipolar induction).

Before describing several specific embodiments, FIG. 14 will be described. As indicated above, as best shown in FIG. 4, the curved rotor pole elements 54 are concentrically arranged relative to the stator pole surfaces 42 so as to define a uniform air-gap 58 therebetween and thus provide a plurality of axially segmented multipolar flux circuits. In this case, the air-gap 58 is a cylindrical air-gap 58.1, as shown schematically in FIG. 14*a*, between a bi-polar element 52.1 and stator pole elements 38.1 to define a closed flux path 112.1. In the prior art, this would sometimes be referred to as a 'radial-flux' or 'transverse-flux' machine. However, as shown in FIG. 14, other air-gap arrangements are envisaged, namely:

a flat or planar air-gap 58.2 geometry, as shown in FIG. 24*b*, between a bi-polar element 52.2 and stator pole elements 38.2 to define a closed flux path 112.2, which may be referred to as an 'axial-flux' machine in the prior art;

a conical air-gap 58.3, as shown in FIG. 14c between a
bi-polar element 52.3 and stator pole elements 38.3 to
define a closed flux path 112.3; or a mixed air-gap 58.4, as shown in FIG. 14d between a
bi-polar element 52.4 and stator pole elements 38.4 to
define a closed flux path 112.4.

Figure 14:
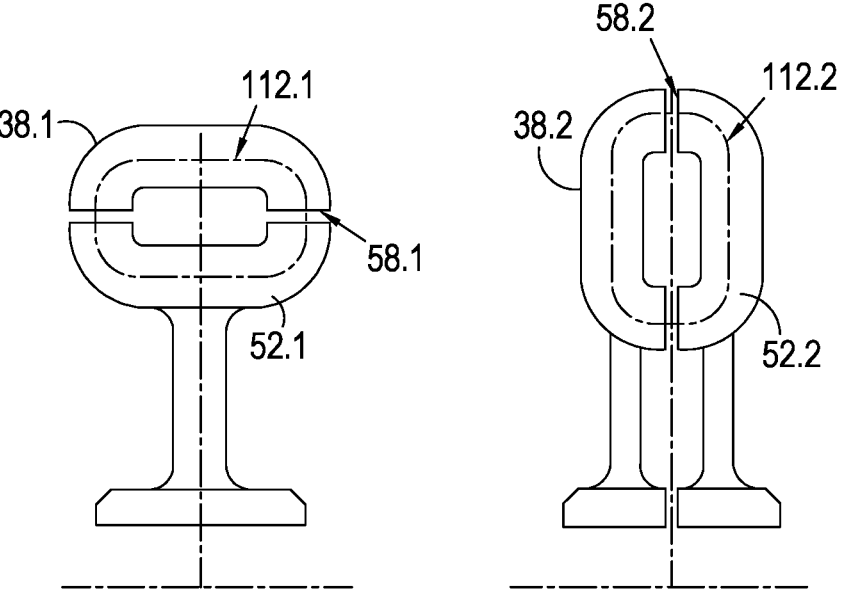
FIG. 14 shows various envisaged air-gaps that may be used in the present invention.
Figure 14:
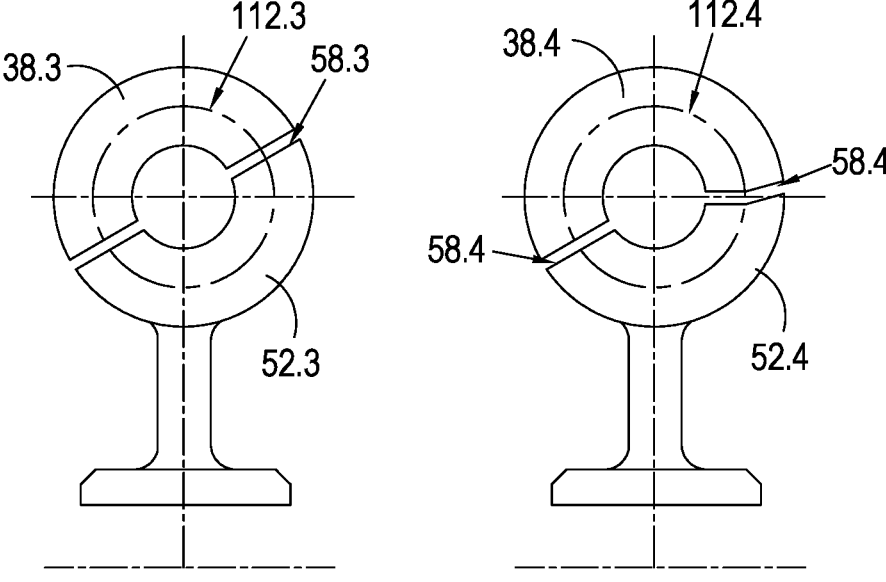

In any event, what FIG. 14 aims to convey is that the
toroidal flux circuit may be split into two parts by introduc-
ing two air-gaps, one part being stationary and the other
being rotary (or linearly movable in case of a linear
machine).

The machine 30 described above with particular reference
to FIGS. 2 to 10 is thus a two rotor (i.e. two rotor modules
50), four pole (i.e. four rotor pole elements 54 per rotor
module 50) machine. As such, and as described above, each
rotor module 50 comprises two diametrically arranged,
curved bi-polar members 52, each curved bi-polar member
52 defining an arc of 90 degrees mechanical, when viewed
axially from the end, with there being a corresponding sector
gap 116 (shown in FIG. 8) defined between the curved
bi-polar members 52. As will be appreciated, two rotor
modules 50 also means two field coils 56 (as shown in FIG.
3).

In this embodiment, adjacent rotor modules 50 are offset
by 180 degrees (electrical) so that the curved bi-polar
members 52 of one rotor module 50 interleave with the
curved bi-polar members 52 of an adjacent rotor module 50
so as to occupy (or at least partly occupy) the sector gaps 116
defined in the adjacent rotor module 50 (as best shown in
FIG. 5). In particular, the interleaving curved rotor pole
elements 54 of adjacent rotor modules 50 have adjacent
poles of opposite polarities to produce bipolar induction (as
best shown in FIG. 4).

Figure 15A:
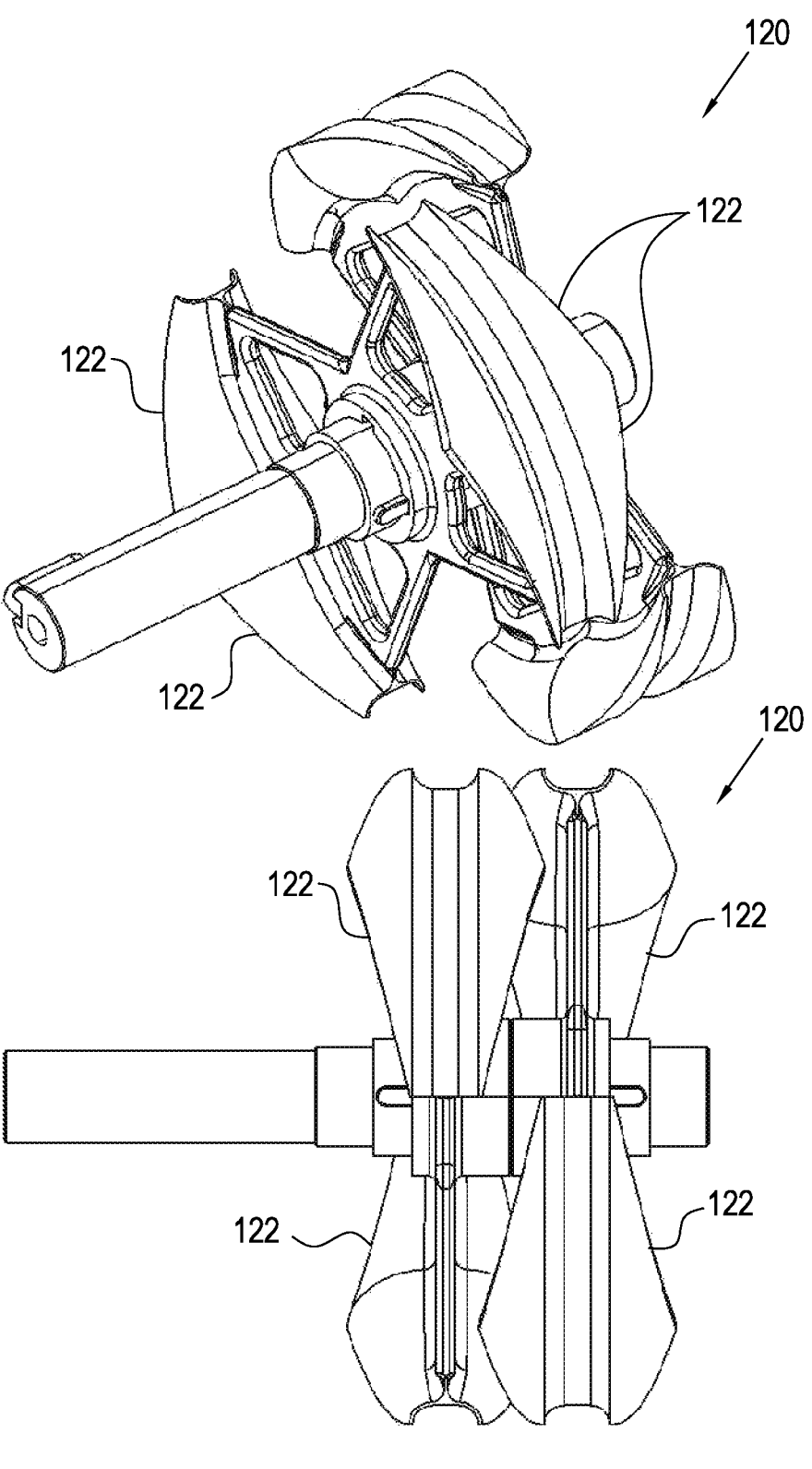
FIG. 15 shows various additional shapes of possible of rotor pole elements.
Figure 15B:
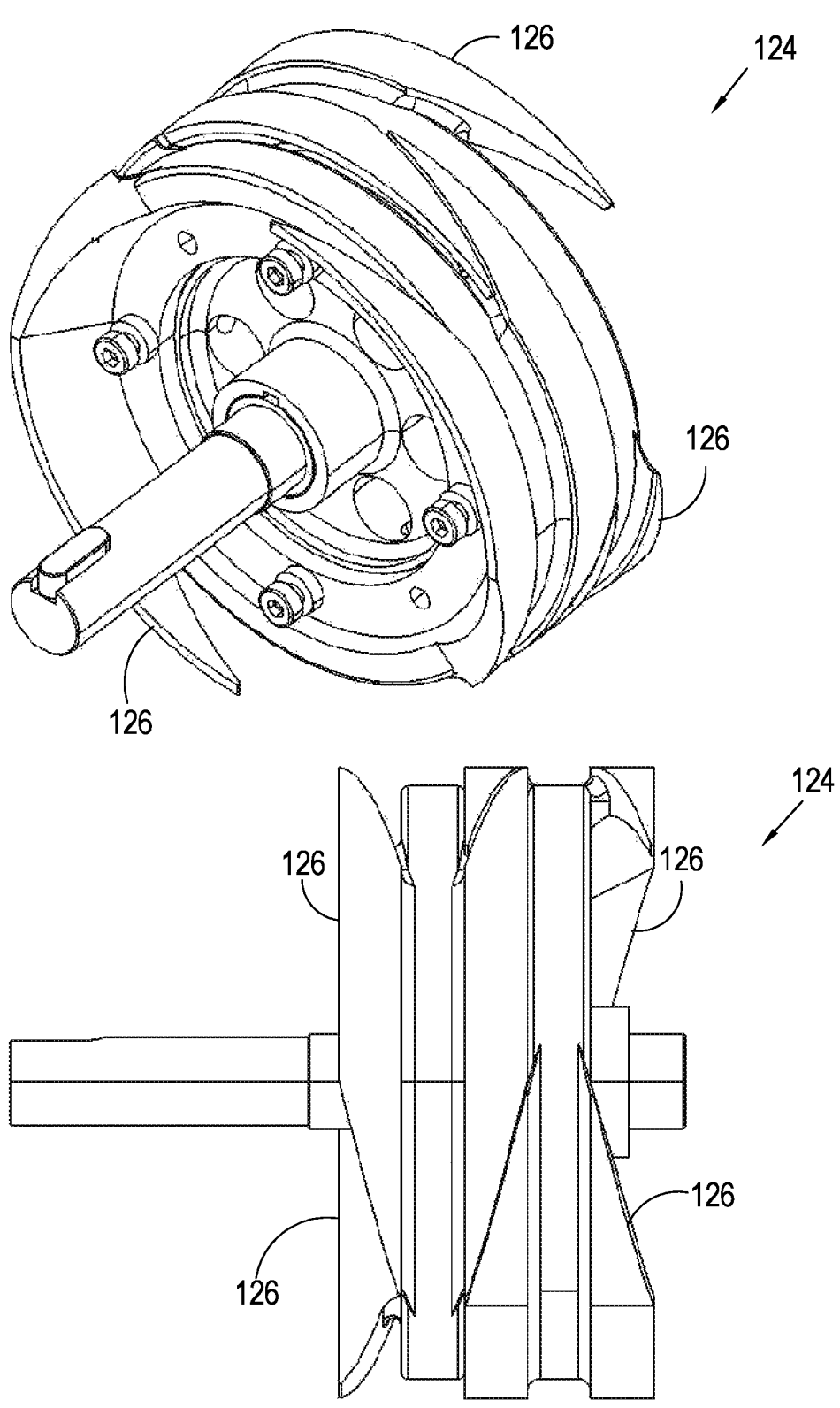
Figure 15C:
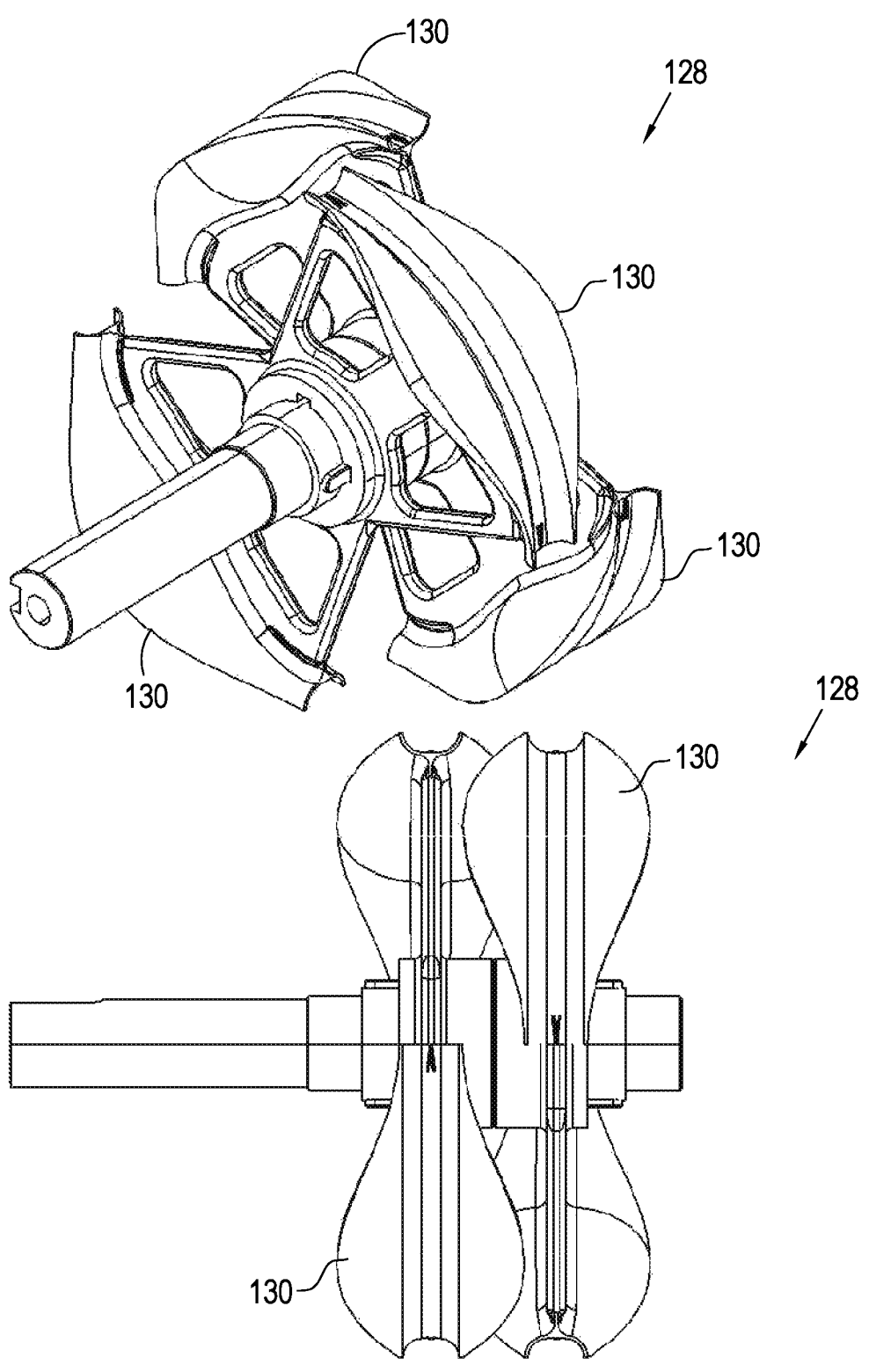

In a first version of this embodiment, as best shown in
FIGS. 7 and 8, the shaped outer edges 108 of the rotor pole
elements 54 are curved to ultimately define a sinusoidal emf.
Other shapes are envisaged and possible. For example, FIG.
15a shows a 4-pole arrangement 120, in which the shaped
outer edge 122 of the rotor pole element 54.1 of each rotor
module 50.1 is triangular to ultimately define a triangular
emf. FIG. 15b shows a 4-pole arrangement 124, in which the
shaped outer edge 126 of the rotor pole element 54.2 of each
rotor module 50.2 is a parallelogram, to ultimately define a
triangular or double trapezoidal (truncated triangles) emf. In
yet another version, FIG. 15c shows a 4-pole arrangement
128, in which the shaped outer edge 130 of the rotor pole
element 54.3 of each rotor module 50.3 is a full sinusoid, to
ultimately define a double sinusoidal emf.

In yet another embodiment, although not illustrated, a
two-pole rotor arrangement may be provided. In this case,
each rotor module 50 comprises one curved bi-polar mem-
ber 52 (instead of the two shown in FIG. 7) that defines an
arc of 180 degrees, with a counterweight arrangement being
provided to balance the rotating shaft.

Depending upon the number N of rotor modules 50, the
machine may be termed an N-stage machine i.e. 2 rotor
modules 50 (as shown in FIG. 4, for example) corresponds
to a 2-stage machine, 3 rotor modules corresponds to a
3-stage machine etc. The corresponding number of stator
pole elements 38 would be N+1. The minimum configura-
tion of this class of machine would be two stages; it is
preferable to have an even number of stages, since with an
odd number of stages, the stator end-coils will introduce
harmonics in the emf waveform.

Figure 16:
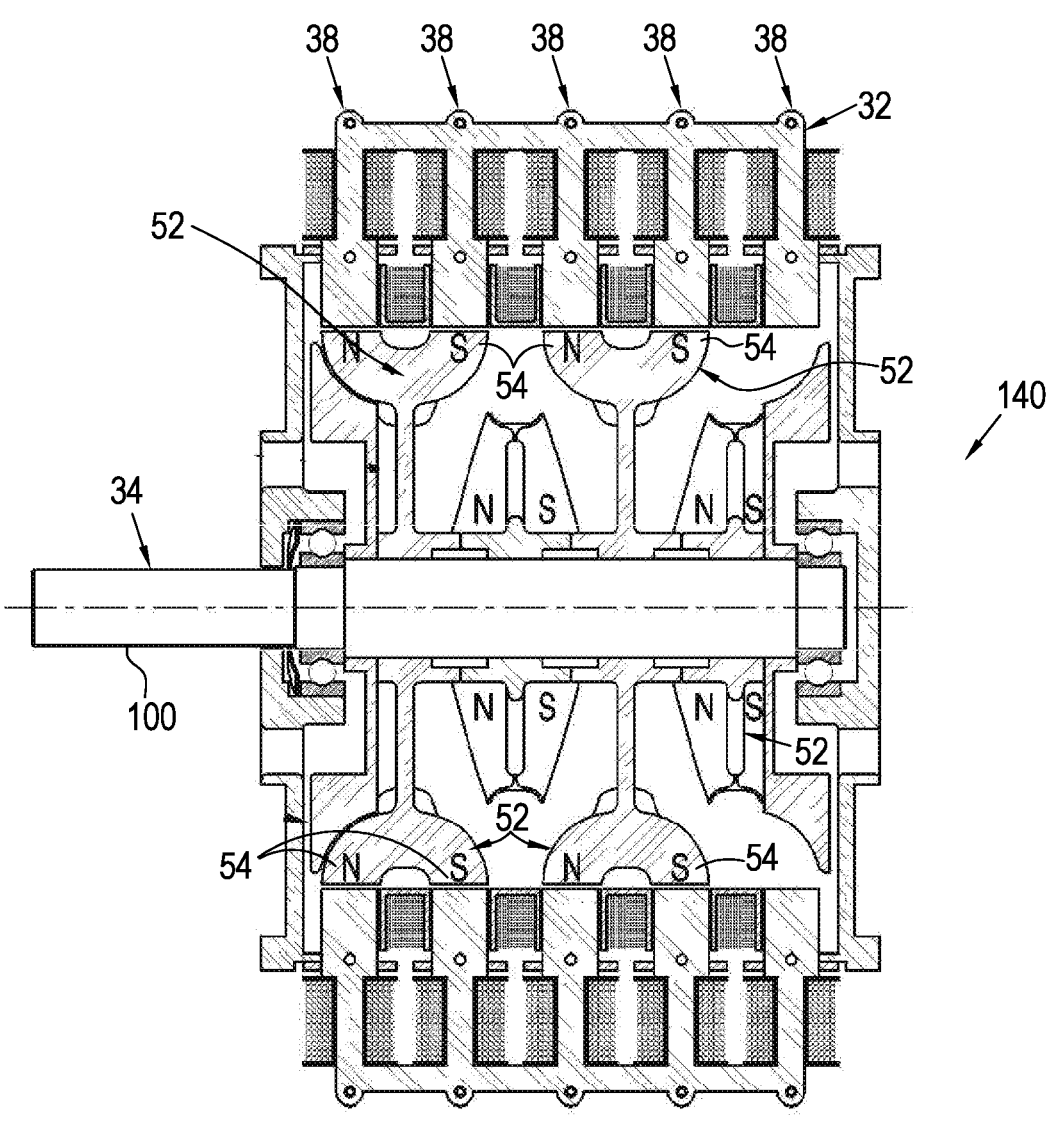
FIG. 16 shows a cross-sectional side view of a 4-pole, 4-stage machine, according to a further embodiment of the invention.

FIG. 16 thus shows a 4-pole, 4-stage machine 140. This
machine 140 is however substantially similar, in structure
and operation, to the machine 30 shown in FIG. 4 in particular, except for an additional axially arranged rotor
module 50 carrying a pair of bi-polar members 52, and an
additional axially arranged spaced apart stator pole element
38. The remaining components are substantially as
described above, and will thus not be described again in
more detail. The number of circumferentially arranged stator
modules 36 would depend upon the number of phases.
Again, the outer edges of the rotor pole elements 54 may
have various shapes, including curved to ultimately define a
sinusoidal emf, triangular to ultimately define a triangular
emf, a parallelogram to ultimately define a triangular or
double trapezoidal emf (depending on the gaps between the
poles as well as the stator poles, as explained in more detail
further below) or a full sinusoid, to ultimately define a
double sinusoidal emf.

FIGS. 17 to 22 show various views of a 4-pole, 2-phase,
8 stage machine 150. This machine 150 is however substan-
tially similar, in structure and operation, to the machine 30
shown in FIG. 4 in particular (except that this is a 2-phase
machine i.e. 2 stator modules per pole (in the 3-phase
machine in FIG. 4, two poles are shared by 3 stator mod-
ules)). As is clearly shown and would be expected, there are
8 axially arranged rotor modules 50 carrying a pair of
bi-polar members 52, and 9 axially arranged spaced apart
stator pole elements 38. The remaining components are
substantially as described above, and will thus not be
described again in more detail.

Again, the outer edges of the rotor pole elements 54 of this
machine 150 may have various shapes, including curved to
ultimately define a sinusoidal emf, triangular to ultimately
define a triangular emf, a parallelogram to ultimately define
a triangular or double trapezoidal emf or a full sinusoid, to
ultimately define a double sinusoidal emf.

Figure 19:
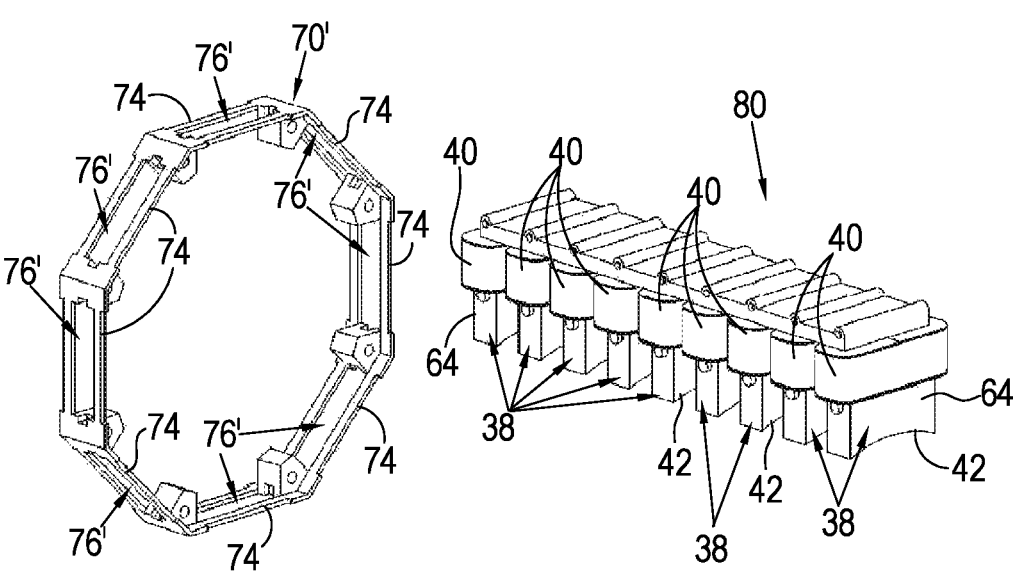
FIG. 19 shows a perspective view of one of the stator frame modules that can be joined together to define the fully assembled stator arrangement shown in FIG. 18 for the machine shown in FIG. 17, and a perspective view of a phase armature module for insertion into the stator frame modules as shown in FIG. 18.
Figure 20:
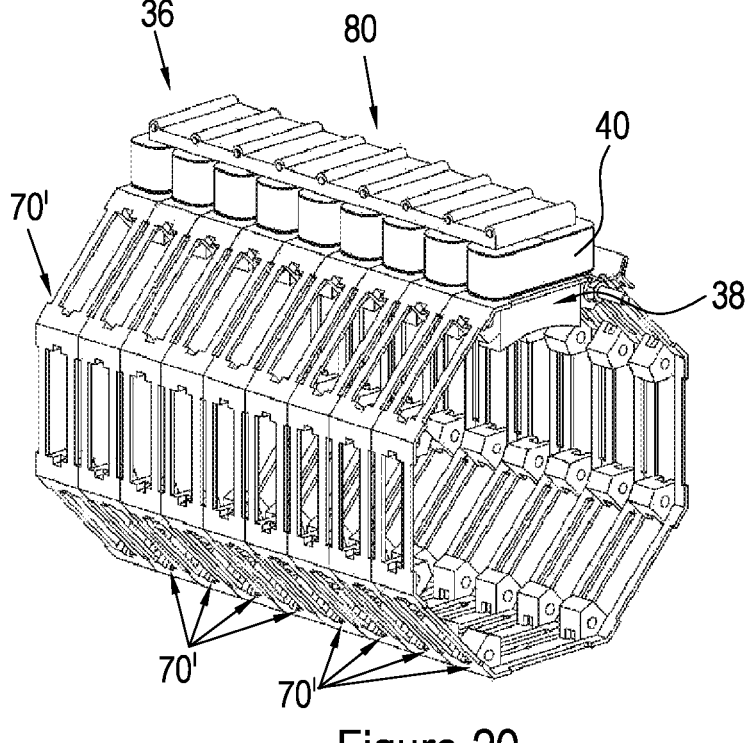
FIG. 20 shows a plurality of the stator frame modules in FIG. 19 joined together, with one phase armature module being shown inserted.

As best shown in FIGS. 18 to 22, this machine 150 has 8
circumferentially arranged stator modules 36. As best shown
in FIGS. 19 and 20, the stator arrangement 32 comprises a
plurality of axially arranged polygonal (octagonal in this
case) stator frame modules 70' joined together to define an
enclosed stator body. Each stator frame module 70' com-
prises a plurality of stator frame module components 74
corresponding to the number of circumferentially arranged
stator modules 36; in this version, there are eight stator
frame module components 74, one per circumferentially
arranged stator module 36. Each stator frame module com-
ponent 74 defines an aperture or slot 76' to accommodate a
stator pole element 38, as best shown in FIG. 20.

As best shown in FIG. 19, and as already described above,
a plurality of the axially arranged spaced apart stator ele-
ments 38 may be joined together to form a phase armature
module 80. The phase armature module 80 thus extends
longitudinally along the length of the machine 30, as best
shown in FIGS. 18 and 20. Advantageously, this allows the
armature modules 80 to be mounted externally (i.e. from the
outside) to the stator arrangement 32. The armature module
80 essentially defines a comb-like structure, with each leg of
the comb corresponding to a stator pole 64, as described
above.

Figure 17:
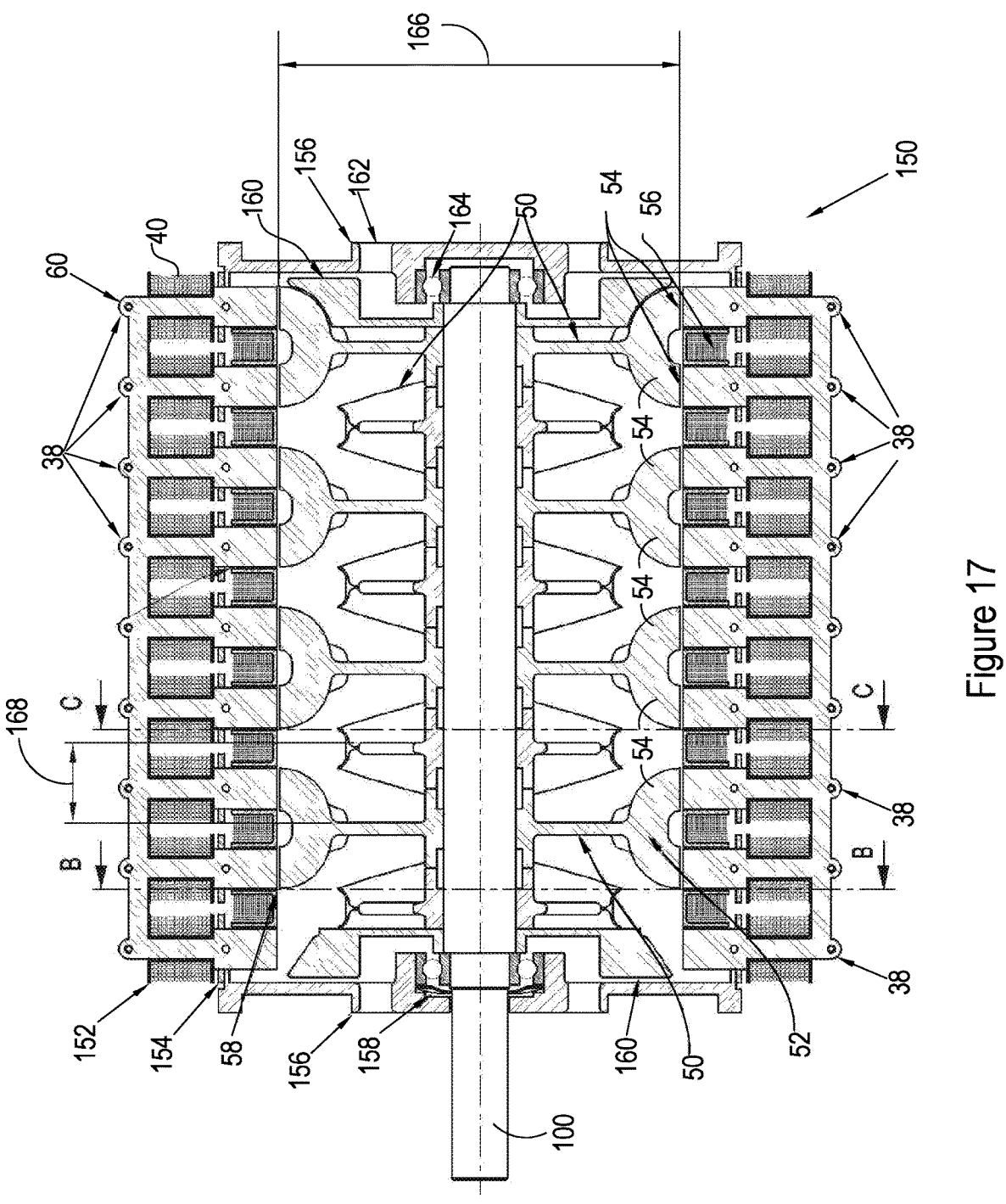
FIG. 17 shows a cross-sectional side view of a 4-pole, 8-stage, 2-phase machine, according to a further embodiment of the invention.
Figure 18:
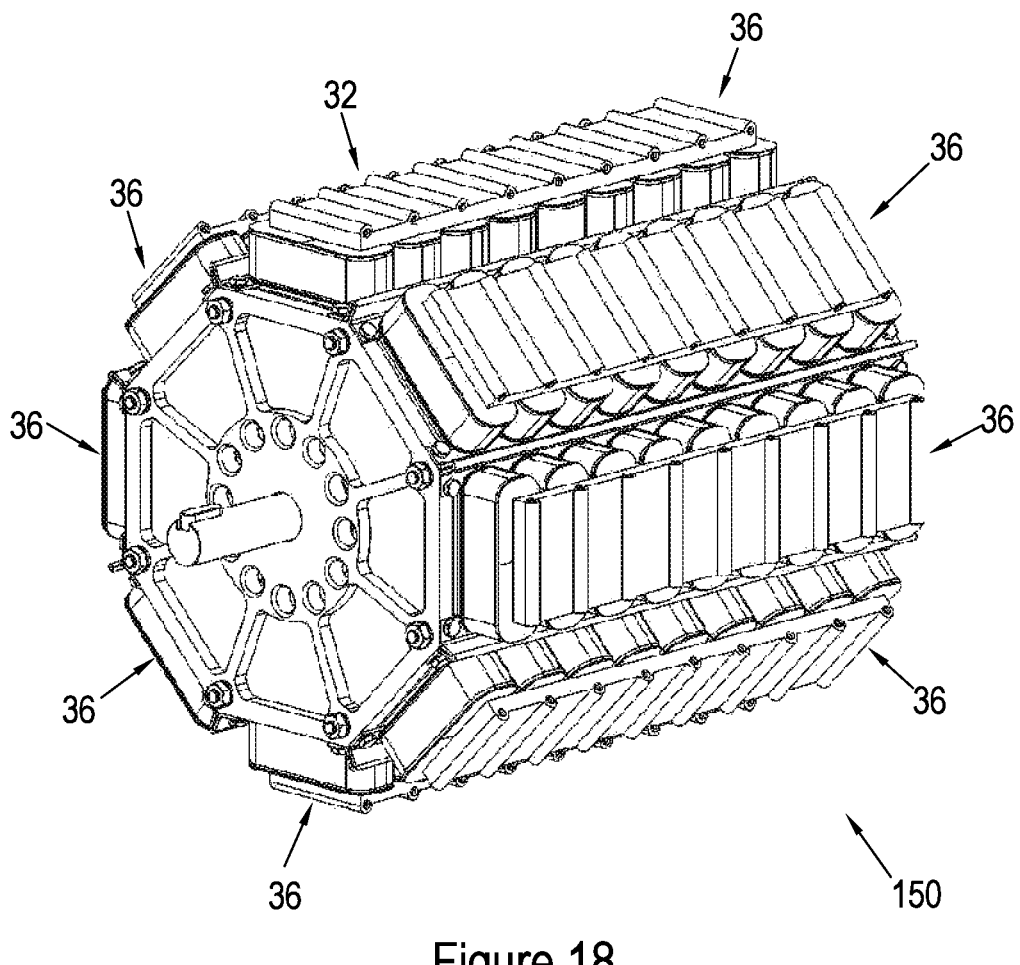
FIG. 18 shows a perspective view of the fully assembled 8-stage machine shown in FIG. 17.

FIG. 17 shows a number of additional structural features,
which apply to machines 30 and 140 as well. These features
include a coil bobbin 152 to accommodate the armature
winding 40, and an armature support 154 to support the
armature modules 80. Additional features include covers
156 on either end, a bearing arrangement 158 and cooling
fans 160 (and related cooling air intakes 162) on either end.
The other end of the shaft 60 is accommodated by a bearing
arrangement 164. The rotor diameter is indicated by dimension line 166, and the axial pitch of the field poles 54 is indicated by dimension line 168.

Figure 22:
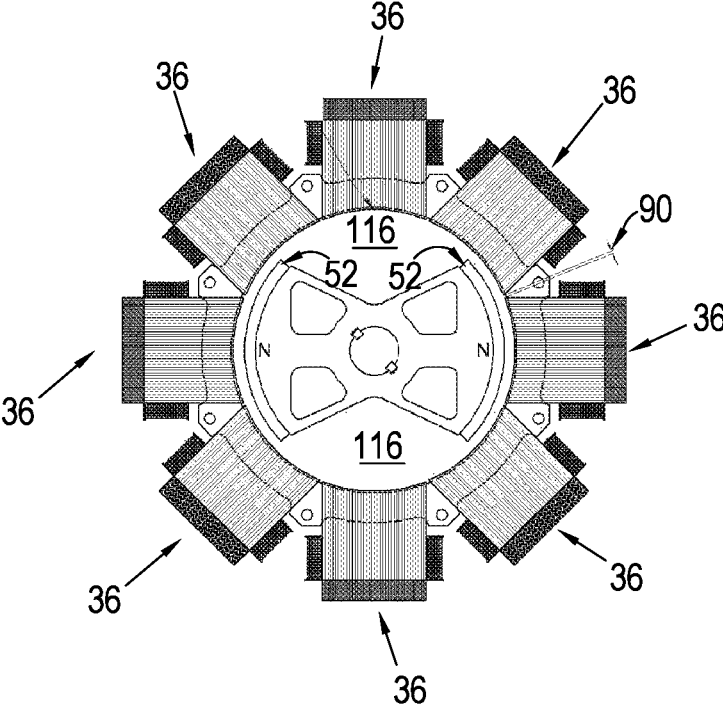
FIG. 22 shows an intermediate segment of the machine shown in FIG. 17, taken along line B-B in FIG. 17.
Figure 23:
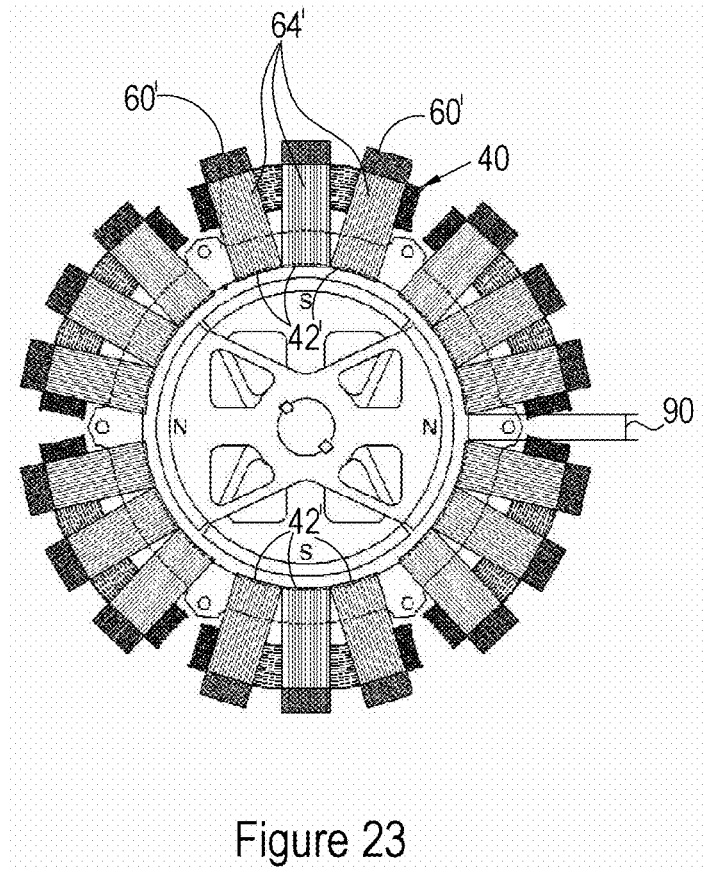
FIG. 23 shows a schematic end view of another version of the armature phase module, and in particular a segmented armature phase module, to define a 3 phase machine of the type shown in FIG. 17.

FIGS. 22 and 23 shows a circumferential gap 90, of the type described above, between the circumferentially arranged stator modules 36 to accommodate a pick-up sensor-coil core-element to determine position/speed.

Figure 21:
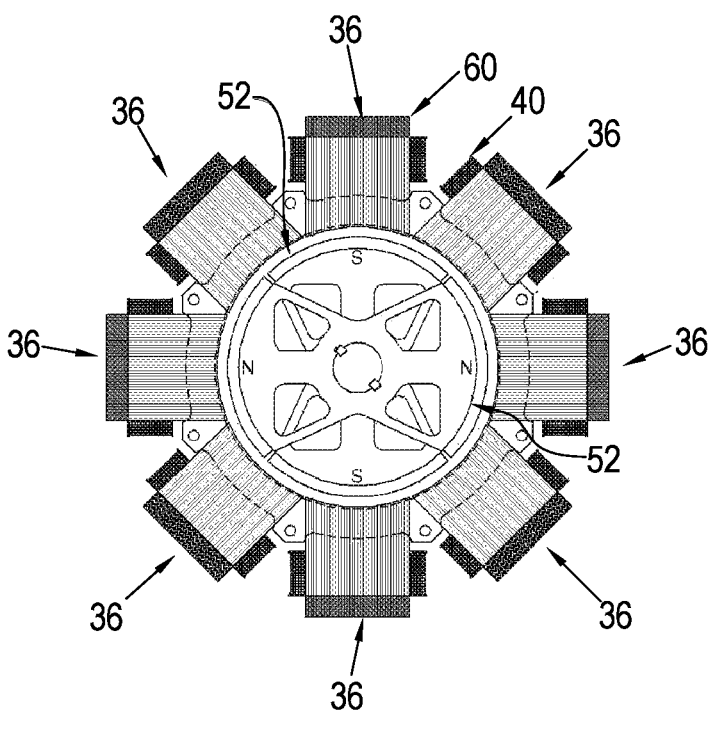
FIG. 21 shows an intermediate segment of the machine shown in FIG. 17, taken along line C-C in FIG. 17.

FIG. 23 itself is similar to FIG. 13, in that it shows a segmented armature phase module 80' (when compared to the unitary phase module 80 shown in FIG. 21). The armature phase module 80' comprises a plurality of radial, segmented stator poles 64' and stator yokes 60' surrounded by the armature winding 40, but which are circumferentially arranged so that their curved stator pole surfaces 42' nonetheless still define a substantially cylindrical stator pole surface 42'.

In the various versions described above, the rotor pole elements 54 are cast elements. FIGS. 24 to 30 show various views of 2-stage, 4-pole rotor arrangements comprising laminated rotor pole elements. Again, although the outer edges of the laminated rotor pole elements in these figures are curved, to ultimately define a sinusoidal emf, the other shapes described above may also be provided, namely triangular to ultimately define a triangular emf, trapezoidal to ultimately define a triangular or double trapezoidal emf or a full sinusoid, to ultimately define a double sinusoidal emf.

Figures 24, 25:
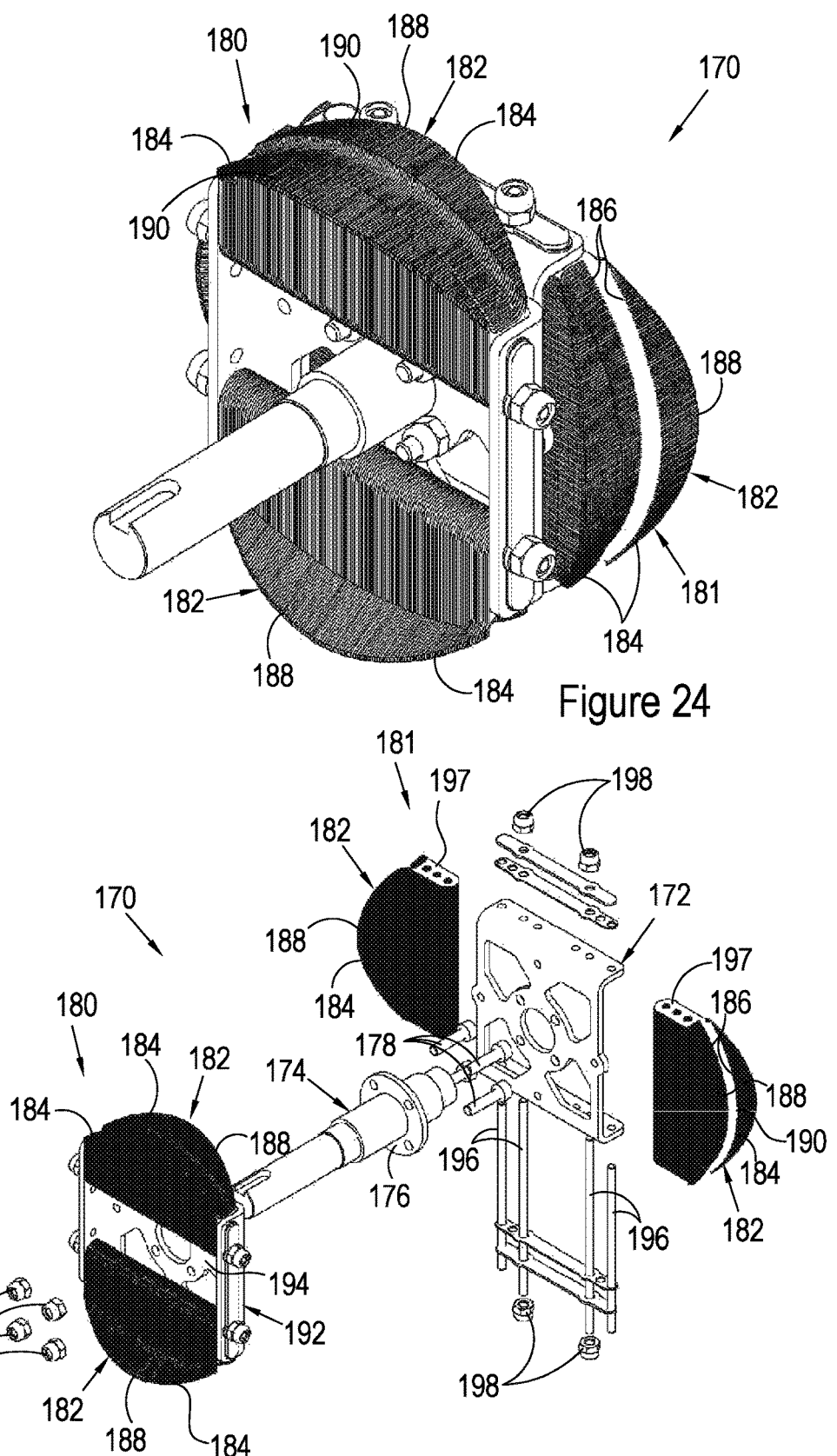
FIGS. 24 and 25 show perspective views of a rotor arrangement comprising laminated rotor elements, according to a first version.

In FIGS. 24 and 25, the rotor arrangement 170 comprises a pole arm support plate 172 to which a shaft 174 may be secured. The shaft 174 has a base flange 176 which may be secured to the support plate 172 with bolts 178 (and related nuts 179). The rotor arrangement 170 comprises a pair of axially arranged rotor modules 180, 181, each rotor module 180, 181 comprising two circumferentially arranged, curved (or arcuate, sector-cylindrical) laminated bi-polar members 182. Each bi-polar member 182 in turn comprises a pair of curved rotor pole elements 184, each rotor pole element 184 in turn comprising a substantially straight inner edge 186 spaced apart from a corresponding inner edge 186 of the adjacent rotor pole element 184 that in combination defines the bi-polar member 182. Each rotor pole element 184 further comprises a shaped outer edge 188 so as to define a shaped, curved rotor pole surface 190 between the inner and outer edges 186, 188.

The bi-polar members 182 of rotor module 180 are fitted to an assembly 192 comprising a central hub 194 that also gets secured to the pole arm support plate 172 with the bolts 178. The bi-polar members 182 of rotor module 181 are fitted directly to the pole arm support plate 172, with bolts 196 that extend through a holder 197, and related nuts 198.

Figures 26, 27:
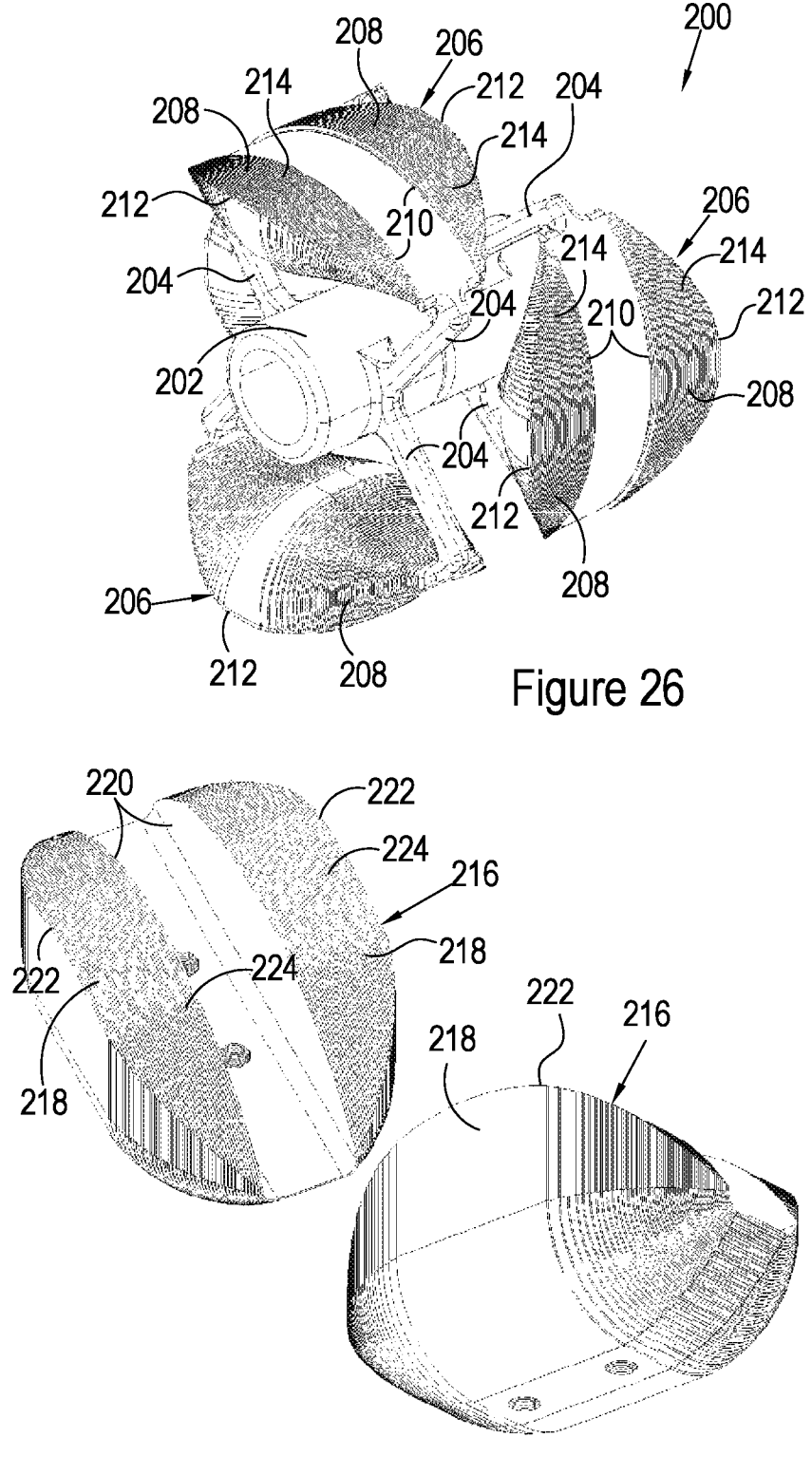
FIG. 26 shows a perspective view of a rotor arrangement comprising laminated rotor elements, according to another version.
FIG. 27 shows a perspective view of a rotor arrangement comprising laminated rotor elements, according to yet another version.

In FIG. 26, the rotor arrangement 200 comprises a shaft 202 from which a plurality of arms 204 extend to support the ends of curved laminated bi-polar members 206. Again, each bi-polar member 206 in turn comprises a pair of curved rotor pole elements 208, each rotor pole element 208 in turn comprising a substantially straight inner edge 210 spaced apart from a corresponding inner edge 210 of the adjacent rotor pole element 208 that in combination defines the bi-polar member 206. Each rotor pole element 208 further comprises a shaped outer edge 212 so as to define a shaped, curved rotor pole surface 214 between the inner and outer edges 210, 212. The laminations in this version have a complex curvature i.e. they are bent in two planes.

FIG. 27 shows two views of a laminated bi-polar members 216. Each bi-polar member 216 in turn comprises a pair of curved rotor pole elements 218, each rotor pole element 218 in turn comprising a substantially straight inner edge 220 spaced apart from a corresponding inner edge 220 of the adjacent rotor pole element 218 that in combination defines the bi-polar member 216. Each rotor pole element 218 further comprises a shaped outer edge 222 so as to define a shaped, curved rotor pole surface 224 between the inner and outer edges 220, 222. The laminations in this version have simple bends (unlike the complex curvature in FIG. 26). Although this version uses more lamination material, this is offset by a shorter support arm (from the shaft) as the saliency is necessarily deeper due to the straight groove bottom. In addition, this version is relatively simpler and easier to manufacture.

Figures 28, 29:
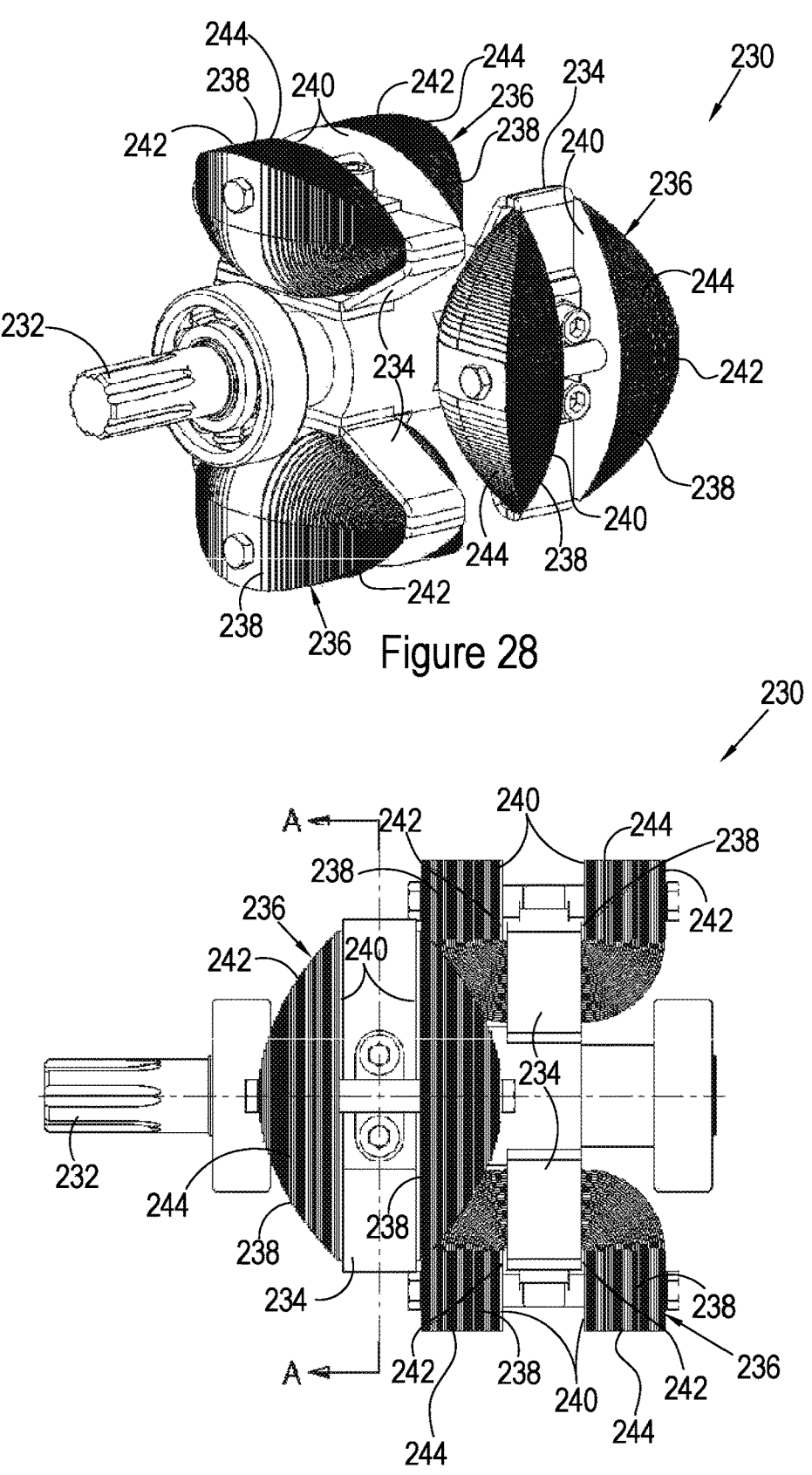
FIGS. 28 to 30 show perspective views of a rotor arrangement comprising laminated rotor elements, according to yet a further version.
Figure 30:
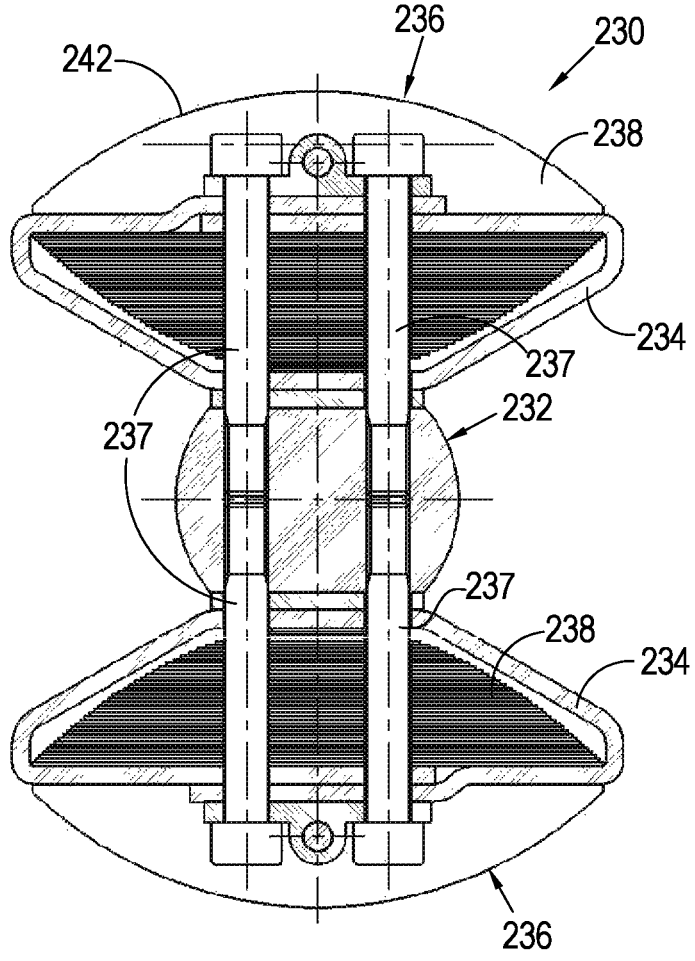

In FIGS. 28 to 30, the rotor arrangement 230 comprises a shaft 232 from which damper rings 234 extend. Each bi-polar member 236 (and the damper rings) are retained by bolts 237 that are screwed into the shaft 232, as best shown in FIG. 30. Again, each bi-polar member 236 in turn comprises a pair of curved rotor pole elements 238, each rotor pole element 238 in turn comprising a substantially straight inner edge 240 spaced apart from a corresponding inner edge 240 of the adjacent rotor pole element 238 that in combination defines the bi-polar member 236. Each rotor pole element 238 further comprises a shaped outer edge 242 so as to define a shaped, curved rotor pole surface 244 between the inner and outer edges 230, 232.

Regarding the damper ring 235 feature, conventional alternators (bigger units for electric power production) usually have a set of rods sunk in the face of the poles (or simply a squirrel cage like that is used on an induction motor). These dampers are required in that for any changing load the flux variation in the stator coils will cause fluctuations in the rotor core. This is undesirable as 'hunting' results where the rotor oscillates torsionally. The damper ring 235 is relatively simple and does not require slots as all the flux threads through it.

Figure 31:
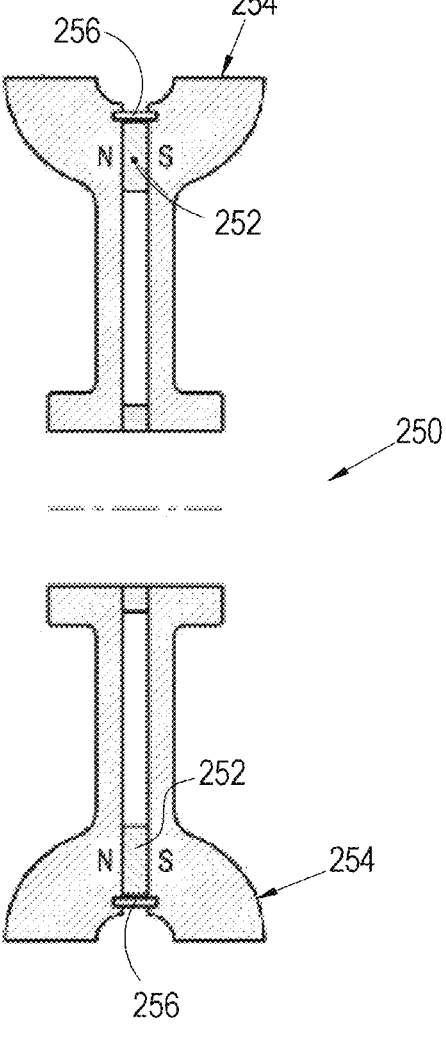
FIG. 31 shows a cross sectional view of a modified rotor module, in which a permanent magnet is embedded to provide the required magnetic field excitation.

FIG. 31 shows a cross sectional view of a modified rotor module 250, in which a permanent magnet 252 is embedded within the bi-polar members 254 to provide the required magnetic field excitation. This arrangement may be used instead of or in conjunction with the stationary concentric field exciter coil 56 described above. A magnet retainer 256 is provided to prevent the magnets 252 from flying off due to centrifugal acceleration.

Figure 32:
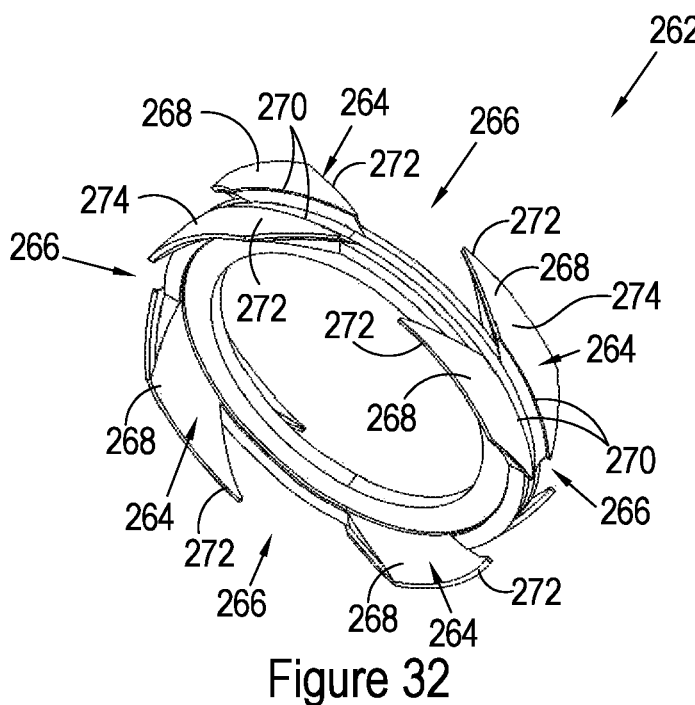
FIG. 32 shows a perspective view of an 8-pole rotor module.
Figure 33:
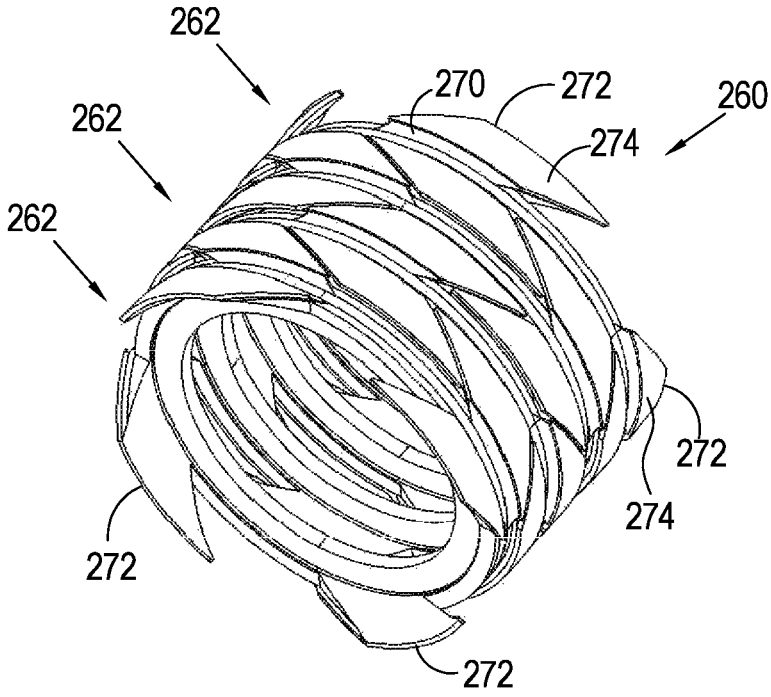
FIG. 33 shows an 8-pole, 4-stage rotor assembly comprising four of the rotor modules shown in FIG. 32 adjacent each other.

The figures so far have all shown 4-pole rotor arrangements. However, an 8-pole rotor arrangement 260 may be used, as shown in FIGS. 32 and 33. In this embodiment, each rotor module 262 comprises four circumferentially arranged, equally spaced curved bi-polar members 264, each defining an arc of 45 degrees mechanical (when viewed axially, from an end of the shaft), with there being four corresponding sector gaps 266 defined between adjacent curved bi-polar members 264.

In this embodiment, adjacent rotor modules 262, as shown in FIG. 33, are circumferentially offset by 45 degrees mechanical so that the curved bi-polar members 264 of one rotor module 262 interleave with the curved bi-polar members 264 of an adjacent rotor module 262 (so as to occupy (or at least partly occupy) the sector gaps 266 defined in the adjacent rotor module 262).

Each bi-polar member 264 comprises a pair of spaced apart rotor pole elements 268, each of which comprises a substantially straight inner edge 270 spaced apart from a corresponding inner edge 270 of the adjacent rotor pole element 268 that in combination defines the bi-polar member 264. Each rotor pole element 268 further comprises a shaped outer edge 272 so as to define a shaped, curved rotor pole surface 274 between the inner and outer edges 270, 272.

In this illustrated version, the shaped outer edge 272 is a parallelogram, to ultimately define a double trapezoidal emf.

As indicated above, other envisaged shapes include a curve to ultimately define a sinusoidal emf, triangular to ultimately define a triangular emf, or a full sinusoid, to ultimately define a double sinusoidal emf.

Again, although the rotor pole elements 268 are shown as cast rotor pole elements, they may also be laminated rotor pole elements.

Although not shown, other rotor arrangements are possible. In one such example, 3 bi-polar members may be provided, in which case a two-phase machine may be constructed having 6 armature stator modules, or a single phase machine having 3 armature stator modules. In this case, each bi-polar member is spaced 120° mechanical but arcing 60° mechanical, to make space for the interleaving 60° degree poles of the adjacent rotor module.

Figure 34:
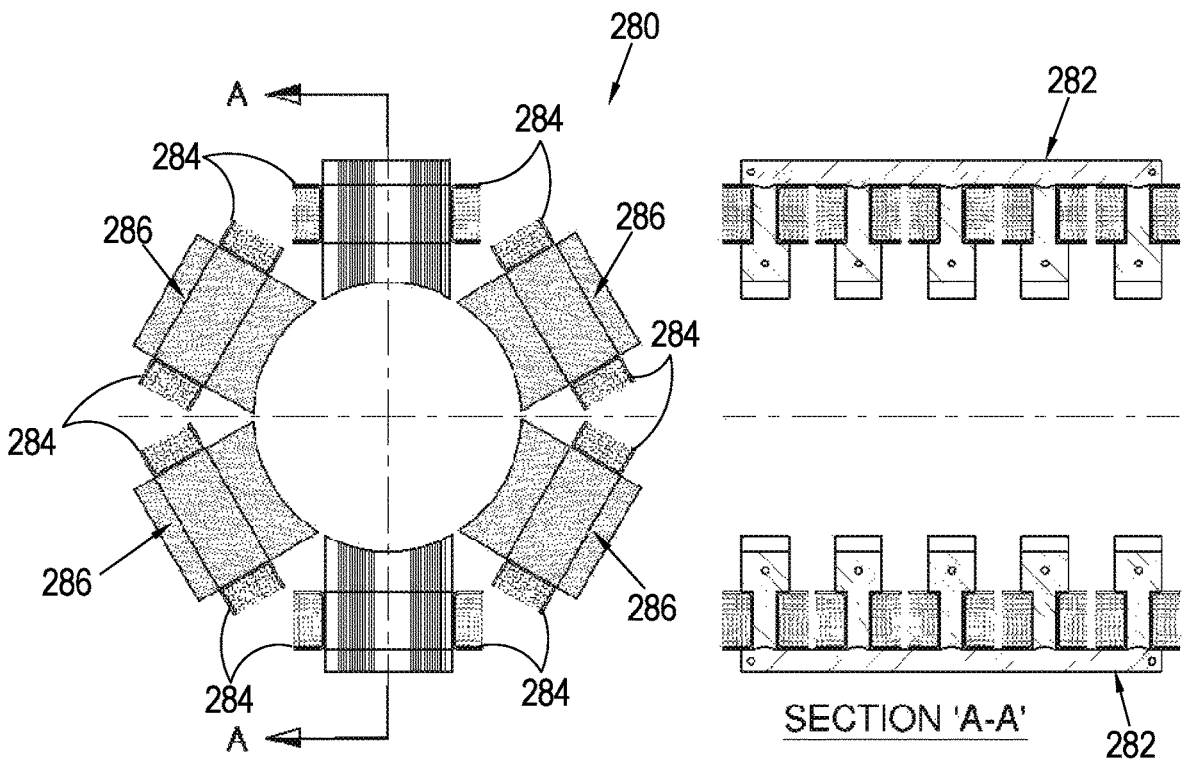
FIGS. 34 to 36 show various stator assemblies of varying sizes, namely a small diameter stator in FIG. 34, an intermediate diameter stator in FIG. 35 and a large diameter stator in FIG. 36.
Figure 35:
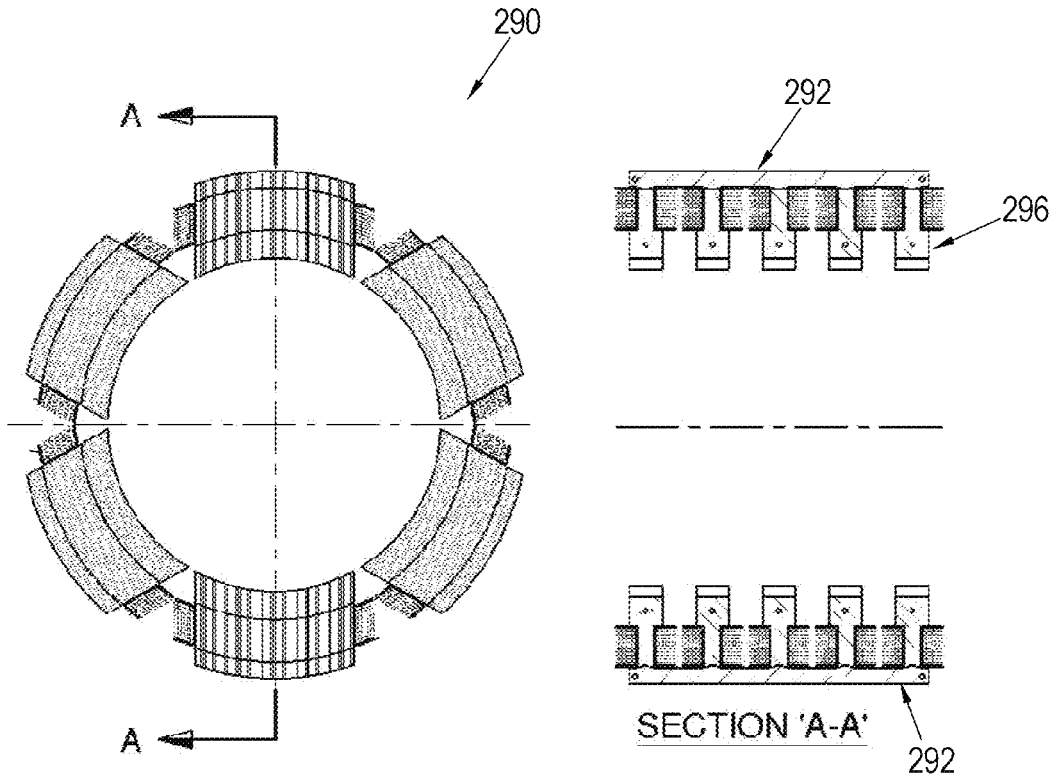
Figure 36:
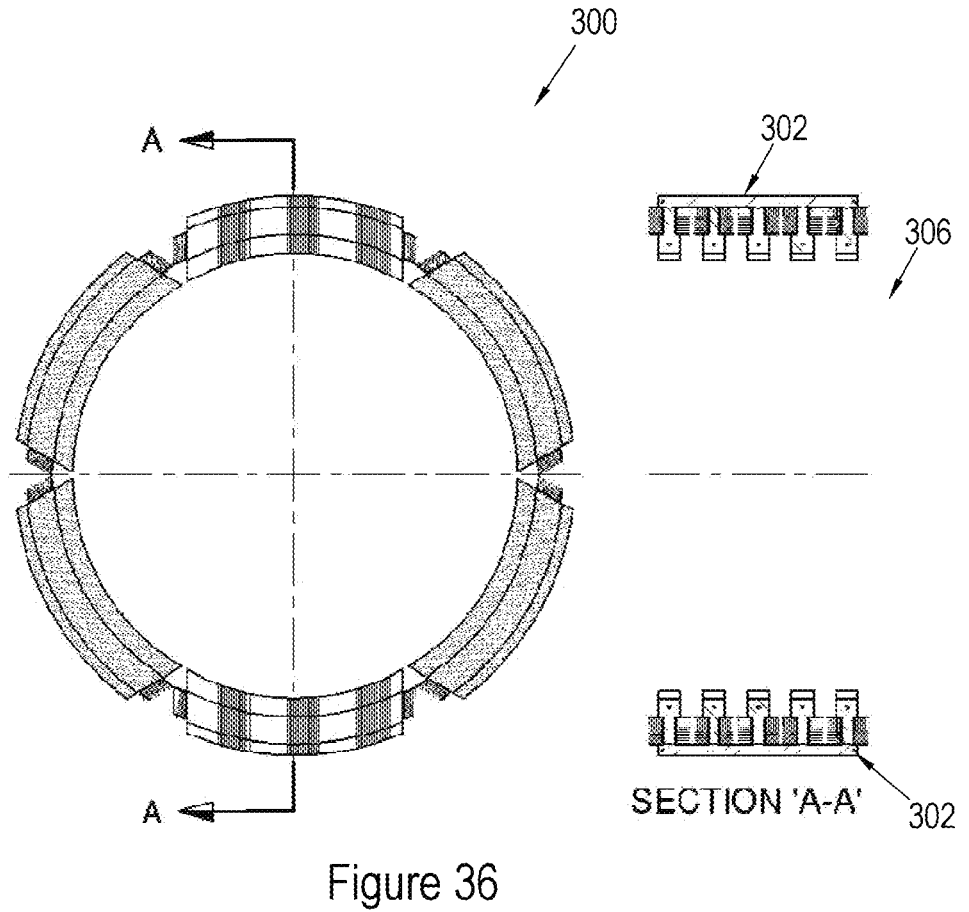

FIGS. 34 to 36 show various stator assemblies of varying sizes, namely a small diameter stator 280 in FIG. 34, an intermediate diameter stator 290 in FIG. 35 and a large diameter stator 300 in FIG. 36. The three drawings are scaled differently to fit the document format. However, the pole elements 282, 292, 302 are of equal axial length and therefore the flux circuit path is more or less the same length for all three assemblies 280, 290, 300.

The small diameter stator 280 in FIG. 34 is sized with a minimum possible rotor diameter if the coil bobbins 284 are not to clash, as best shown in the front view. The other two stators 290, 300 have larger shafts while the height of the phase modules 296, 306 is kept the same. This means it is possible to make very light motors of the annular type as shown (with the large hole or spokes in the centre being suitable for many applications such as aircraft, ship thrusters, turbo-alternators, etc.). The laminations of the small diameter stator 280 are shown stacked in line and the bore machined (or the laminations stepped but varying in height), while those of the larger units 290, 300 are all the same but stacked to form an arc (all laminations the same size and final machining to a smooth bore is minimum). The stator laminations 286 are stacked in an arc, and thus the stator support frame may be cylindrical with appropriate slots to accommodate the stator pole elements 282.

FIGS. 34, 35 and 36 show the unique design flexibility of the technology of the present invention. Axial segmentation of the magnetic circuit can lead to very light machines and that the number of poles is independent and may be chosen as any desired number (as mentioned in one of the objectives of this invention).

Figure 37:
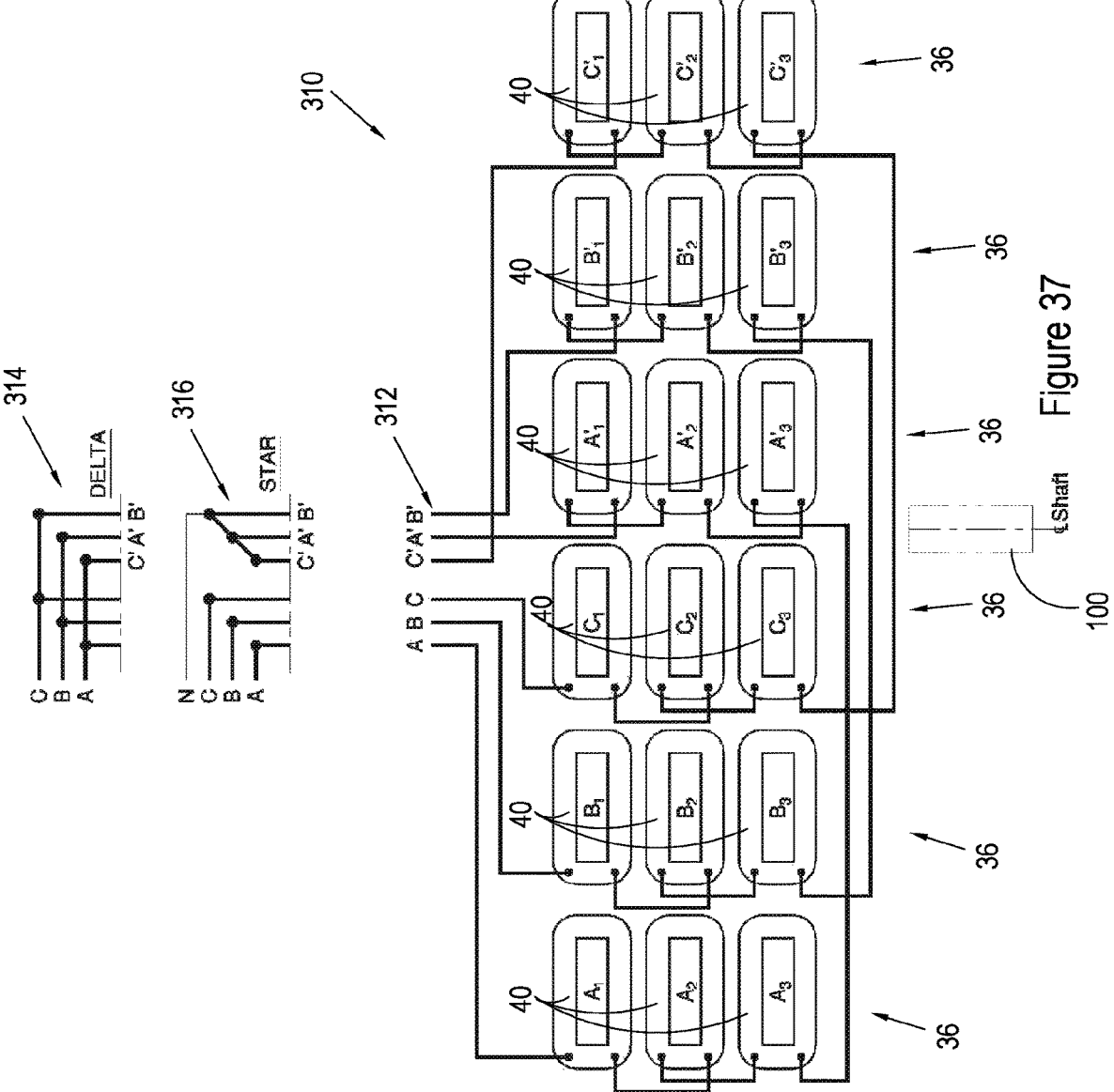
FIG. 37 shows a winding diagram for the 3-phase machine shown in FIGS. 2 to 6.

FIG. 37 shows a winding diagram 310 for the 3-phase machine shown in FIGS. 2 to 6. Each of the six stator modules 36 around the shaft 100 are shown, as well as the armature windings 40 around each stator stem 62. The ends of the armature windings 40 are shown at 312, which may ultimately be connected to form either a 3-phase delta connection 314 or a 3-phase star connection 316. Like phases are shown wired in series, however a parallel connection is also possible.

Figure 38:
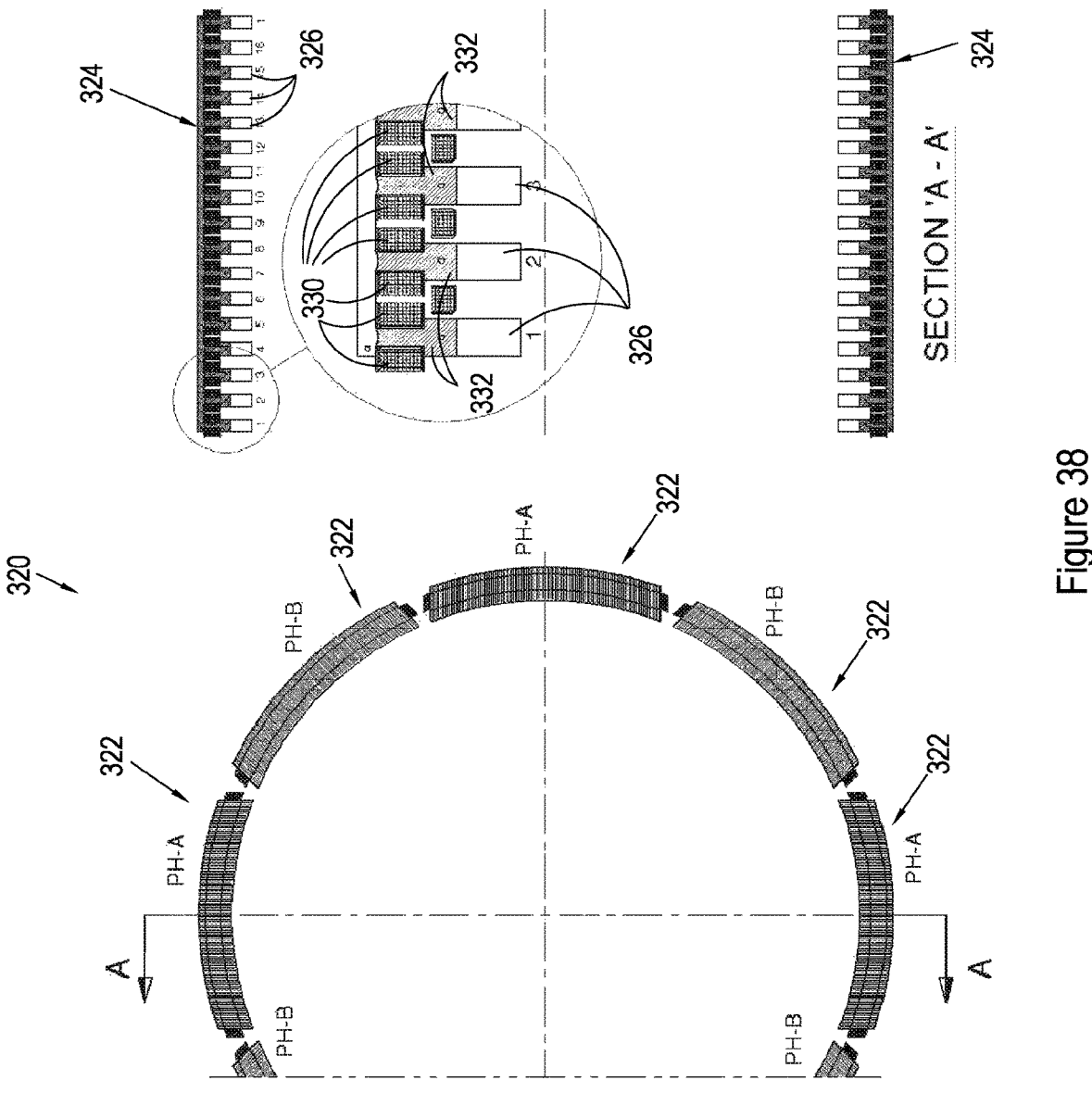
FIG. 38 shows a 2-phase, 4-pole, 16-stage DC wind turbine stator, according to another embodiment of the invention.

FIG. 38 shows a 2-phase, 4-pole, 16-stage wind turbine stator 320, according to another embodiment of the invention. This stator 320 is particularly suitable for wind-turbine alternators, particularly so called direct driven type, in that the alternator can have a low pole count and yet be axially segmented with a large diameter; it thus represents a high-power density machine with a very high-quality current waveform output, as will be described in more detail further below. This particular stator 320 comprises eight circumferentially arranged stator modules 322, each phase armature module 324 comprising sixteen axially arranged spaced apart stator pole elements 326. These components have already been described above and will thus not be described again.

Figure 39:
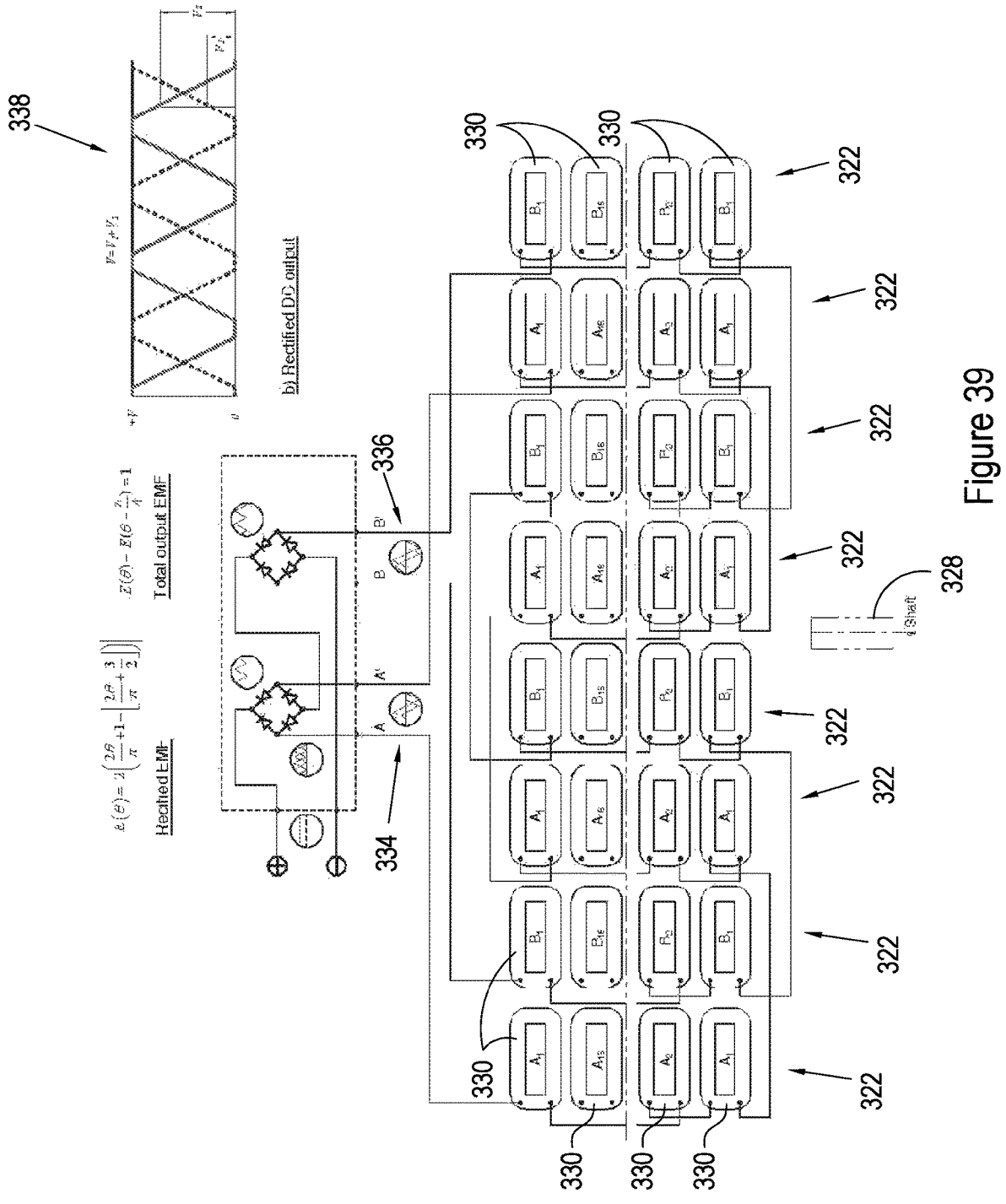
FIG. 39 shows a winding diagram for the DC wind turbine stator shown in FIG. 38.

FIG. 39 shows a winding diagram for the DC wind turbine stator 320 shown in FIG. 38 (but which may be used for other 2-phase alternator DC output arrangements envisaged by the invention, with suitable modifications). Each of the eight stator modules 322 around a shaft 328 are shown, as well as the armature windings 330 around each stator stem 332. The ends of the armature windings 330 are shown at 334 and 336, with the output then being rectified to form a rectified DC output, shown as rectified double trapezoidal waveforms 338 in series. The rectification is done using passive semiconductors, such as diodes. The double trapezoidal waveform 338 lends itself very conveniently for switched rectification as the switching may be done when current is zero at the crossing and the zero dwell long enough for effective, current-less switching.

In addition, as the segmentation of the flux circuit is independent of the number of poles, the above wind-turbine may be termed a 'direct-drive wind-turbine' (in that it has no gearbox) and at 4 seconds per revolution (for a 4-pole machine) the alternator will be functioning at 1 Hz. As such, the switching of the rectification will have a 1 Hz frequency, which can practically be called a DC current (unlike the normal 50 or 60 Hz in a national grid). Of course, the machine may have many poles for higher frequency and/or voltage output.

Figure 40:
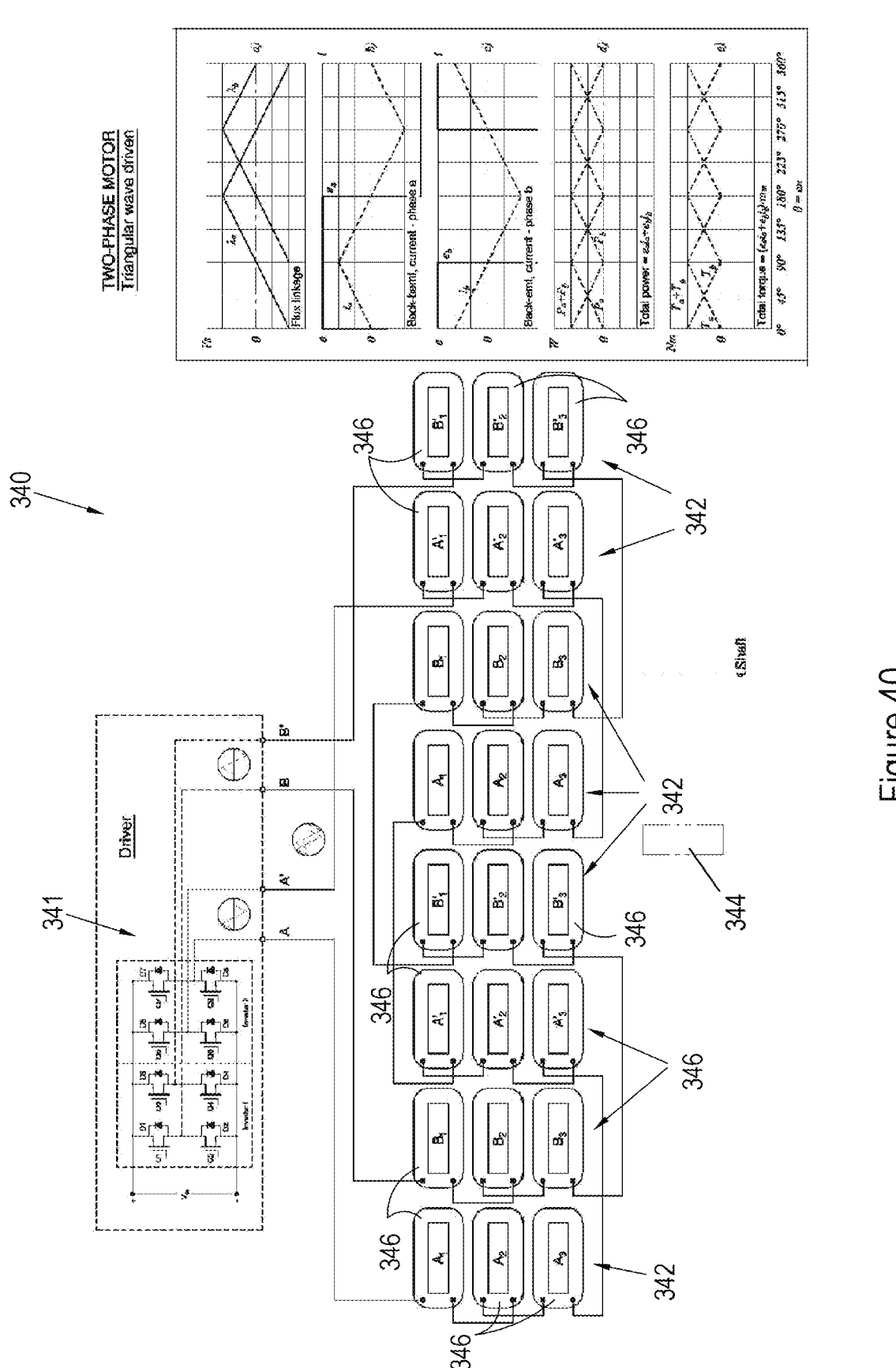
FIG. 40 shows a winding diagram for a 2-phase motor driven by a triangular wave driver.

FIG. 40 shows a winding diagram 340 for a 2-phase motor that is driven by a triangular wave driver 341. Each of eight stator modules 342 around a shaft 344 are shown, as well as the armature windings 346 around each stator stem.

Figure 41:
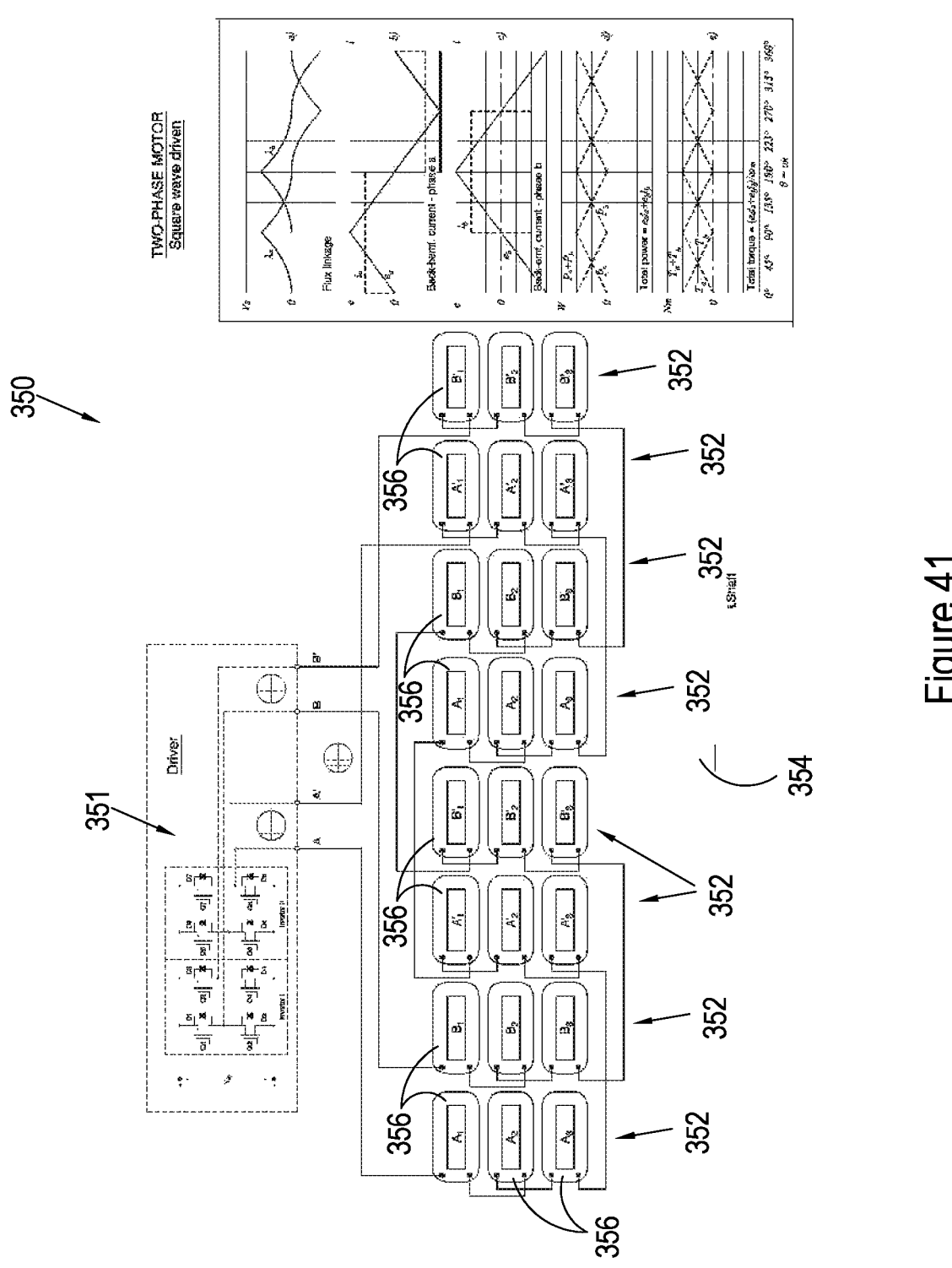
FIG. 41 shows a winding diagram for a 2-phase motor driven by a square wave driver.

FIG. 41 shows a winding diagram 350 for a 2-phase motor that is driven by a square wave driver 351. Each of eight stator modules 352 around a shaft 354 are shown, as well as the armature windings 356 around each stator stem.

The operation of a machine with curved/sinusoidal rotor pole elements (such as rotor pole elements 54 in FIGS. 4 and 7) will now be described in more detail. The bi-polar induction described above [may be represented] is schematically shown in FIG. 42.

Figure 42:
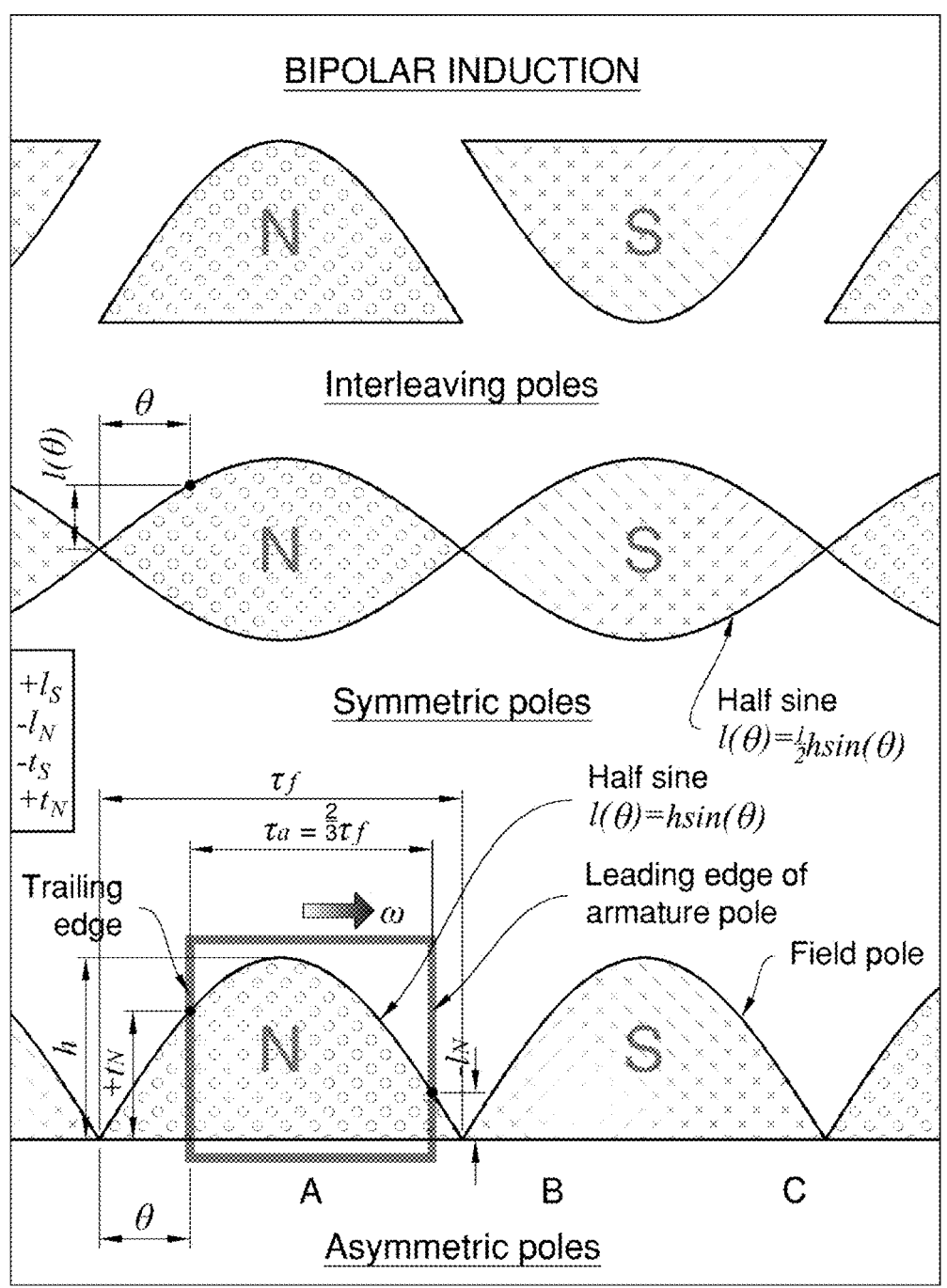
FIG. 42 shows a schematic view of bi-polar induction motor according to an embodiment.

FIG. 42 shows an arrangement of sinusoidal shaped poles 54 of a rotor with a stator pole surface 42 (of the type shown in FIG. 4) in translation to the right at position 0. The magnetostatic poles alternate in polarity and may be arranged in numerous ways such as the three examples above. For a sine wave emf the pole area should vary in a sinusoidal manner if scanned by a vertical line.

Figure 43:
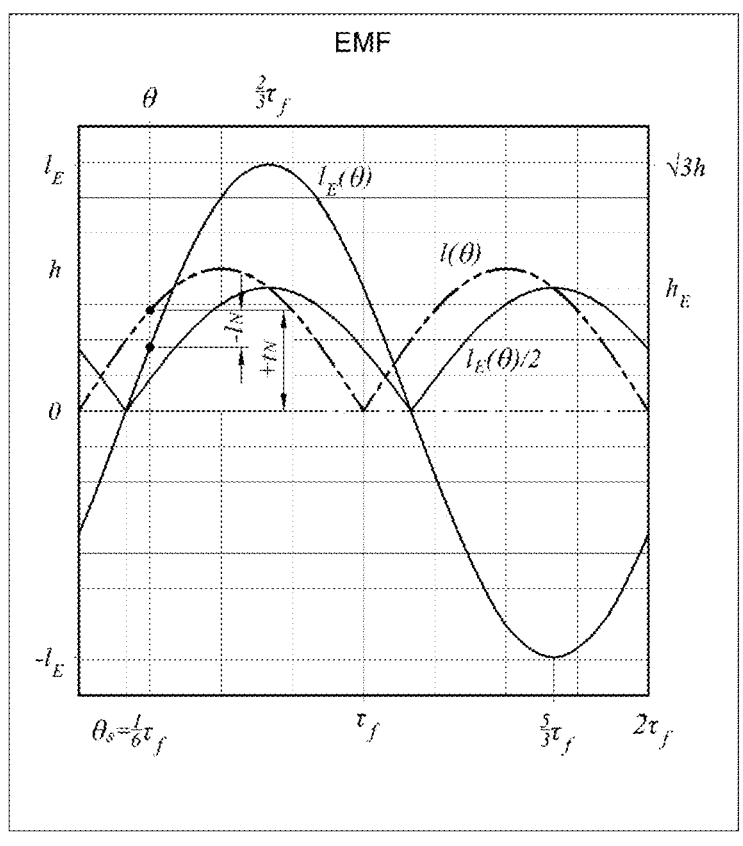
FIG. 43 shows the generated emf of the field coil in the stator of the arrangement shown in FIG. 42.

The field coil in the stator will generate an emf, shown in FIG. 43, according to BLV law $$e(t) = 2N_a B_g h_E r_g \omega \sin\left(\frac{P}{2}\omega t - \theta_s\right)$$

| | | |
|---|---|---|
| $N_a$ | Number of turns of armature coil | numeric |
| $B_g$ | Flux density in air gap | $T$ |
| $h_E$ | Virtual pole height | $m$ |
| $r_g$ | Air gap radius | $m$ |
| $\omega$ | Rotational speed | rad/$s$ |
| $t$ | Time | $s$ |
| $e$ | Electromotive force | $V$ |
| $P$ | Number of poles | numeric |
| $\theta_s$ | Phase shift (advance) of virtual poles | rad |

US 12,573,926 B2

19

Figure 44:
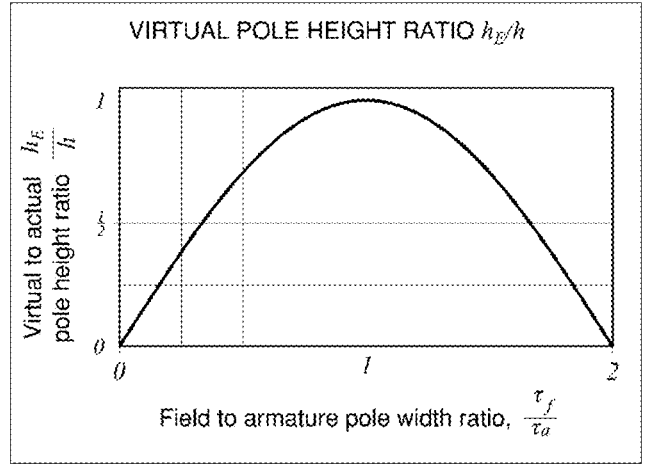
FIG. 44 shows the height of the virtual pole $h_E$ shown in FIG. 43.

The height of the virtual pole $h_E$, as shown below in FIG. 44, varies in a sinusoidal manner and may be defined as $$h_E(\tau_a) = \tau_a \sin\left(\frac{\pi}{2}\frac{\tau_a}{\tau_f}\right)$$

The virtual pole phase angle (advance offset) is a linear ratio and is simply half the difference between the field pole and armature pole arcs.

$$\theta_s(\tau_a) = \frac{\tau_f - \tau_a}{2}$$

Figure 45:
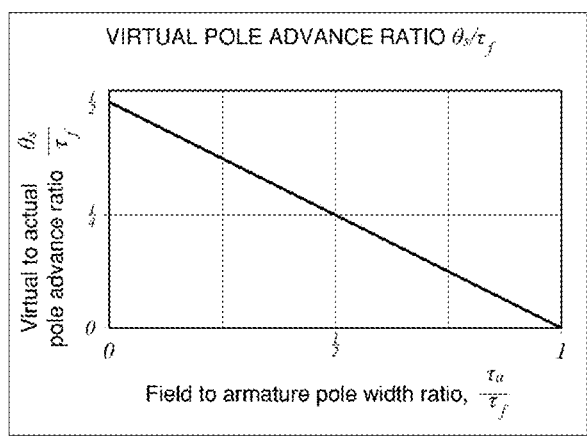
FIG. 45 shows the corresponding virtual pole advance ratio shown in FIG. 43.

This virtual pole advance ratio is shown in FIG. 45.

It can be seen that in case where the armature pole width matches that of the field pole the virtual and physical poles coincide in size and position, i.e. they are identical.

Electromotive force emf is calculated as per the virtual pole shape in that the effective length per coil turn will be on a sine curve twice the height of the virtual pole. This is for bipolar induction, in respect of the intermediate stator element and associated intermediate rotor elements, as described above. The end stator elements and associated endmost rotor elements, in respect of which there is unipolar induction, as described above, will now be described. As indicated above, when opposite stator coils are connected in series, the combined result is equivalent to bi-polar induction. The emf plot of an end coil is shown in FIG. 46.

A convenient graphic tool may be used to plot the emf. If the overlapping common area of the stator pole surface and rotor pole surface defines the flux linkage A, then the sum of the intersection height of the rectangular stator pole face leading and trailing edges will define the emf, with the following rules:

Leading edge over the South pole: $+l_s$ (positive)
Trailing edge over the South pole: $-t_s$ (negative)
Leading edge over the North pole: $-l_N$ (negative)
Trailing edge over the South pole: $+t_N$ (positive)

Figure 46:
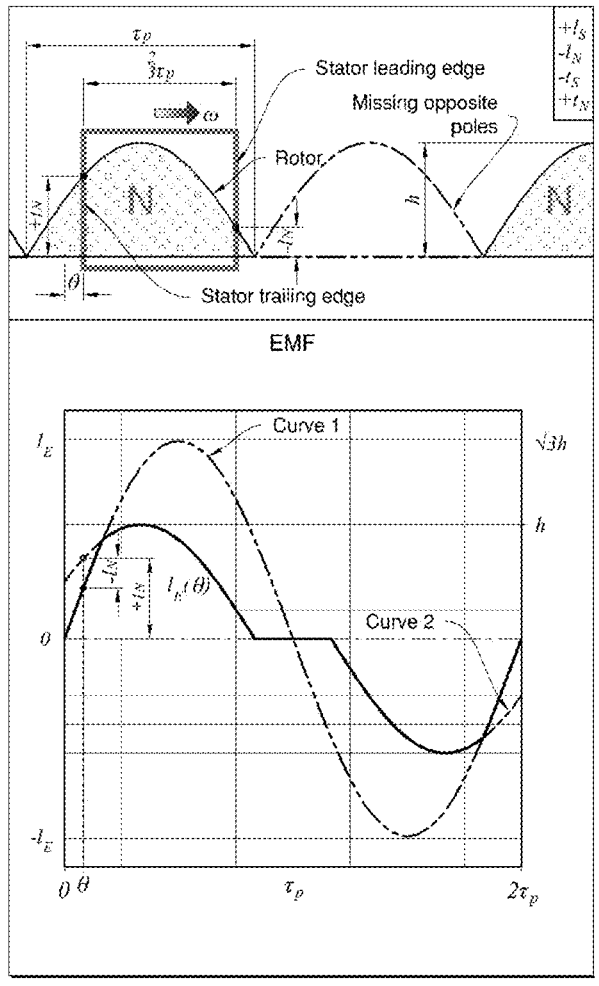
FIG. 46 an emf plot of an end coil according to an embodiment.

When both the leading and trailing edges overlap a rotor pole surface then the emf changes according to Curve 1 in FIG. 46, which is a sinusoidal curve. However, when only one edge overlaps a rotor pole surface the emf varies as per Curve 2 in FIG. 46, a sine wave that is sqrt(3) smaller in amplitude when the armature pole width (or arc) is ⅓ that of field pole pitch. This pole width corresponds to a 3-phase machine where the armature coils are consecutive over one pole pitch. Thus, the resultant emf curve in FIG. 46 is a composite of two sine curves and is shown in bold.

The choice of datum for angle θ is arbitrary but in the above case is chosen as the stator pole trailing edge offset from when the stator pole is centrally positioned over the rotor pole.

Figure 47:
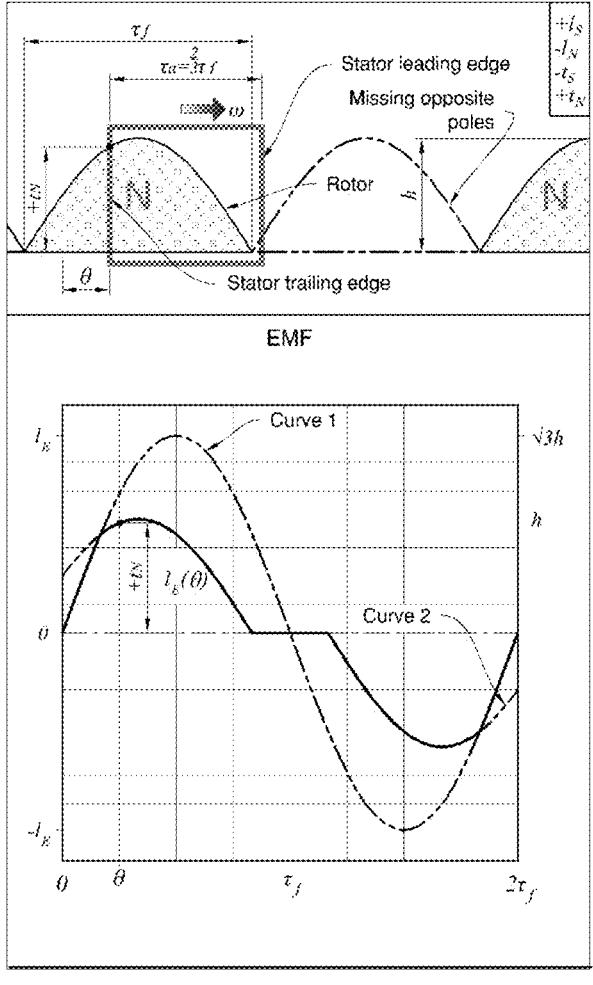
FIG. 47 shows the emf position 0 moving from Curve 1 to Curve 2 according to an embodiment.

In FIG. 47, the emf position 0 moves from Curve 1 to Curve 2.

Figure 48:
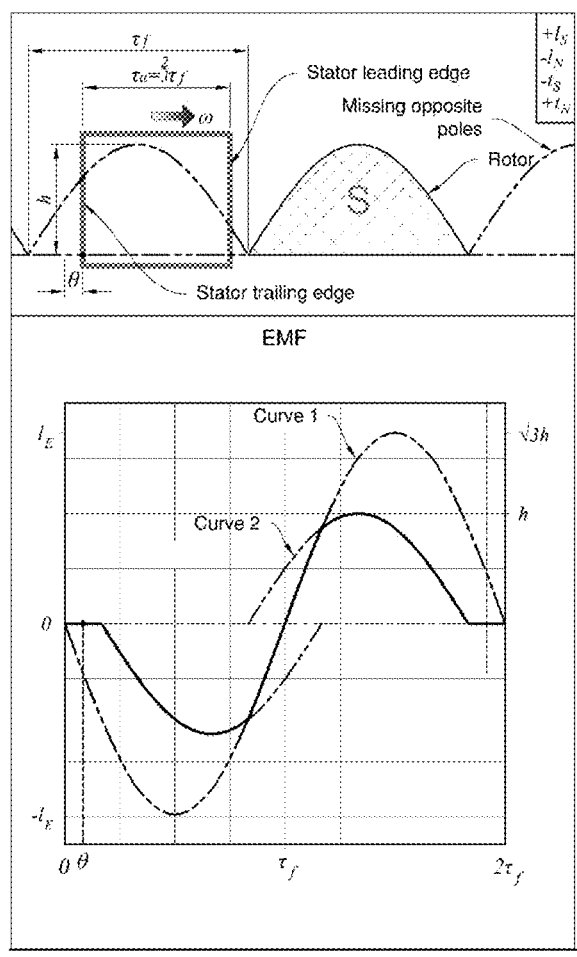
FIG. 48 shows the emf position of the opposite end-coil, with reference to FIG. 46.

The opposite end-coil (with relation to FIG. 46), on the other hand, is shown in FIG. 48.

Figure 49:
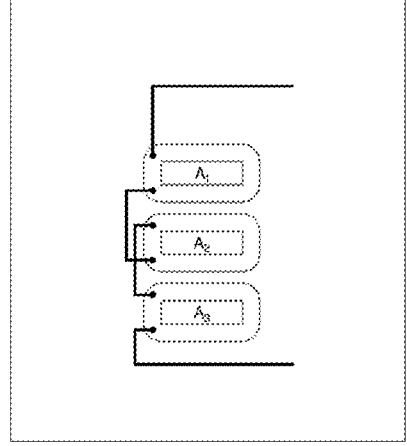
FIG. 49 shows the end coils wound in the same direction in an embodiment.
Figure 50:
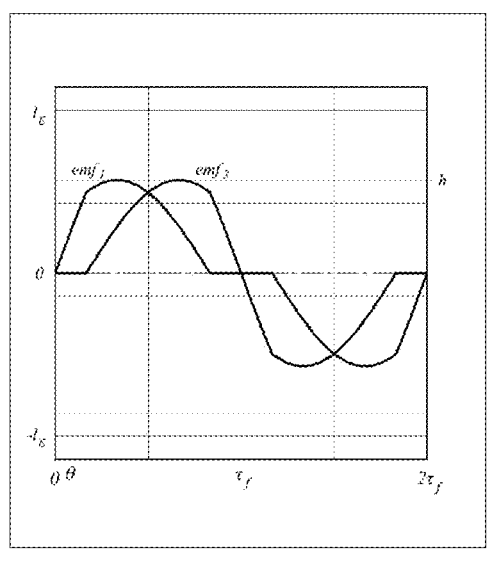
FIG. 50 shows the emf for each end coil shown in FIG. 49.

If the end coils are wound in the same direction as shown in FIG. 49, the emf for each coil is shown in FIG. 50.

Regarding FIG. 50, in order to achieve the stagger of the two curves (this stagger is half the difference between the rotor and stator pole angles), the end pole elements of the rotor modules have to be phased by 180 degrees electrical. This in turn means that the stator module preferably has to have an odd number of stator pole elements (i.e. stator legs), or, in terms of the rotor arrangement, an even number of rotor modules (i.e. an even number of field exciter coils), as shown/confirmed in the figures and related descriptions. A machine with an odd number of stages will introduce harmonics due to the end coils, these harmonics becoming less pronounced with increasing number of stages.

Figure 51:
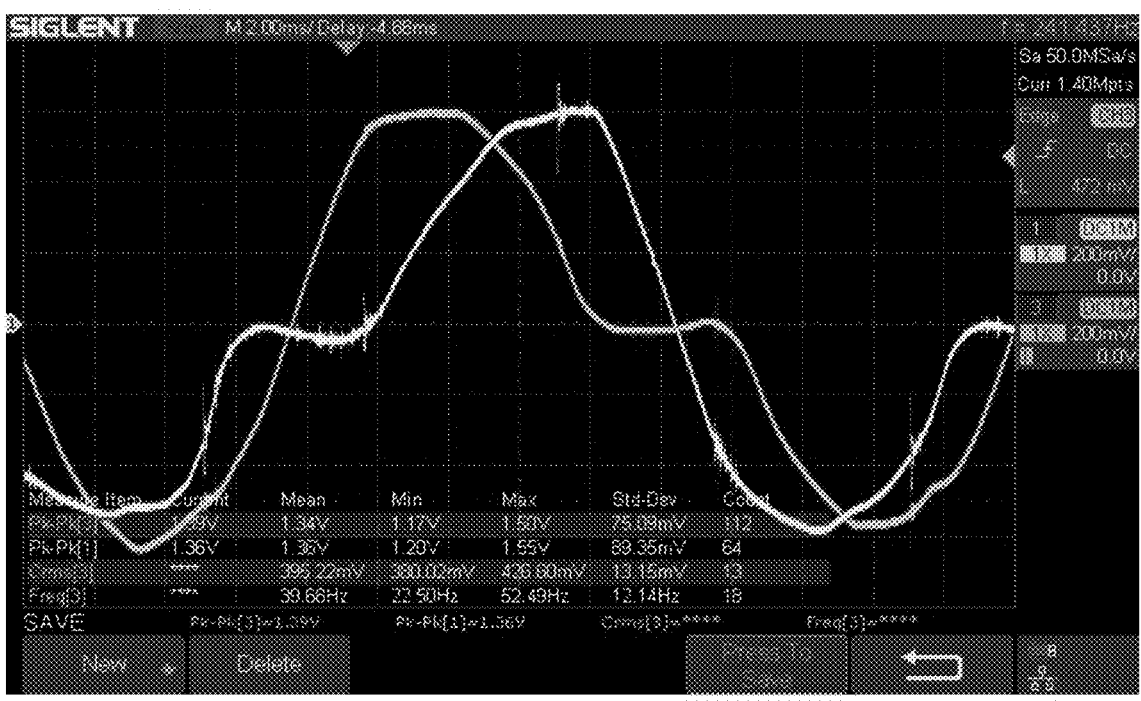
FIG. 51 shows an oscilloscope trace of a prototype machine showing emf waveforms of the end-coils.
Figure 52:
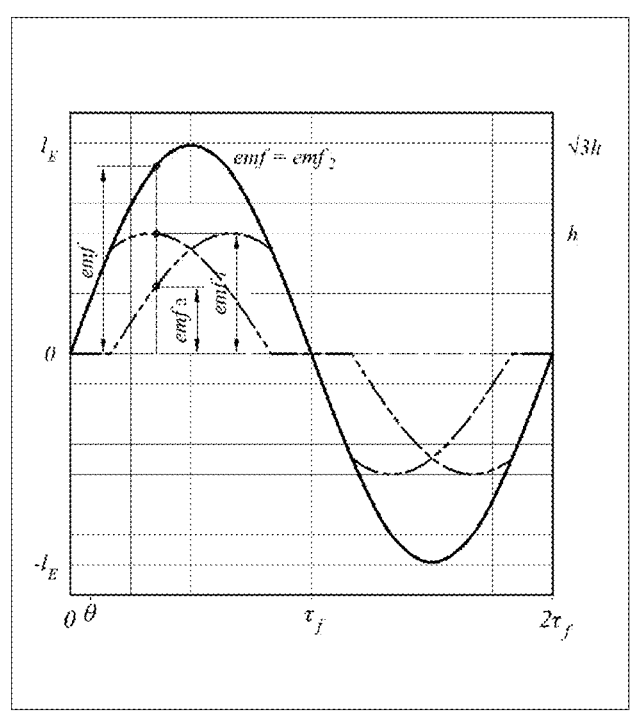
FIG. 52 shows the waveform for the combined end coils, according to an embodiment.

FIG. 51 shows an oscilloscope trace of the prototype machine showing emf waveforms of the end-coils.

FIG. 51 shows the waveform of end coils 1 and 3 combined, which is identical to bipolar induction of intermediate coil no. 2.

Figure 53:
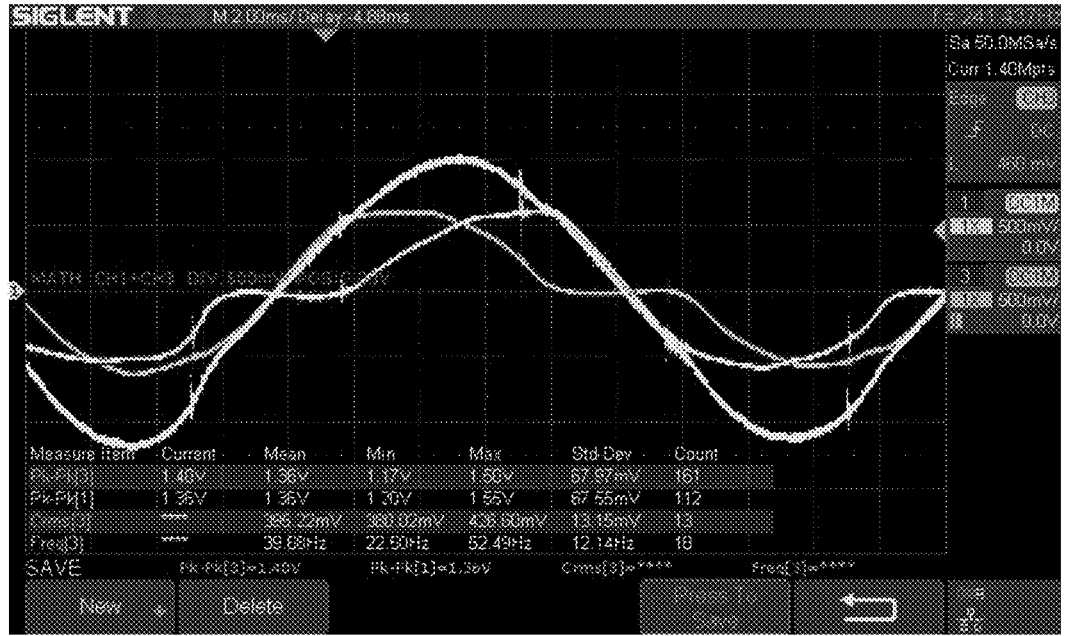
FIGS. 53 and 54 show the end-waveforms in yellow and blue, while the white line is the combined curve, according to an embodiment.
Figure 54:
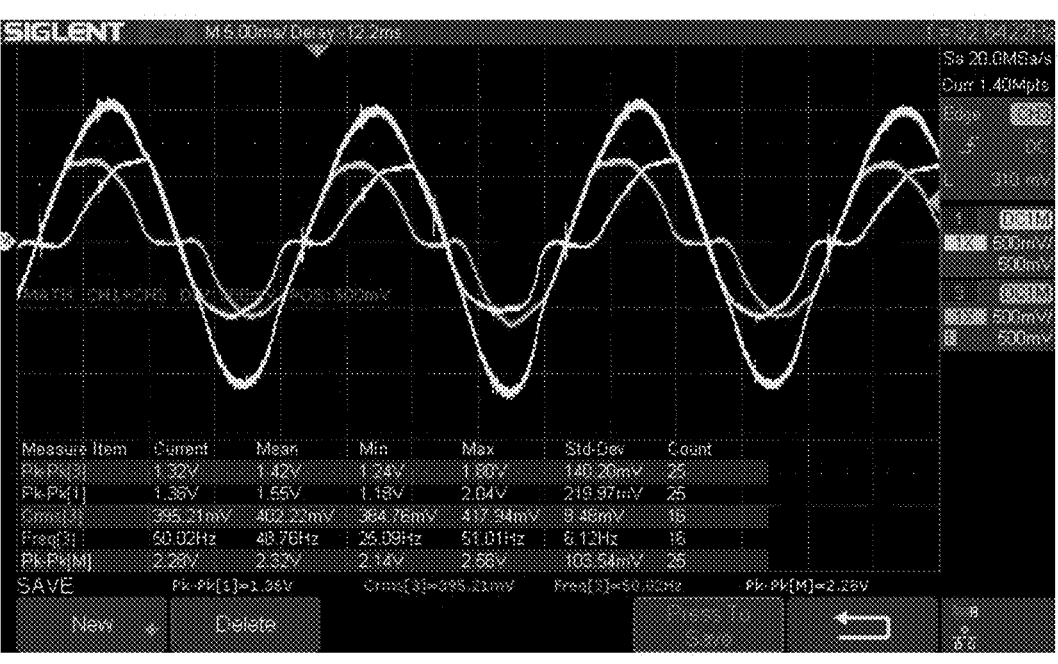

FIGS. 53 and 54 show the end-waveforms in yellow and blue, while the white line is the combined curve integrated by the oscilloscope.

Figure 55:
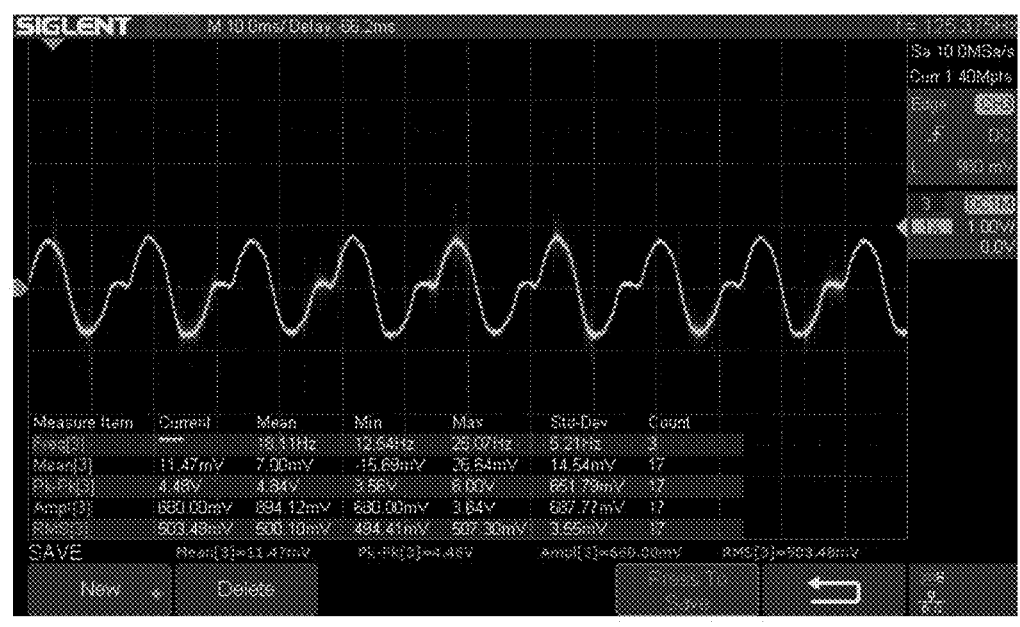
FIG. 55 shows an oscilloscope trace of an end coil, according to an embodiment.

FIG. 55 shows an oscilloscope trace of an end-coil.

Figure 56:
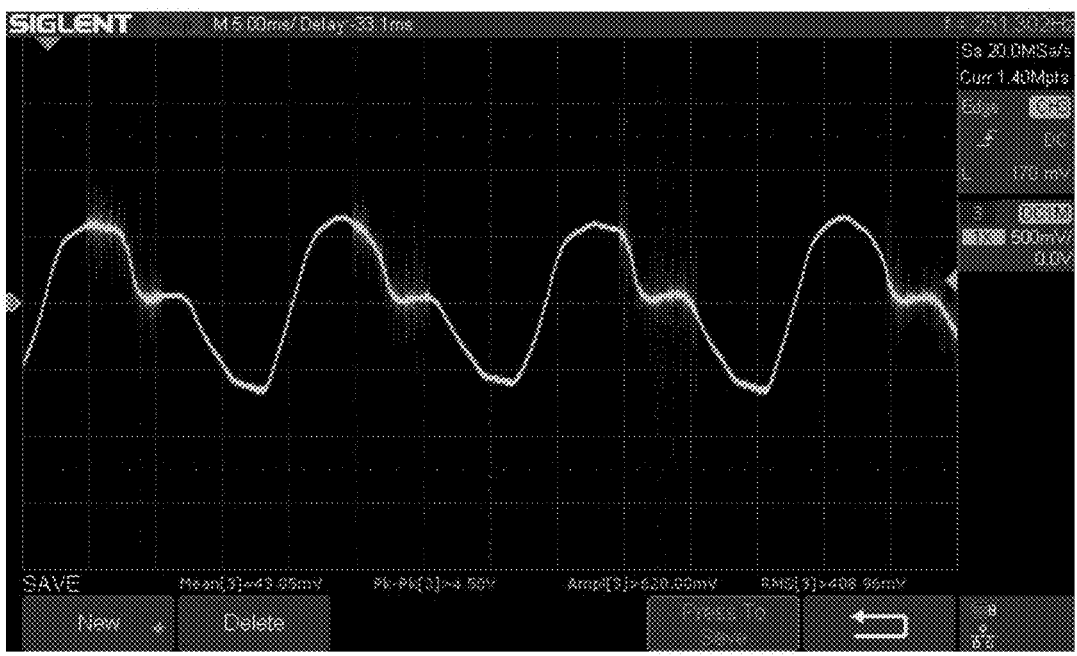
FIG. 56 shows an oscilloscope trace of an opposite end coil, according to an embodiment.

FIG. 56 shows an oscilloscope trace of the opposite end-coil.

Figure 57:
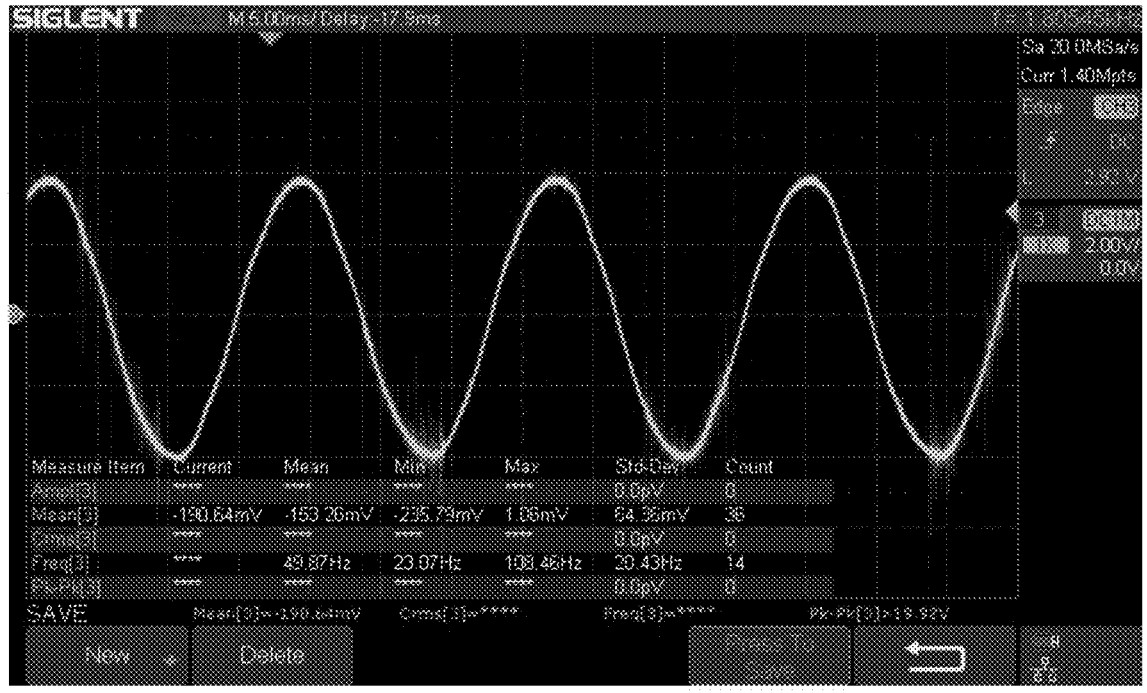
FIG. 57 shows an oscilloscope trace of both end coils connected in series, according to an embodiment.

FIG. 57 shows an oscilloscope trace of both end-coils connected in series.

Figure 58:
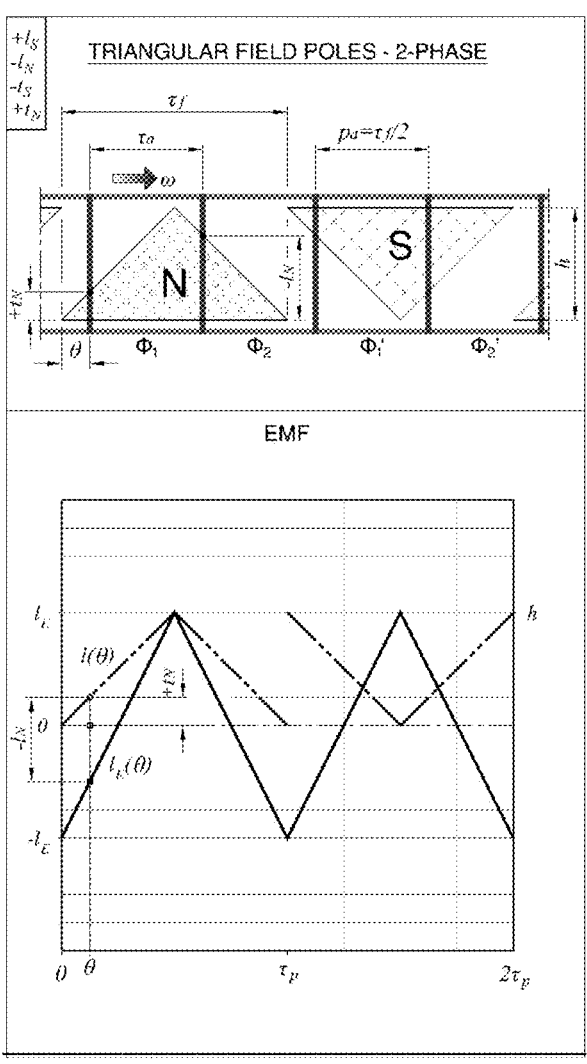
FIG. 58 shows bi-polar induction of a machine with triangular rotor pole elements, according to an embodiment.

The operation of a machine with a triangular rotor pole elements, of the type shown in FIG. 15a, will now be described in more detail. The bi-polar induction described above may be represented schematically as shown in FIG. 58.

Figure 59:
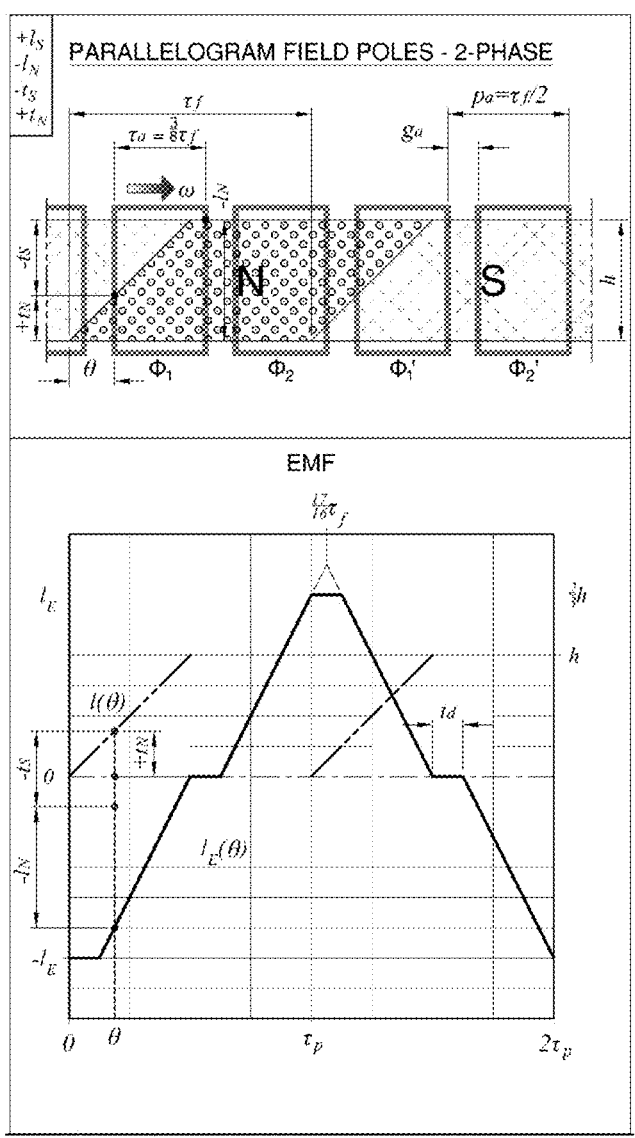
FIG. 59 shows a truncated triangle (trapezoidal) emf waveform, arising from gaps between armature poles, according to an embodiment.

The back emf is triangular and therefore in the case of a motor it may be driven by a square waveform and in the case of an alternator for DC current the two phases may be rectified, as described further below. It can be seen in FIG. 58 that the armature poles have no gaps and that in practice there will be a gap which will cause the emf waveform into a truncated triangle (trapezoidal) waveform, as shown in FIG. 59.

Figure 60:
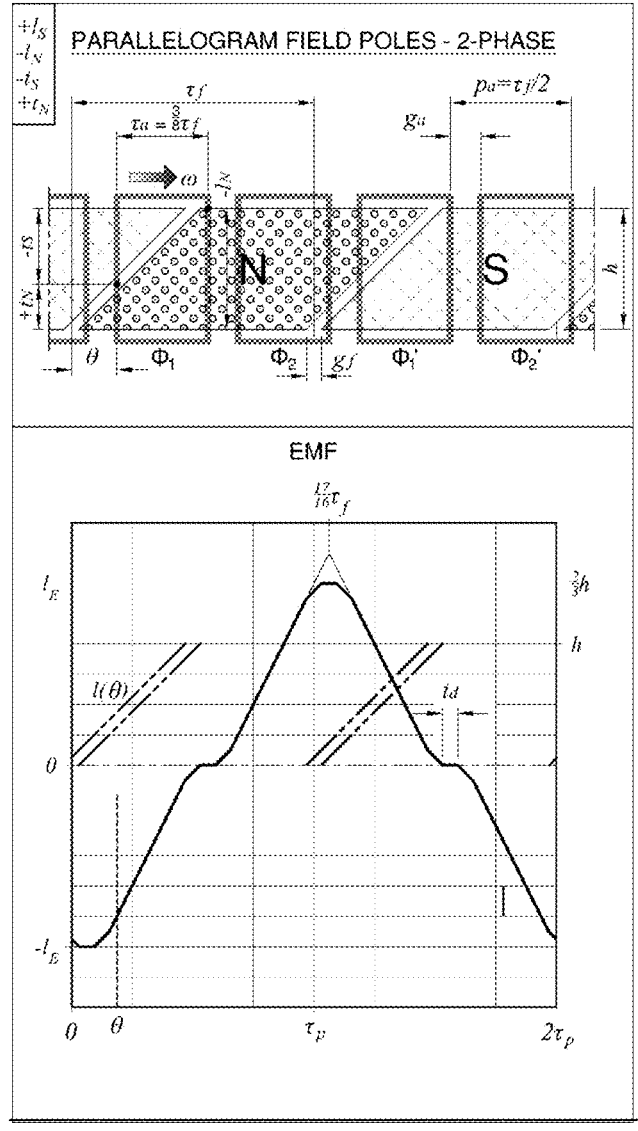
FIG. 60 shows a chamfered triangular (trapezoidal) emf waveform, arising from gaps between parallelogram field poles, according to an embodiment.

Rotor pole surfaces with a trapezoidal shape are more desirable as there can be gaps between the armature poles. The armature pole pitch pa is half the field pole pitch $\tau_f$. This is an important geometric defining feature of this invention. This is desirable as there is a dwell of zero emf at zero crossing, $t_d$, a desirable feature for power electronics drive where the switching is done. With parallelogram field poles it is also possible to have gaps between the field poles themselves which is shown in FIG. 60. This will introduce chamfers on all corners of the trapezoidal waveform.

Figure 61:
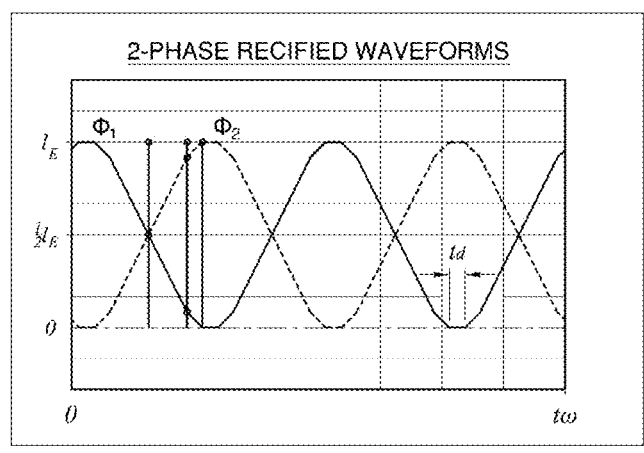
FIG. 61 shows the resulting waveform, according to an embodiment.

The emf waveform remains symmetrical about its half amplitude, as shown in FIG. 61.

FIG. 61 shows the two phases rectified. When the phases are connected in series a DC current will result. The dwell time is also shown. Although DC current may be obtained by passive diodes a switching convertor may be used where the dwell time is very desirable for mosfet switches to operate at low speed.

Figure 62:
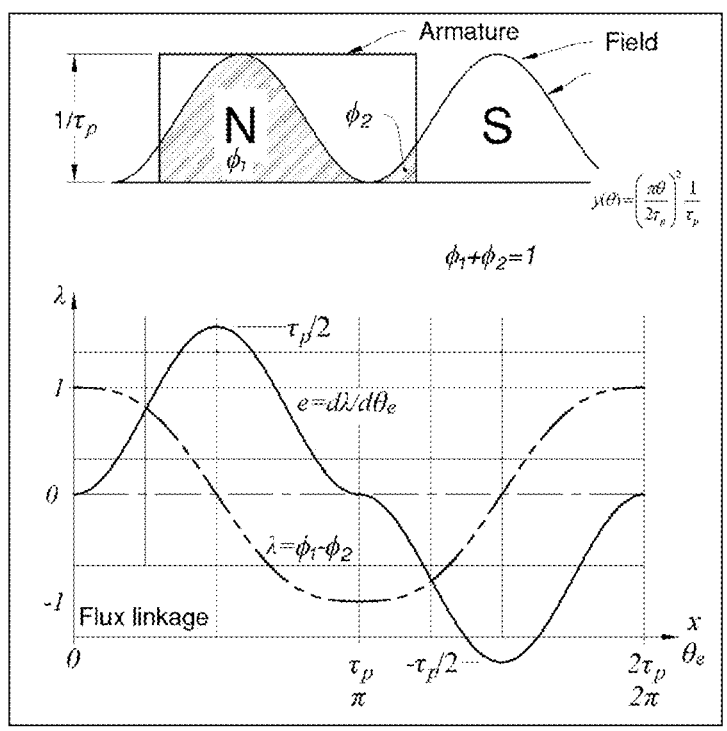
FIGS. 62 to 64 show double sinusoidal induction.
Figure 63:
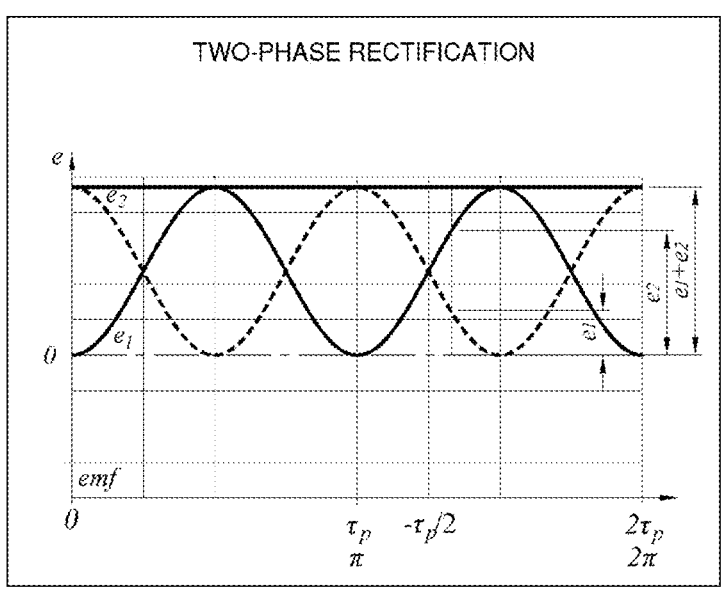
Figure 64:
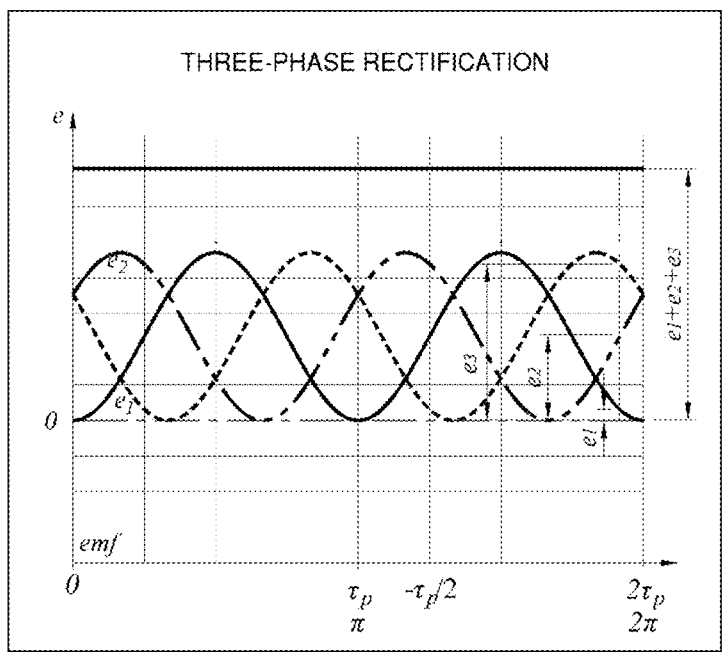

FIGS. 62 to 64 show double sinusoidal induction.

It is worth mentioning that only the double sinusoidal waveform may have an odd (as well as even) number of phases for DC rectification without ripple. All other shapes, such as triangular and trapezoidal must have pairs of phases.

Figure 65:
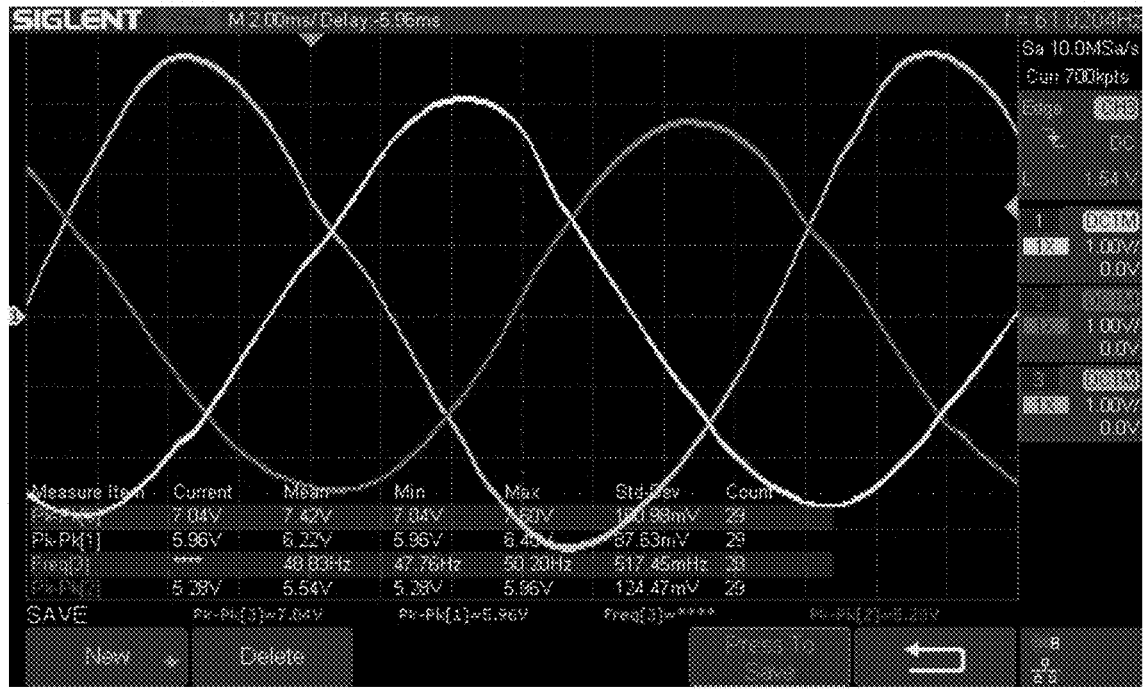
FIG. 65 shows a scan of the prototype 3-phase alternator.

FIG. 65 shows a scan of the prototype 3-phase alternator.

One application of the present invention is a 2-phase synchronous motor/generator. The generator has a triangular back-EMF waveform and two phases. Each phase is rectified with a full bridge rectified, with the rectified phases being connected in series to produce uniform DC current.

Regarding the motor, there are two topologies for the motor, namely a back-EMF with a triangular waveform and a back-EMF with a square waveform. In a square waveform synchronous motor, the power electronics driver has current switching control with a triangular wave output. In a triangular waveform synchronous motor, the power electronics driver has current switching control with a square wave output. With the stator teeth having a skew of ½ pole pitch there is no cogging. Poles may be shaped to have a sinusoidal or any other waveform.

In a generator-motor combination, a square waveform generator may be used to synchronously drive a triangular waveform motor and vice versa.

In the case of a battery storage DC or rectified DC current the motor may be run by power electronics. A square back-EMF waveform motor has a driver with current switching output of a triangular waveform. A triangular back-EMF waveform motor has a driver with current switching output of a square waveform.

In general, regarding the generator, the triangular or double-trapezoidal waveform has an output of high quality, ripple-free, uniform DC current. It is simple in construction. It has simple winding with maximum copper utilization (minimal end winding length) since each tooth is wound individually. It has very high efficiency. The DC output may be readily chopped and inverted into clean AC current.

In general, regarding the motor, the triangular back-EMF waveform motor has no cogging torque. It has high quality, ripple-free, uniform torque. Its efficiency is superior of the high-end, state of the art 3-phase sinusoidal driven (Field Orientated Control, Direct Torque and other control algorithms) motors. It is simple in construction. It has simple winding with maximum copper utilization (minimal end winding length) since each tooth is wound individually.

When a hybrid drive arrangement with a prime mover, an alternator and motor are used, for example in an electric vehicle drive where an IC engine drives an alternator which drives a motor of this invention, complete control may be achieved by varying the relatively low current in the exciter coils of the motor and/or alternator resulting in a relatively inexpensive and simple power electronics drive. This is in contrast to state of the art where the main armature current has to be processed by costly and complicated power electronics.

The invention claimed is:

1. A bipolar induction electric machine comprising:
a stator arrangement comprising a plurality of circumferentially arranged stator modules, each stator module comprising a plurality of axially arranged spaced apart stator pole elements fitted with a concentrated armature winding and terminating in an inwardly facing, curved stator pole surface, with the plurality of circumferentially arranged stator modules thus defining a plurality of inwardly facing, curved stator pole surfaces; and
a rotor arrangement rotatably and concentrically accommodated within the stator arrangement, the rotor arrangement comprising a plurality of axially arranged rotor modules, each rotor module comprising at least one circumferentially arranged, curved bi-polar member comprising a pair of curved rotor pole elements that are axially displaced on either side of a stationary concentric field exciter coil accommodated between adjacent stator pole elements within the stator arrangement, with each bi-polar member having a corresponding spaced apart pair of stator pole surfaces, so that each rotor pole element lines up with a corresponding stator pole element,
with the curved rotor pole elements being concentrically arranged relative to the stator pole surfaces so as to define a uniform air-gap therebetween and thus provide a plurality of axially segmented multipolar flux circuits, with the axial dimension of each rotor pole element varying in a manner so as to vary the overlap between the rotor pole element and the stator pole surface during rotation of the rotor arrangement, thus inducing a predetermined emf waveform in the armature winding of the stator pole elements.

2. The bipolar induction electric machine of claim 1, wherein the axially arranged spaced apart stator pole elements are joined by a common stator yoke, with each stator pole element extending or protruding radially inwardly towards the centre of the machine, each stator pole element comprising a stator stem to accommodate the concentrated armature winding, the stator pole element terminating in a stator pole the distal end of which defines the curved stator pole surface, so that a plurality of the circumferentially arranged stator pole elements define a substantially cylindrical stator pole surface, with the stationary field exciter coil being accommodated between adjacent stator poles of the adjacent axially arranged spaced apart stator pole elements.

3. The bipolar induction electric machine of claim 1, wherein the stator arrangement comprises a plurality of axially arranged polygonal stator frame modules joined together to define an enclosed stator body, each stator frame module comprising a plurality of stator frame module components corresponding to the number of circumferentially arranged stator modules, each stator frame module component defining an aperture or slot to accommodate a stator pole element.

4. The bipolar induction electric machine of claim 3, wherein circumferential gaps are defined between the circumferentially arranged stator modules to accommodate a pick-up sensor-coil core-element to determine position/speed.

5. The bipolar induction electric machine of claim 1, wherein the rotor arrangement includes a rotatable shaft to carry the plurality of axially arranged rotor modules, each bi-polar member of each rotor module being connected to the shaft via a support arm arrangement, with each bi-polar member having a corresponding spaced apart pair of stator pole surfaces, so that each rotor pole element lines up with a corresponding concentric stator pole element.

6. The bipolar induction electric machine of claim 5, wherein each rotor pole element comprises:
a substantially straight inner edge spaced apart from a corresponding inner edge of the adjacent rotor pole element that in combination defines the bi-polar member, with this spacing corresponding to the spacing between adjacent stator pole surfaces of adjacent stator pole elements; and
a shaped outer edge so as to define a shaped, curved rotor pole surface between the inner and outer edges, the curved rotor pole surface and the corresponding curved stator pole surface of the corresponding stator pole element defining the uniform air-gap therebetween,
with the concentric field exciter coil encircling the centre of each rotor module, so as to excite the bi-polar member, with the shaped rotor pole surfaces providing, during rotation, a variable area overlap with the adjacent stator pole surfaces thereby varying the flux through the stator pole elements, which in turn induces a correspondingly shaped emf waveform in the armature winding of the stator pole elements.

7. The bipolar induction electric machine of claim 6, wherein each axially arranged rotor module is separately excited by a dedicated concentric field exciter coil, each rotor module having its own axially arranged north and south poles to define the bi-polar member.

8. The bipolar induction electric machine of claim 7, wherein the ends of the bi-polar members of one rotor module, of one polarity, are axially interleaved so as to be circumferentially adjacent, when viewed axially from an end of the shaft, with respect to the ends of an adjacent bi-polar member of an adjacent rotor module, of the opposite polarity.

9. The bipolar induction electric machine of claim 1, wherein, in the case of a 4-pole machine, each rotor module comprises two diametrically arranged curved bi-polar members, each curved bi-polar member defining an arc of 90 degrees (mechanical), with there being a corresponding sector gap defined between the curved bi-polar members.

10. The bipolar induction electric machine of claim 9, wherein adjacent rotor modules are offset by 180 degrees (electrical) so that the curved bi-polar members of one rotor module interleave with the curved bi-polar members of an adjacent rotor module so as to occupy (or at least partly occupy) the sector gaps defined in the adjacent rotor module.

11. The bipolar induction electric machine of claim 10, wherein the shaped outer edge of the rotor pole element is curved to ultimately define a sinusoidal emf.

12. The bipolar induction electric machine of claim 10, wherein the shaped outer edge of the rotor pole element is triangular to ultimately define a triangular emf.

13. The bipolar induction electric machine of claim 10, wherein the shaped outer edge of the rotor pole element is a parallelogram, to ultimately define a double trapezoidal emf.

14. The bipolar induction electric machine of claim 10, wherein the shaped outer edge of the rotor pole element is a full sinusoid, to ultimately define a double sinusoidal emf.

15. The bipolar induction electric machine of claim 1, wherein each rotor module comprises four circumferentially arranged, equally spaced curved bi-polar members, each defining an arc of 45 degrees mechanical, with there being four corresponding sector gaps defined between adjacent curved bi-polar members.

16. The bipolar induction electric machine of claim 15, wherein adjacent rotor modules are circumferentially offset by 45 degrees mechanical so that the curved bi-polar members of one rotor module interleave with the curved bi-polar members of an adjacent rotor module so as to occupy (or at least partly occupy) the sector gaps defined in the adjacent rotor module.

17. The bipolar induction electric machine of claim 16, wherein the shaped outer edge of the rotor pole element is curved to ultimately define a sinusoidal emf, or is triangular to ultimately define a triangular emf, or is a parallelogram, to ultimately define a double trapezoidal emf, or is a full sinusoid, to ultimately define a double sinusoidal emf.

18. The bipolar induction electric machine of claim 1, wherein each stator module includes a pair of end stator pole elements, associated with endmost rotor pole elements, and at least one intermediate stator pole element, associated with intermediate rotor pole elements, the armature winding around the intermediate stator pole element/s receives an alternating flux/emf due to bipolar induction, to provide the predetermined emf waveform.

19. The bipolar induction electric machine of claim 18, wherein the armature windings around the end stator pole elements each receive single directional flux due to unipolar induction, with the two halves provided by the end stator pole elements having armature windings of opposite polarity being connected in series to define a correspondingly shaped emf.

* * * * *